United States Patent
Zatorski et al.

(10) Patent No.: US 12,516,647 B2
(45) Date of Patent: Jan. 6, 2026

(54) GAS TURBINE ENGINE WITH THIRD STREAM

(71) Applicants: General Electric Company, Evendale, OH (US); General Electric Deutschland Holding GmbH, Frankfurt (DE)

(72) Inventors: Darek Tomasz Zatorski, Fort Wright, KY (US); David Marion Ostdiek, Liberty Township, OH (US); Mohamed Osama, Garching (DE); William Joseph Solomon, Montgomery, OH (US); Brandon Wayne Miller, Middletown, OH (US); Randy M. Vondrell, Newport, KY (US); Craig William Higgins, Liberty Township, OH (US); Alexander Kimberley Simpson, Cincinnati, OH (US)

(73) Assignees: General Electric Company, Evendale, OH (US); General Electric Deutschland Holding GmbH, Frankfurt (DE)

( * ) Notice: Subject to any disclaimer, the term of this patent is extended or adjusted under 35 U.S.C. 154(b) by 0 days.

(21) Appl. No.: 19/016,281

(22) Filed: Jan. 10, 2025

(65) Prior Publication Data

US 2025/0146453 A1     May 8, 2025

Related U.S. Application Data

(63) Continuation-in-part of application No. 18/888,873, filed on Sep. 18, 2024, which is a continuation-in-part
(Continued)

(51) Int. Cl.
    *F02K 3/02*     (2006.01)
    *F02C 3/06*     (2006.01)
    *F02K 3/065*     (2006.01)

(52) U.S. Cl.
    CPC ............... *F02K 3/065* (2013.01); *F02C 3/06* (2013.01)

(58) Field of Classification Search
    CPC . F02K 3/02; F02K 3/025; F02K 3/065; F02C 3/06; F02C 3/107; F02C 7/36
    See application file for complete search history.

(56) References Cited

U.S. PATENT DOCUMENTS

| | | |
|---|---|---|
| 2,999,630 A | 9/1961 | Warren et al. |
| 3,528,250 A | 9/1970 | Johnson |
| (Continued) | | |

FOREIGN PATENT DOCUMENTS

| | | |
|---|---|---|
| CN | 1204005 A | 1/1999 |
| CN | 101657607 A | 2/2010 |
| (Continued) | | |

OTHER PUBLICATIONS

Crigler, Application of Theodorsen's Theory to Propeller Design, NACA (National Advisory Committee for Aeronautics) Report 924, 1948, pp. 83-99.
(Continued)

*Primary Examiner* — Steven M Sutherland
(74) *Attorney, Agent, or Firm* — Dority & Manning, P.A.

(57) ABSTRACT

A gas turbine engine is provided. The gas turbine engine includes a turbomachine defining an engine inlet to an inlet duct, a fan duct inlet to a fan duct, and a core inlet to a core duct; a primary fan driven by the turbomachine; and a secondary fan located downstream of the primary fan within the inlet duct. The gas turbine engine defines a thrust to power airflow ratio between 3.5 and 100 and a core bypass
(Continued)

ratio between 0.1 and 10, wherein the thrust to power airflow ratio is a ratio of an airflow through a bypass passage over the turbomachine plus an airflow through the fan duct to an airflow through the core duct, and wherein the core bypass ratio is a ratio of the airflow through the fan duct to the airflow through the core duct.

20 Claims, 34 Drawing Sheets

Related U.S. Application Data of application No. 18/675,270, filed on May 28, 2024, which is a continuation of application No. 17/879,384, filed on Aug. 2, 2022, now Pat. No. 12,031,504.

(56) References Cited

U.S. PATENT DOCUMENTS

| | | |
|---|---|---|
| 3,540,682 A | 11/1970 | Dibble et al. |
| 3,542,152 A | 11/1970 | Adamson et al. |
| 3,750,402 A | 8/1973 | Vdoviak et al. |
| 4,010,608 A | 3/1977 | Simmons |
| 4,043,121 A | 8/1977 | Thomas et al. |
| 4,446,696 A | 5/1984 | Sargisson et al. |
| 4,486,146 A | 12/1984 | Campion |
| 4,569,199 A | 2/1986 | Klees et al. |
| 4,607,657 A | 8/1986 | Hirschkron |
| 4,784,575 A | 11/1988 | Nelson et al. |
| 4,860,537 A | 8/1989 | Taylor |
| 4,892,269 A | 1/1990 | Greco et al. |
| 4,907,946 A | 3/1990 | Ciokajlo et al. |
| 4,916,894 A | 4/1990 | Adamson et al. |
| 4,976,102 A | 12/1990 | Taylor |
| 5,054,998 A | 10/1991 | Davenport |
| 5,190,441 A | 3/1993 | Murphy et al. |
| 5,197,855 A | 3/1993 | Magliozzi et al. |
| 5,259,187 A | 11/1993 | Dunbar et al. |
| 5,261,227 A | 11/1993 | Giffin, III |
| 5,345,760 A | 9/1994 | Giffin, III |
| 5,457,346 A | 10/1995 | Blumberg et al. |
| 5,950,308 A | 9/1999 | Koff et al. |
| 6,339,927 B1 | 1/2002 | DiPietro, Jr. |
| 6,547,518 B1 | 4/2003 | Czachor et al. |
| 6,763,654 B2 | 7/2004 | Orlando et al. |
| 6,792,758 B2 | 9/2004 | Dowman |
| 7,559,191 B2 | 7/2009 | Parks |
| 7,658,063 B1 | 2/2010 | Matheny |
| 7,762,766 B2 | 7/2010 | Shteyman et al. |
| 8,256,202 B1 | 9/2012 | Paulino |
| 8,276,392 B2 | 10/2012 | van der Woude |
| 8,382,430 B2 | 2/2013 | Parry et al. |
| 8,459,035 B2 | 6/2013 | Smith et al. |
| 8,689,538 B2 | 4/2014 | Sankrithi et al. |
| 8,762,766 B2 | 6/2014 | Ferguson et al. |
| 8,876,465 B2 | 11/2014 | Stretton |
| 8,910,465 B2 | 12/2014 | Snyder |
| 8,943,796 B2 | 2/2015 | McCaffrey |
| 8,967,967 B2 | 3/2015 | Stretton et al. |
| 9,017,028 B2 | 4/2015 | Fabre |
| 9,045,996 B2 | 6/2015 | Anghel et al. |
| 9,057,328 B2 | 6/2015 | Kupratis |
| 9,096,312 B2 | 8/2015 | Moxon |
| 9,097,134 B2 | 8/2015 | Ferch et al. |
| 9,534,538 B1 | 1/2017 | Cerny |
| 9,677,501 B2 | 6/2017 | Pierluissi et al. |
| 9,759,160 B2 | 9/2017 | Sankrithi et al. |
| 9,845,768 B2 | 12/2017 | Pesyna et al. |
| 9,982,555 B2 | 5/2018 | Thet et al. |
| 9,995,314 B2 | 6/2018 | Miller et al. |
| 10,077,660 B2 | 9/2018 | Hoefer et al. |
| 10,090,676 B2 | 10/2018 | Knowles et al. |
| 10,126,062 B2 | 11/2018 | Cerny et al. |
| 10,184,400 B2 | 1/2019 | Cerny et al. |
| 10,202,865 B2 | 2/2019 | Breeze-Stringfellow et al. |
| 10,253,648 B2 | 4/2019 | Bentley et al. |
| 10,260,419 B2 | 4/2019 | Cerny et al. |
| 10,263,550 B2 | 4/2019 | Thet et al. |
| 10,344,674 B2 | 7/2019 | Cerny et al. |
| 10,364,750 B2 | 7/2019 | Rambo |
| 10,443,436 B2 | 10/2019 | Miller et al. |
| 10,487,739 B2 | 11/2019 | Miller et al. |
| 10,644,630 B2 | 5/2020 | Smith et al. |
| 10,787,996 B2 | 9/2020 | Kupratis et al. |
| 2004/0197187 A1 | 10/2004 | Usab et al. |
| 2004/0234372 A1 | 11/2004 | Shahpar |
| 2005/0109012 A1 | 5/2005 | Johnson |
| 2005/0241292 A1 | 11/2005 | Taylor et al. |
| 2007/0186535 A1 | 8/2007 | Powell et al. |
| 2007/0251212 A1 | 11/2007 | Tester |
| 2009/0078819 A1 | 3/2009 | Guering et al. |
| 2009/0090096 A1 | 4/2009 | Sheridan |
| 2010/0014977 A1 | 1/2010 | Shattuck |
| 2010/0111674 A1 | 5/2010 | Sparks |
| 2010/0251726 A1 | 10/2010 | Jones et al. |
| 2010/0326050 A1 | 12/2010 | Schilling et al. |
| 2010/0329856 A1 | 12/2010 | Hofer et al. |
| 2011/0150659 A1 | 6/2011 | Micheli et al. |
| 2011/0192166 A1 | 8/2011 | Mulcaire |
| 2012/0177493 A1 | 7/2012 | Fabre |
| 2013/0098050 A1 | 4/2013 | Kupratis |
| 2013/0104521 A1 | 5/2013 | Kupratis |
| 2013/0104522 A1 | 5/2013 | Kupratis |
| 2013/0104560 A1 | 5/2013 | Kupratis |
| 2014/0133982 A1 | 5/2014 | Dejeu et al. |
| 2014/0345253 A1 | 11/2014 | Dawson et al. |
| 2014/0345254 A1 | 11/2014 | Dawson et al. |
| 2015/0003993 A1 | 1/2015 | Kim et al. |
| 2015/0098813 A1 | 4/2015 | Jarrett, Jr. |
| 2015/0121893 A1 | 5/2015 | Kupratis |
| 2015/0284070 A1 | 10/2015 | Breeze-Stringfellow et al. |
| 2015/0291276 A1 | 10/2015 | Zatorski et al. |
| 2016/0010487 A1 | 1/2016 | Breeze-Stringfellow et al. |
| 2016/0053692 A1 | 2/2016 | Izquierdo |
| 2016/0090863 A1 | 3/2016 | Diaz et al. |
| 2016/0160647 A1 | 6/2016 | Hofer et al. |
| 2016/0230658 A1 | 8/2016 | Hanlon et al. |
| 2016/0298550 A1 | 10/2016 | Kupratis et al. |
| 2016/0333734 A1 | 11/2016 | Bowden et al. |
| 2016/0347463 A1 | 12/2016 | Negulescu |
| 2017/0051678 A1 | 2/2017 | Becker, Jr. |
| 2017/0051680 A1 | 2/2017 | Becker, Jr. et al. |
| 2017/0102006 A1 | 4/2017 | Miller et al. |
| 2017/0114721 A1 | 4/2017 | Miller et al. |
| 2017/0167382 A1 | 6/2017 | Miller et al. |
| 2017/0184027 A1 | 6/2017 | Moniz et al. |
| 2017/0198719 A1 | 7/2017 | Cerny et al. |
| 2018/0065727 A1 | 3/2018 | Gruber et al. |
| 2018/0118364 A1 | 5/2018 | Golshany et al. |
| 2018/0215475 A1 | 8/2018 | Hurt et al. |
| 2018/0283795 A1 | 10/2018 | Cerny et al. |
| 2019/0136710 A1 | 5/2019 | Breeze-Stringfellow et al. |
| 2019/0153952 A1 | 5/2019 | Niergarth et al. |
| 2019/0153953 A1 | 5/2019 | Niergarth et al. |
| 2019/0218971 A1 | 7/2019 | Niergarth et al. |
| 2019/0249599 A1 | 8/2019 | Sen et al. |
| 2019/0257247 A1 | 8/2019 | Pal et al. |
| 2019/0360401 A1 | 11/2019 | Rambo et al. |
| 2020/0025109 A1 | 1/2020 | Stieger et al. |
| 2020/0095939 A1 | 3/2020 | Epstein |
| 2020/0116104 A1 | 4/2020 | Levisse et al. |
| 2020/0332718 A1 | 10/2020 | Rambo |
| 2021/0108573 A1 | 4/2021 | Sibbach et al. |
| 2021/0108595 A1 | 4/2021 | Khalid et al. |
| 2021/0108597 A1 | 4/2021 | Ostdiek et al. |
| 2022/0042463 A1 | 2/2022 | Molesini et al. |
| 2022/0056811 A1 | 2/2022 | Molesini et al. |

FOREIGN PATENT DOCUMENTS

| | | |
|---|---|---|
| DE | 1081277 B | 5/1960 |
| EP | 0385913 A1 | 9/1990 |
| EP | 0887259 A2 | 12/1998 |

(56) References Cited

FOREIGN PATENT DOCUMENTS

| | | | |
|---|---|---|---|
| EP | 1493900 | A2 | 1/2005 |
| EP | 1988274 | A2 | 11/2008 |
| EP | 2540989 | A2 | 1/2013 |
| EP | 2562082 | A2 | 2/2013 |
| EP | 3093443 | A1 | 11/2016 |
| GB | 2100799 | A | 1/1983 |
| GB | 2196390 | A | 4/1988 |
| GB | 2461811 | A | 1/2010 |
| JP | H0370698 | A | 3/1991 |
| JP | 2006123880 | A | 5/2006 |
| JP | 2009508748 | A | 3/2009 |
| JP | 2011527263 | A | 10/2011 |
| KR | 101179277 | B1 | 9/2012 |
| WO | WO2004/033295 | A1 | 4/2004 |
| WO | WO2005/111413 | A1 | 11/2005 |
| WO | WO2011/020458 | A2 | 2/2011 |
| WO | WO2011/094477 | A2 | 8/2011 |
| WO | WO2011/107320 | A1 | 9/2011 |
| WO | WO2014/143248 | A1 | 9/2014 |

OTHER PUBLICATIONS

Naveen et al., CFD Analysis of Low Pressure Turbine Blade Using Vortex Generator Jets, Proceedings of $7^{th}$ International Conference on Intelligent Systems and Control (ISCO 2013) IEEE Explore, Coimbatore, Tamil Nadu, India, Jan. 4-5, 2013, pp. 541-544. https://ieeexplore.ieee.org/document/6481213.

Smith Jr, Unducted Fan Aerodynamic Design, Journal of Turbomachinery, vol. 109, Jul. 1987, pp. 313-324.

Theodorsen, Theory of Propellers, Wartime Report, NACA (National Advisory Committee for Aeronautics), Aug. 1944, pp. 1-53.

Yamamoto et al., Numerical Calculation of Propfan/Swirl Recovery Vane Flow Field, AIAA-92-3771, AIAA//SAE/ASME/ASEE 28th Joint Propulsion Conference and Exhibit, Jul. 6-8, 1992, Nashville TN, pp. 1-9.

| R1/R3 | TPAR | CBR | RqRPrim.-FAN | RqRSec.-FAN |
|---|---|---|---|---|
| 1.489 | 4.7 | 1.41 | 0.25 | 0.60 |
| 1.581 | 4.9 | 1.01 | 0.25 | 0.60 |
| 1.663 | 5.1 | 0.65 | 0.25 | 0.60 |
| 1.758 | 5.2 | 0.35 | 0.25 | 0.60 |
| 1.420 | 7.6 | 2.31 | 0.25 | 0.60 |
| 1.508 | 7.8 | 1.63 | 0.25 | 0.60 |
| 1.587 | 8.0 | 1.04 | 0.25 | 0.60 |
| 1.677 | 8.1 | 0.56 | 0.25 | 0.60 |
| 1.930 | 8.2 | 0.11 | 0.25 | 0.60 |
| 1.330 | 12.2 | 3.82 | 0.25 | 0.60 |
| 1.412 | 12.4 | 2.66 | 0.25 | 0.60 |
| 1.486 | 12.6 | 1.68 | 0.25 | 0.60 |
| 1.581 | 12.7 | 0.99 | 0.30 | 0.60 |
| 1.610 | 12.7 | 0.99 | 0.35 | 0.60 |
| 1.610 | 12.7 | 0.99 | 0.35 | 0.60 |
| 1.812 | 12.7 | 0.99 | 0.25 | 0.55 |
| 1.839 | 12.7 | 0.99 | 0.30 | 0.55 |
| 1.873 | 12.7 | 0.99 | 0.35 | 0.55 |
| 1.873 | 12.7 | 0.99 | 0.35 | 0.55 |
| 1.223 | 12.7 | 0.99 | 0.25 | 0.65 |
| 1.242 | 12.7 | 0.99 | 0.30 | 0.65 |
| 1.264 | 12.7 | 0.99 | 0.35 | 0.65 |
| 1.264 | 12.7 | 0.99 | 0.35 | 0.65 |
| 1.570 | 12.7 | 0.91 | 0.25 | 0.60 |
| 1.628 | 12.7 | 0.71 | 0.30 | 0.60 |
| 1.658 | 12.7 | 0.71 | 0.35 | 0.60 |
| 1.658 | 12.7 | 0.71 | 0.35 | 0.60 |
| 1.876 | 12.7 | 0.71 | 0.25 | 0.55 |
| 1.904 | 12.7 | 0.71 | 0.30 | 0.55 |
| 1.939 | 12.7 | 0.71 | 0.35 | 0.55 |
| 1.939 | 12.7 | 0.71 | 0.35 | 0.55 |
| 1.242 | 12.7 | 0.71 | 0.25 | 0.65 |
| 1.260 | 12.7 | 0.71 | 0.30 | 0.65 |
| 1.283 | 12.7 | 0.71 | 0.35 | 0.65 |
| 1.283 | 12.7 | 0.71 | 0.35 | 0.65 |
| 1.702 | 12.8 | 0.42 | 0.30 | 0.60 |
| 1.733 | 12.8 | 0.42 | 0.35 | 0.60 |
| 1.733 | 12.8 | 0.42 | 0.35 | 0.60 |
| 1.973 | 12.8 | 0.42 | 0.25 | 0.55 |
| 2.003 | 12.8 | 0.42 | 0.30 | 0.55 |
| 2.039 | 12.8 | 0.42 | 0.35 | 0.55 |
| 2.039 | 12.8 | 0.42 | 0.35 | 0.55 |
| 1.278 | 12.8 | 0.42 | 0.25 | 0.65 |
| 1.298 | 12.8 | 0.42 | 0.30 | 0.65 |

FIG. 4A

| R1/R3 | TPAR | CBR | RqRPrim.-FAN | RqRSec.-FAN |
|---|---|---|---|---|
| 1.321 | 12.8 | 0.42 | 0.35 | 0.65 |
| 1.321 | 12.8 | 0.42 | 0.35 | 0.65 |
| 1.812 | 12.8 | 0.17 | 0.25 | 0.60 |
| 1.839 | 12.8 | 0.17 | 0.30 | 0.60 |
| 1.873 | 12.8 | 0.17 | 0.35 | 0.60 |
| 1.873 | 12.8 | 0.17 | 0.35 | 0.60 |
| 2.144 | 12.8 | 0.17 | 0.25 | 0.55 |
| 2.176 | 12.8 | 0.17 | 0.30 | 0.55 |
| 2.216 | 12.8 | 0.17 | 0.35 | 0.55 |
| 2.216 | 12.8 | 0.17 | 0.35 | 0.55 |
| 1.362 | 12.8 | 0.17 | 0.25 | 0.65 |
| 1.383 | 12.8 | 0.17 | 0.30 | 0.65 |
| 1.408 | 12.8 | 0.17 | 0.35 | 0.65 |
| 1.408 | 12.8 | 0.17 | 0.35 | 0.65 |
| 2.492 | 13.2 | 2.84 | 0.25 | 0.60 |
| 2.295 | 13.3 | 2.99 | 0.25 | 0.60 |
| 2.010 | 13.5 | 3.26 | 0.25 | 0.60 |
| 1.788 | 13.7 | 3.55 | 0.25 | 0.60 |
| 2.671 | 13.8 | 2.11 | 0.30 | 0.60 |
| 2.720 | 13.8 | 2.11 | 0.35 | 0.60 |
| 2.720 | 13.8 | 2.11 | 0.35 | 0.60 |
| 2.969 | 13.8 | 2.11 | 0.25 | 0.55 |
| 3.013 | 13.8 | 2.11 | 0.30 | 0.55 |
| 3.068 | 13.8 | 2.11 | 0.35 | 0.55 |
| 3.068 | 13.8 | 2.11 | 0.35 | 0.55 |
| 2.209 | 13.8 | 2.11 | 0.25 | 0.65 |
| 2.242 | 13.8 | 2.11 | 0.30 | 0.65 |
| 2.283 | 13.8 | 2.11 | 0.35 | 0.65 |
| 2.283 | 13.8 | 2.11 | 0.35 | 0.65 |
| 2.647 | 13.9 | 2.03 | 0.25 | 0.60 |
| 2.780 | 14.2 | 1.54 | 0.30 | 0.60 |
| 2.831 | 14.2 | 1.54 | 0.35 | 0.60 |
| 2.831 | 14.2 | 1.54 | 0.35 | 0.60 |
| 3.129 | 14.2 | 1.54 | 0.25 | 0.55 |
| 3.176 | 14.2 | 1.54 | 0.30 | 0.55 |
| 3.234 | 14.2 | 1.54 | 0.35 | 0.55 |
| 3.234 | 14.2 | 1.54 | 0.35 | 0.55 |
| 2.239 | 14.2 | 1.54 | 0.25 | 0.65 |
| 2.273 | 14.2 | 1.54 | 0.30 | 0.65 |
| 2.314 | 14.2 | 1.54 | 0.35 | 0.65 |
| 2.314 | 14.2 | 1.54 | 0.35 | 0.65 |
| 2.783 | 14.4 | 1.32 | 0.25 | 0.60 |
| 2.920 | 14.6 | 0.93 | 0.30 | 0.60 |
| 2.973 | 14.6 | 0.93 | 0.35 | 0.60 |

FIG. 4B

| R1/R3 | TPAR | CBR | RqrPrim.-FAN | RqrSec.-FAN |
|---|---|---|---|---|
| 2.973 | 14.6 | 0.93 | 0.35 | 0.60 |
| 3.334 | 14.6 | 0.93 | 0.25 | 0.55 |
| 3.384 | 14.6 | 0.93 | 0.30 | 0.55 |
| 3.446 | 14.6 | 0.93 | 0.35 | 0.55 |
| 3.446 | 14.6 | 0.93 | 0.35 | 0.55 |
| 2.277 | 14.6 | 0.93 | 0.25 | 0.65 |
| 2.311 | 14.6 | 0.93 | 0.30 | 0.65 |
| 2.354 | 14.6 | 0.93 | 0.35 | 0.65 |
| 2.354 | 14.6 | 0.93 | 0.35 | 0.65 |
| 2.942 | 14.8 | 0.72 | 0.25 | 0.60 |
| 3.376 | 15.1 | 0.14 | 0.25 | 0.60 |
| 3.427 | 15.1 | 0.14 | 0.30 | 0.60 |
| 3.490 | 15.1 | 0.14 | 0.35 | 0.60 |
| 3.490 | 15.1 | 0.14 | 0.35 | 0.60 |
| 3.994 | 15.1 | 0.14 | 0.25 | 0.55 |
| 4.054 | 15.1 | 0.14 | 0.30 | 0.55 |
| 4.129 | 15.1 | 0.14 | 0.35 | 0.55 |
| 4.129 | 15.1 | 0.14 | 0.35 | 0.55 |
| 2.540 | 15.1 | 0.14 | 0.25 | 0.65 |
| 2.625 | 15.1 | 0.14 | 0.35 | 0.65 |
| 1.271 | 15.5 | 4.98 | 0.25 | 0.60 |
| 1.348 | 15.7 | 3.46 | 0.25 | 0.60 |
| 1.419 | 15.8 | 2.18 | 0.25 | 0.60 |
| 1.499 | 15.9 | 1.17 | 0.25 | 0.60 |
| 1.735 | 16.0 | 0.21 | 0.25 | 0.60 |
| 2.703 | 16.6 | 3.37 | 0.25 | 0.60 |
| 2.476 | 16.7 | 3.51 | 0.25 | 0.60 |
| 2.146 | 16.9 | 3.86 | 0.25 | 0.60 |
| 2.833 | 17.0 | 2.84 | 0.30 | 0.60 |
| 2.885 | 17.0 | 2.84 | 0.35 | 0.60 |
| 2.885 | 17.0 | 2.84 | 0.35 | 0.60 |
| 3.126 | 17.0 | 2.84 | 0.25 | 0.55 |
| 3.173 | 17.0 | 2.84 | 0.30 | 0.55 |
| 3.232 | 17.0 | 2.84 | 0.35 | 0.55 |
| 3.232 | 17.0 | 2.84 | 0.35 | 0.55 |
| 2.373 | 17.0 | 2.84 | 0.25 | 0.65 |
| 2.408 | 17.0 | 2.84 | 0.30 | 0.65 |
| 2.453 | 17.0 | 2.84 | 0.35 | 0.65 |
| 2.453 | 17.0 | 2.84 | 0.35 | 0.65 |
| 1.888 | 17.2 | 4.23 | 0.25 | 0.60 |
| 2.869 | 17.3 | 2.38 | 0.25 | 0.60 |
| 3.318 | 17.6 | 2.08 | 0.25 | 0.55 |
| 3.368 | 17.6 | 2.08 | 0.30 | 0.55 |
| 3.430 | 17.6 | 2.08 | 0.35 | 0.55 |

FIG. 4C

| R1/R3 | TPAR | CBR | RqRPrim.-FAN | RqRSec.-FAN |
|---|---|---|---|---|
| 3.430 | 17.6 | 2.08 | 0.35 | 0.55 |
| 2.415 | 17.6 | 2.08 | 0.25 | 0.65 |
| 2.452 | 17.6 | 2.08 | 0.30 | 0.65 |
| 2.497 | 17.6 | 2.08 | 0.35 | 0.65 |
| 2.497 | 17.6 | 2.08 | 0.35 | 0.65 |
| 3.019 | 17.9 | 1.54 | 0.25 | 0.60 |
| 3.123 | 18.1 | 1.26 | 0.30 | 0.60 |
| 3.181 | 18.1 | 1.26 | 0.35 | 0.60 |
| 3.181 | 18.1 | 1.26 | 0.35 | 0.60 |
| 3.554 | 18.1 | 1.26 | 0.25 | 0.55 |
| 3.607 | 18.1 | 1.26 | 0.30 | 0.55 |
| 3.673 | 18.1 | 1.26 | 0.35 | 0.55 |
| 3.673 | 18.1 | 1.26 | 0.35 | 0.55 |
| 2.457 | 18.1 | 1.26 | 0.25 | 0.65 |
| 2.494 | 18.1 | 1.26 | 0.30 | 0.65 |
| 2.540 | 18.1 | 1.26 | 0.35 | 0.65 |
| 2.540 | 18.1 | 1.26 | 0.35 | 0.65 |
| 3.190 | 18.4 | 0.84 | 0.25 | 0.60 |
| 3.376 | 18.6 | 0.52 | 0.30 | 0.60 |
| 3.962 | 18.6 | 0.52 | 0.30 | 0.55 |
| 4.034 | 18.6 | 0.52 | 0.35 | 0.55 |
| 4.034 | 18.6 | 0.52 | 0.35 | 0.55 |
| 2.555 | 18.6 | 0.52 | 0.25 | 0.65 |
| 2.593 | 18.6 | 0.52 | 0.30 | 0.65 |
| 2.641 | 18.6 | 0.52 | 0.35 | 0.65 |
| 2.641 | 18.6 | 0.52 | 0.35 | 0.65 |
| 3.579 | 18.8 | 0.26 | 0.30 | 0.60 |
| 3.645 | 18.8 | 0.26 | 0.35 | 0.60 |
| 3.645 | 18.8 | 0.26 | 0.35 | 0.60 |
| 4.162 | 18.8 | 0.26 | 0.25 | 0.55 |
| 4.225 | 18.8 | 0.26 | 0.30 | 0.55 |
| 4.302 | 18.8 | 0.26 | 0.35 | 0.55 |
| 4.302 | 18.8 | 0.26 | 0.35 | 0.55 |
| 2.668 | 18.8 | 0.26 | 0.25 | 0.65 |
| 2.708 | 18.8 | 0.26 | 0.30 | 0.65 |
| 2.757 | 18.8 | 0.26 | 0.35 | 0.65 |
| 2.757 | 18.8 | 0.26 | 0.35 | 0.65 |
| 3.683 | 18.8 | 0.16 | 0.25 | 0.60 |
| 3.797 | 18.8 | 0.13 | 0.30 | 0.60 |
| 3.867 | 18.8 | 0.13 | 0.35 | 0.60 |
| 3.867 | 18.8 | 0.13 | 0.35 | 0.60 |
| 4.578 | 18.8 | 0.13 | 0.35 | 0.55 |
| 4.578 | 18.8 | 0.13 | 0.35 | 0.55 |
| 2.807 | 18.8 | 0.13 | 0.25 | 0.65 |

FIG. 4D

| R1/R3 | TPAR | CBR | RqRPrim.-FAN | RqRSec.-FAN |
|---|---|---|---|---|
| 2.849 | 18.8 | 0.13 | 0.30 | 0.65 |
| 2.902 | 18.8 | 0.13 | 0.35 | 0.65 |
| 2.902 | 18.8 | 0.13 | 0.35 | 0.65 |
| 3.018 | 21.8 | 3.94 | 0.25 | 0.60 |
| 2.746 | 21.9 | 4.17 | 0.25 | 0.60 |
| 2.349 | 22.1 | 4.63 | 0.25 | 0.60 |
| 2.039 | 22.4 | 5.12 | 0.25 | 0.60 |
| 3.205 | 22.6 | 2.80 | 0.25 | 0.60 |
| 3.372 | 23.3 | 1.80 | 0.25 | 0.60 |
| 3.563 | 23.9 | 0.99 | 0.25 | 0.60 |
| 4.108 | 24.4 | 0.19 | 0.25 | 0.60 |
| 3.273 | 26.1 | 4.35 | 0.25 | 0.60 |
| 2.965 | 26.2 | 4.63 | 0.25 | 0.60 |
| 2.515 | 26.4 | 5.16 | 0.25 | 0.60 |
| 2.162 | 26.7 | 5.75 | 0.25 | 0.60 |
| 3.473 | 27.0 | 3.10 | 0.25 | 0.60 |
| 3.656 | 27.8 | 1.99 | 0.25 | 0.60 |
| 3.867 | 28.4 | 1.07 | 0.25 | 0.60 |
| 4.428 | 28.9 | 0.22 | 0.25 | 0.60 |
| 2.674 | 30.5 | 5.59 | 0.25 | 0.60 |
| 2.281 | 30.8 | 6.27 | 0.25 | 0.60 |
| 3.732 | 31.2 | 3.32 | 0.25 | 0.60 |
| 3.927 | 32.0 | 2.13 | 0.25 | 0.60 |
| 4.150 | 32.7 | 1.16 | 0.25 | 0.60 |
| 4.788 | 33.3 | 0.22 | 0.25 | 0.60 |
| 3.799 | 35.1 | 5.03 | 0.25 | 0.60 |
| 3.420 | 35.2 | 5.35 | 0.25 | 0.60 |
| 2.862 | 35.4 | 6.02 | 0.25 | 0.60 |
| 3.959 | 35.5 | 4.41 | 0.30 | 0.60 |
| 4.032 | 35.5 | 4.41 | 0.35 | 0.60 |
| 4.032 | 35.5 | 4.41 | 0.35 | 0.60 |
| 4.362 | 35.5 | 4.41 | 0.25 | 0.55 |
| 4.427 | 35.5 | 4.41 | 0.30 | 0.55 |
| 4.508 | 35.5 | 4.41 | 0.35 | 0.55 |
| 4.508 | 35.5 | 4.41 | 0.35 | 0.55 |
| 3.327 | 35.5 | 4.41 | 0.25 | 0.65 |
| 3.377 | 35.5 | 4.41 | 0.30 | 0.65 |
| 3.439 | 35.5 | 4.41 | 0.35 | 0.65 |
| 3.439 | 35.5 | 4.41 | 0.35 | 0.65 |
| 2.427 | 35.7 | 6.79 | 0.25 | 0.60 |
| 4.035 | 36.2 | 3.55 | 0.25 | 0.60 |
| 4.682 | 36.5 | 3.02 | 0.25 | 0.55 |
| 4.752 | 36.5 | 3.02 | 0.30 | 0.55 |
| 4.839 | 36.5 | 3.02 | 0.35 | 0.55 |

FIG. 4E

| R1/R3 | TPAR | CBR | RqRPrim.-FAN | RqRSec.-FAN |
|---|---|---|---|---|
| 4.839 | 36.5 | 3.02 | 0.35 | 0.55 |
| 3.400 | 36.5 | 3.02 | 0.25 | 0.65 |
| 3.451 | 36.5 | 3.02 | 0.30 | 0.65 |
| 3.514 | 36.5 | 3.02 | 0.35 | 0.65 |
| 3.514 | 36.5 | 3.02 | 0.35 | 0.65 |
| 4.245 | 37.0 | 2.27 | 0.25 | 0.60 |
| 4.464 | 37.5 | 1.55 | 0.30 | 0.60 |
| 4.546 | 37.5 | 1.55 | 0.35 | 0.60 |
| 4.546 | 37.5 | 1.55 | 0.35 | 0.60 |
| 5.101 | 37.5 | 1.55 | 0.25 | 0.55 |
| 5.177 | 37.5 | 1.55 | 0.30 | 0.55 |
| 5.272 | 37.5 | 1.55 | 0.35 | 0.55 |
| 5.272 | 37.5 | 1.55 | 0.35 | 0.55 |
| 3.477 | 37.5 | 1.55 | 0.25 | 0.65 |
| 3.529 | 37.5 | 1.55 | 0.30 | 0.65 |
| 3.594 | 37.5 | 1.55 | 0.35 | 0.65 |
| 3.594 | 37.5 | 1.55 | 0.35 | 0.65 |
| 4.487 | 37.7 | 1.23 | 0.25 | 0.60 |
| 5.162 | 38.3 | 0.24 | 0.25 | 0.60 |
| 6.208 | 38.4 | 0.20 | 0.25 | 0.55 |
| 6.301 | 38.4 | 0.20 | 0.30 | 0.55 |
| 6.417 | 38.4 | 0.20 | 0.35 | 0.55 |
| 6.417 | 38.4 | 0.20 | 0.35 | 0.55 |
| 3.936 | 38.4 | 0.20 | 0.25 | 0.65 |
| 3.995 | 38.4 | 0.20 | 0.30 | 0.65 |
| 4.069 | 38.4 | 0.20 | 0.35 | 0.65 |
| 4.069 | 38.4 | 0.20 | 0.35 | 0.65 |
| 4.185 | 41.8 | 5.36 | 0.25 | 0.60 |
| 3.754 | 41.9 | 5.73 | 0.25 | 0.60 |
| 3.118 | 42.1 | 6.48 | 0.25 | 0.60 |
| 2.616 | 42.5 | 7.36 | 0.25 | 0.60 |
| 4.446 | 42.9 | 3.77 | 0.25 | 0.60 |
| 4.677 | 43.8 | 2.41 | 0.25 | 0.60 |
| 4.943 | 44.5 | 1.30 | 0.25 | 0.60 |
| 5.664 | 45.2 | 0.26 | 0.25 | 0.60 |
| 4.577 | 48.6 | 5.59 | 0.25 | 0.60 |
| 4.092 | 48.7 | 5.99 | 0.25 | 0.60 |
| 3.378 | 48.9 | 6.81 | 0.25 | 0.60 |
| 2.814 | 49.3 | 7.77 | 0.25 | 0.60 |
| 4.859 | 49.7 | 3.92 | 0.25 | 0.60 |
| 5.112 | 50.7 | 2.50 | 0.25 | 0.60 |
| 5.158 | 56.5 | 6.05 | 0.35 | 0.60 |
| 5.158 | 56.5 | 6.05 | 0.35 | 0.60 |
| 5.528 | 56.5 | 6.05 | 0.25 | 0.55 |

FIG. 4F

| R1/R3 | TPAR | CBR | RqRPrim.-FAN | RqRSec.-FAN |
|---|---|---|---|---|
| 5.611 | 56.5 | 6.05 | 0.30 | 0.55 |
| 5.713 | 56.5 | 6.05 | 0.35 | 0.55 |
| 5.713 | 56.5 | 6.05 | 0.35 | 0.55 |
| 4.331 | 56.5 | 6.05 | 0.25 | 0.65 |
| 4.396 | 56.5 | 6.05 | 0.30 | 0.65 |
| 4.477 | 56.5 | 6.05 | 0.35 | 0.65 |
| 4.477 | 56.5 | 6.05 | 0.35 | 0.65 |
| 5.048 | 56.7 | 5.75 | 0.25 | 0.60 |
| 4.502 | 56.8 | 6.17 | 0.25 | 0.60 |
| 3.696 | 57.1 | 7.05 | 0.25 | 0.60 |
| 3.057 | 57.5 | 8.10 | 0.25 | 0.60 |
| 5.359 | 57.9 | 4.02 | 0.25 | 0.60 |
| 5.524 | 58.2 | 3.56 | 0.30 | 0.60 |
| 5.626 | 58.2 | 3.56 | 0.35 | 0.60 |
| 5.626 | 58.2 | 3.56 | 0.35 | 0.60 |
| 6.179 | 58.2 | 3.56 | 0.25 | 0.55 |
| 6.272 | 58.2 | 3.56 | 0.30 | 0.55 |
| 6.387 | 58.2 | 3.56 | 0.35 | 0.55 |
| 6.387 | 58.2 | 3.56 | 0.35 | 0.55 |
| 4.659 | 58.2 | 3.56 | 0.35 | 0.65 |
| 4.659 | 58.2 | 3.56 | 0.35 | 0.65 |
| 5.638 | 58.8 | 2.56 | 0.25 | 0.60 |
| 5.907 | 59.3 | 1.81 | 0.30 | 0.60 |
| 6.015 | 59.3 | 1.81 | 0.35 | 0.60 |
| 6.015 | 59.3 | 1.81 | 0.35 | 0.60 |
| 6.743 | 59.3 | 1.81 | 0.25 | 0.55 |
| 6.844 | 59.3 | 1.81 | 0.30 | 0.55 |
| 6.970 | 59.3 | 1.81 | 0.35 | 0.55 |
| 6.970 | 59.3 | 1.81 | 0.35 | 0.55 |
| 4.611 | 59.3 | 1.81 | 0.25 | 0.65 |
| 4.680 | 59.3 | 1.81 | 0.30 | 0.65 |
| 4.766 | 59.3 | 1.81 | 0.35 | 0.65 |
| 4.766 | 59.3 | 1.81 | 0.35 | 0.65 |
| 5.959 | 59.6 | 1.38 | 0.25 | 0.60 |
| 6.766 | 60.2 | 0.37 | 0.30 | 0.60 |
| 6.890 | 60.2 | 0.37 | 0.35 | 0.60 |
| 6.890 | 60.2 | 0.37 | 0.35 | 0.60 |
| 7.874 | 60.2 | 0.37 | 0.25 | 0.55 |
| 7.993 | 60.2 | 0.37 | 0.30 | 0.55 |
| 8.139 | 60.2 | 0.37 | 0.35 | 0.55 |
| 8.139 | 60.2 | 0.37 | 0.35 | 0.55 |
| 5.201 | 60.2 | 0.37 | 0.35 | 0.65 |
| 6.863 | 60.2 | 0.26 | 0.25 | 0.60 |
| 5.856 | 70.3 | 5.79 | 0.25 | 0.60 |

FIG. 4G

| R1/R3 | TPAR | CBR | RqRPrim.-FAN | RqRSec.-FAN |
|---|---|---|---|---|
| 5.205 | 70.4 | 6.24 | 0.25 | 0.60 |
| 4.745 | 70.7 | 7.16 | 0.25 | 0.60 |
| 3.483 | 71.2 | 8.29 | 0.25 | 0.60 |
| 6.217 | 71.4 | 4.04 | 0.25 | 0.60 |
| 6.541 | 72.3 | 2.55 | 0.25 | 0.60 |
| 6.913 | 73.0 | 1.38 | 0.25 | 0.60 |
| 7.962 | 73.7 | 0.26 | 0.25 | 0.60 |

FIG. 4H

GAS TURBINE ENGINE WITH THIRD STREAM

CROSS-REFERENCE TO RELATED APPLICATIONS

This application is a continuation in part application of U.S. application Ser. No. 18/888,873, filed Sep. 18, 2024, which is a continuation in part application of U.S. application Ser. No. 18/675,270, filed May 28, 2024, which is a continuation application of U.S. application Ser. No. 17/879,384 filed Aug. 2, 2022. Each of these applications is hereby incorporated by reference in their entireties.

FIELD

The present disclosure relates to a gas turbine engine with a third stream.

BACKGROUND

A gas turbine engine typically includes a fan and a turbomachine. The turbomachine generally includes an inlet, one or more compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as for producing useful work to propel an aircraft in flight. The turbomachine is mechanically coupled to the fan for driving the fan during operation.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIGS. 4A through 4H are tables depicting numerical values showing the relationships between various parameters in accordance with various example embodiments of the present disclosure.

DETAILED DESCRIPTION

Figure 1:
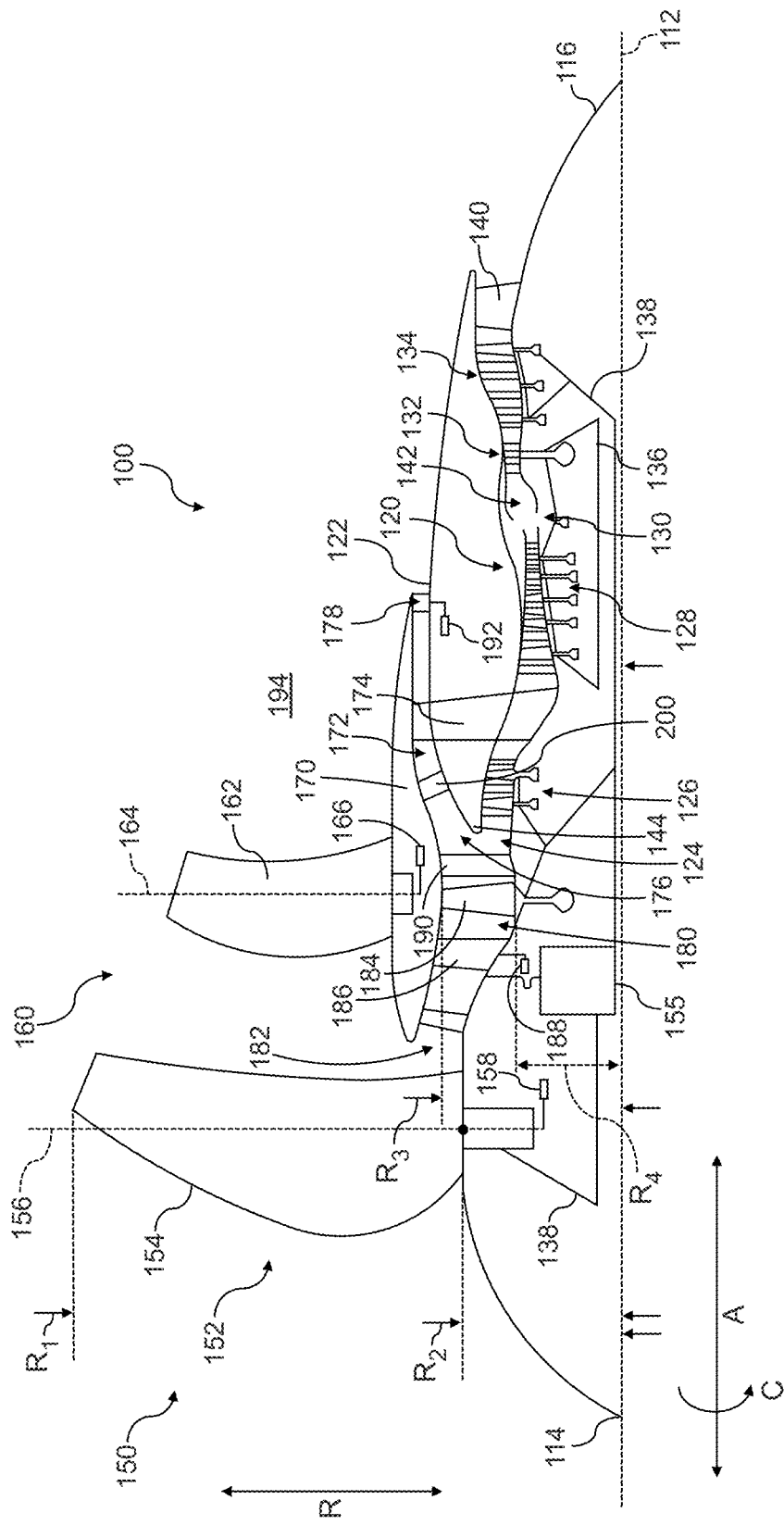
FIG. 1 is a schematic cross-sectional view of a three-stream engine in accordance with an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The phrases "from X to Y" and "between X and Y" each refers to a range of values inclusive of the endpoints (i.e., refers to a range of values that includes both X and Y).

A "third stream" as used herein means a non-primary air stream capable of increasing fluid energy to produce a minority of total propulsion system thrust. A pressure ratio of the third stream may be higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degrees Fahrenheit ambient temperature operating conditions.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

The term "bypass passage" refers generally to a passage with an airflow from a fan of the gas turbine engine that flows over an upstream-most inlet to a turbomachine of the gas turbine engine. In a ducted gas turbine engine, the bypass passage is the passage defined between an outer nacelle (surrounding the fan of the gas turbine engine) and one or more cowls inward of the outer nacelle (e.g., a fan cowl, a core cowl or both if both are present; see, e.g., FIGS. 7 through 9). In an unducted gas turbine engine, the bypass passage refers to an open sided passage (i.e., not explicitly defined by structure such as an outer nacelle) where airflow from the fan passes over an upstream-most inlet to the turbomachine (e.g., inlet 182 to inlet duct 180 in FIGS. 1 and 2), defined at least in part by a primary fan outer fan area, which refers to an area defined by an annulus representing a portion of the fan located outward of an inlet splitter at the upstream-most inlet to the turbomachine (e.g., inlet splitter 196 of the fan cowl 170 in the embodiment of FIGS. 1 and 2). An airflow through the bypass passage of a ducted or an unducted engine refers to all of the airflow from the fan that is not provided through the upstream-most inlet to the turbomachine.

The term "disk loading" refers to an average pressure change across a plurality of rotor blades of a rotor assembly, such as the average pressure change across a plurality of fan blades of a fan.

The term "rated speed" refers to an operating condition of an engine whereby the engine is operating in the maximum, full load operating condition that is rated by the manufacturer. For example, in an engine certified by the Federal Aviation Administration ("FAA"), the rated speed refers to a rotation speed of the engine during the highest sustainable and continuous power operation in the certification documents, such as a rotational speed of the gas turbine engine when operating under a maximum continuous operation.

The term "standard day operating condition" refers to ambient conditions of sea level altitude, 59 degrees Fahrenheit, and 60 percent relative humidity.

The term "propulsive efficiency" refers to an efficiency with which the energy contained in an engine's fuel is converted into kinetic energy for the vehicle incorporating the engine, to accelerate it, or to replace losses due to aerodynamic drag or gravity.

Generally, an aeronautical gas turbine engine includes a fan to provide a desired amount of thrust without overloading the fan blades (i.e., without increasing a disk loading of the fan blades of the fan beyond a certain threshold), and therefore to maintain a desired overall propulsive efficiency for the gas turbine engine. Conventional gas turbine engine design practice has been to provide an outer nacelle surrounding the fan to provide relatively efficient thrust for the gas turbine engine. Such a configuration, sometimes referred to as a turbofan engine configuration, may generally limit a permissible size of the fan (i.e., a diameter of the fan). However, the inventors of the present disclosure have found that gas turbine engine design is now driving the diameter of the fan higher to provide as much thrust for the gas turbine engine as possible from the fan to improve an overall propulsive efficiency of the gas turbine engine.

By increasing the fan diameter, an installation of the gas turbine engine becomes more difficult. In addition, if an outer nacelle is maintained, the outer nacelle may become weight prohibitive with some larger diameter fans. Further, as the need for gas turbine engines to provide more thrust continues, the thermal demands on the gas turbine engines correspondingly increases.

The inventors of the present disclosure found that for a three stream gas turbine engine having a primary fan and a secondary fan, with the secondary fan being a ducted fan providing an airflow to a third stream of the gas turbine engine, an overall propulsive efficiency of the gas turbine engine that results from providing a high diameter fan may be maintained at a high level, while reducing the size of the primary fan. Such a configuration may maintain a desired overall propulsive efficiently for the gas turbine engine, or unexpectedly may in fact increase the overall propulsive efficiency of the gas turbine engine.

The inventors proceeded in the manner of designing a gas turbine engine with given primary fan characteristics, secondary fan characteristics, and turbomachine characteristics; checking the propulsive efficiency of the designed gas turbine engine; redesigning the gas turbine engine with varying primary fan, secondary fan, and turbomachine characteristics; rechecking the propulsive efficiency of the redesigned gas turbine engine; etc. during the design of several different types of gas turbine engines, including the gas turbine engines described below with reference to FIGS. 1 and 6 through 10. During the course of this practice of studying/evaluating various primary fan characteristics, secondary fan characteristics, and turbomachine characteristics considered feasible for best satisfying mission requirements, it was discovered that certain relationships exist between a ratio of an airflow through the bypass passage and the third stream to an airflow through a core duct (referred to hereinbelow as a thrust to power airflow ratio), as well as between a ratio of an airflow through the third steam to the airflow through the core duct (referred to hereinbelow as a core bypass ratio). In particular, the inventors of the present disclosure have found that these ratios can be thought of as an indicator of the ability of a gas turbine engine to maintain or even improve upon a desired propulsive efficiency via the third stream and, additionally, indicating an improvement in the gas turbine engine's packaging concerns and weight concerns, and thermal management capabilities.

Referring now to FIG. 1, a schematic cross-sectional view of a gas turbine engine 100 is provided according to an example embodiment of the present disclosure. Particularly, FIG. 1 provides a gas turbine engine having a rotor assembly with a single stage of unducted rotor blades. In such a manner, the rotor assembly may be referred to herein as an "unducted fan," or the entire engine 100 may be referred to as an "unducted gas turbine engine." In addition, the engine 100 of FIG. 1 includes a third stream extending from the compressor section to a rotor assembly flowpath over the turbomachine, as will be explained in more detail below.

For reference, the engine 100 defines an axial direction A, a radial direction R, and a circumferential direction C. Moreover, the engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The engine 100 extends between a forward end 114 and an aft end 116, e.g., along the axial direction A.

The engine 100 includes a turbomachine 120 and a rotor assembly, also referred to a fan section 150, positioned upstream thereof. Generally, the turbomachine 120 includes, in serial flow order, a compressor section, a combustion section, a turbine section, and an exhaust section. Particularly, as shown in FIG. 1, the turbomachine 120 includes a core cowl 122 that defines an annular core inlet 124. The core cowl 122 further encloses at least in part a low pressure system and a high pressure system. For example, the core cowl 122 depicted encloses and supports at least in part a booster or low pressure ("LP") compressor 126 for pressurizing the air that enters the turbomachine 120 through core inlet 124. A high pressure ("HP"), multi-stage, axial-flow compressor 128 receives pressurized air from the LP compressor 126 and further increases the pressure of the air. The pressurized air stream flows downstream to a combustor 130 of the combustion section where fuel is injected into the pressurized air stream and ignited to raise the temperature and energy level of the pressurized air.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustor 130 downstream to a high pressure turbine 132. The high pressure turbine 132 drives the high pressure compressor 128 through a high pressure shaft 136. In this regard, the high pressure turbine 132 is drivingly coupled with the high pressure compressor 128. As will be appreciated, the high pressure compressor 128, the combustor 130, and the high pressure turbine 132 may collectively be referred to as the "core" of the engine 100. The high energy combustion products then flow to a low pressure turbine 134. The low pressure turbine 134 drives the low pressure compressor 126 and components of the fan section 150 through a low pressure shaft 138. In this regard, the low pressure turbine 134 is drivingly coupled with the low pressure compressor 126 and components of the fan section 150. The LP shaft 138 is coaxial with the HP shaft 136 in this example embodiment. After driving each of the turbines 132, 134, the combustion products exit the turbomachine 120 through a turbomachine exhaust nozzle 140.

Accordingly, the turbomachine 120 defines a working gas flowpath or core duct 142 that extends between the core inlet 124 and the turbomachine exhaust nozzle 140. The core duct 142 is an annular duct positioned generally inward of the core cowl 122 along the radial direction R. The core duct 142 (e.g., the working gas flowpath through the turbomachine 120) may be referred to as a second stream.

The fan section 150 includes a fan 152, which is the primary fan in this example embodiment. For the depicted embodiment of FIG. 1, the fan 152 is an open rotor or unducted fan 152. In such a manner, the engine 100 may be referred to as an open rotor engine.

As depicted, the fan 152 includes an array of fan blades 154 (only one shown in FIG. 1). The fan blades 154 are rotatable, e.g., about the longitudinal axis 112. As noted above, the fan 152 is drivingly coupled with the low pressure turbine 134 via the LP shaft 138. For the embodiments shown in FIG. 1, the fan 152 is coupled with the LP shaft 138 via a speed reduction gearbox 155, e.g., in an indirect-drive or geared-drive configuration.

Moreover, the array of fan blades 154 can be arranged in equal spacing around the longitudinal axis 112. Each fan blade 154 has a root and a tip and a span defined therebetween. Further, each fan blade 154 defines a fan blade tip radius R1 along the radial direction R from the longitudinal axis 112 to the tip, and a hub radius (or inner radius) $R_2$ along the radial direction R from the longitudinal axis 112 to the base of each fan blade 154 (i.e., from the longitudinal axis 112 to a radial location where each fan blade 154 meets a front hub of the gas turbine engine 100 at a leading edge of the respective fan blade 154). As will be appreciated, a distance from the base of each fan blade 154 to a tip of the respective fan blade 154 is referred to as a span of the respective fan blade 154. Further, the fan 152, or rather each fan blade 154 of the fan 152, defines a fan radius ratio, RqR, equal to $R_2$ divided by $R_1$. As the fan 152 is the primary fan of the engine 100, the fan radius ratio, RqR, of the fan 152 may be referred to as the primary fan radius ratio, $RqR_{Prim.-Fan}$.

Moreover, each fan blade 154 defines a central blade axis 156. For this embodiment, each fan blade 154 of the fan 152 is rotatable about their respective central blade axis 156, e.g., in unison with one another. One or more actuators 158 are provided to facilitate such rotation and therefore may be used to change a pitch of the fan blades 154 about their respective central blades' axes 156.

The fan section 150 further includes a fan guide vane array 160 that includes fan guide vanes 162 (only one shown in FIG. 1) disposed around the longitudinal axis 112. For this embodiment, the fan guide vanes 162 are not rotatable about the longitudinal axis 112. Each fan guide vane 162 has a root and a tip and a span defined therebetween. The fan guide vanes 162 may be unshrouded as shown in FIG. 1 or, alternatively, may be shrouded, e.g., by an annular shroud spaced outward from the tips of the fan guide vanes 162 along the radial direction R or attached to the fan guide vanes 162.

Each fan guide vane 162 defines a central blade axis 164. For this embodiment, each fan guide vane 162 of the fan guide vane array 160 is rotatable about its respective central blade axis 164, e.g., in unison with one another. One or more actuators 166 are provided to facilitate such rotation and therefore may be used to change a pitch of the fan guide vane 162 about its respective central blade axis 164. However, in other embodiments, each fan guide vane 162 may be fixed or unable to be pitched about its central blade axis 164. The fan guide vanes 162 are mounted to a fan cowl 170.

As shown in FIG. 1, in addition to the fan 152, which is unducted, a ducted fan 184 is included aft of the fan 152, such that the engine 100 includes both a ducted and an unducted fan which both serve to generate thrust through the movement of air without passage through at least a portion of the turbomachine 120 (e.g., without passage through the HP compressor 128 and combustion section for the embodiment depicted). The ducted fan 184 is rotatable about the same axis (e.g., the longitudinal axis 112) as the fan blade 154. The ducted fan 184 is, for the embodiment depicted, driven by the low pressure turbine 134 (e.g. coupled to the LP shaft 138). In the embodiment depicted, as noted above, the fan 152 may be referred to as the primary fan, and the ducted fan 184 may be referred to as a secondary fan. It will be appreciated that these terms "primary" and "secondary" are terms of convenience, and do not imply any particular importance, power, or the like.

The ducted fan 184 includes a plurality of fan blades (not separately labeled in FIG. 1; see fan blades 185 labeled in FIG. 2) arranged in a single stage, such that the ducted fan 184 may be referred to as a single stage fan. The fan blades of the ducted fan 184 can be arranged in equal spacing around the longitudinal axis 112. Each blade of the ducted fan 184 has a root and a tip and a span defined therebetween. Further, each fan blade of the ducted fan 184 defines a fan blade tip radius $R_3$ along the radial direction R from the longitudinal axis 112 to the tip, and a hub radius (or inner radius) $R_4$ along the radial direction R from the longitudinal axis 112 to the base of the respective fan blades of the ducted fan 184 (i.e., a location where the respective fan blades of the ducted fan 184 meet an inner flowpath liner at a leading edge of the respective fan blades of the ducted fan 184). As will be appreciated, a distance from the base of each fan blade of the ducted fan 184 to a tip of the respective fan blade is referred to as a span of the respective fan blade. Further, the ducted fan 184, or rather each fan blade of the ducted fan 184, defines a fan radius ratio, RqR, equal to $R_4$ divided by $R_3$. As the ducted fan 184 is the secondary fan of the engine 100, the fan radius ratio, RqR, of the ducted fan 184 may be referred to as the secondary fan radius ratio, $RqR_{Sec.-Fan}$.

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan duct flowpath, or simply a fan duct 172. According to this embodiment, the fan flowpath or fan duct 172 may be understood as forming at least a portion of the third stream of the engine 100.

Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The fan cowl 170 and the core cowl 122 are connected together and supported by a plurality of substantially radially-extending, circumferentially-spaced stationary struts 174 (only one shown in FIG. 1). The stationary struts 174 may each be aerodynamically contoured to direct air flowing thereby. Other struts in addition to the stationary struts 174 may be used to connect and support the fan cowl 170 and/or core cowl 122. In many embodiments, the fan duct 172 and the core duct 142 may at least partially co-extend (generally axially) on opposite sides (e.g., opposite radial sides) of the core cowl 122. For example, the fan duct 172 and the core duct 142 may each extend directly from a leading edge 144 of the core cowl 122 and may partially co-extend generally axially on opposite radial sides of the core cowl 122.

The engine 100 also defines or includes an inlet duct 180. The inlet duct 180 extends between an engine inlet 182 and the core inlet 124/fan duct inlet 176. The engine inlet 182 is defined generally at the forward end of the fan cowl 170 and is positioned between the fan 152 and the fan guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a fan duct splitter or leading edge 144 of the core cowl 122. The inlet duct 180 is wider than the core duct 142 along the radial direction R. The inlet duct 180 is also wider than the fan duct 172 along the radial direction R. The secondary fan 184 is positioned at least partially in the inlet duct 180.

Notably, for the embodiment depicted, the engine 100 includes one or more features to increase an efficiency of a third stream thrust, $Fn_{3S}$ (e.g., a thrust generated by an airflow through the fan duct 172 exiting through the fan exhaust nozzle 178, generated at least in part by the ducted fan 184). In particular, the engine 100 further includes an array of inlet guide vanes 186 positioned in the inlet duct 180 upstream of the ducted fan 184 and downstream of the engine inlet 182. The array of inlet guide vanes 186 are arranged around the longitudinal axis 112. For this embodiment, the inlet guide vanes 186 are not rotatable about the longitudinal axis 112. Each inlet guide vanes 186 defines a central blade axis (not labeled for clarity), and is rotatable about its respective central blade axis, e.g., in unison with one another. In such a manner, the inlet guide vanes 186 may be considered a variable geometry component. One or more actuators 188 are provided to facilitate such rotation and therefore may be used to change a pitch of the inlet guide vanes 186 about their respective central blade axes. However, in other embodiments, each inlet guide vanes 186 may be fixed or unable to be pitched about its central blade axis.

Further, located downstream of the ducted fan 184 and upstream of the fan duct inlet 176, the engine 100 includes an array of outlet guide vanes 190. As with the array of inlet guide vanes 186, the array of outlet guide vanes 190 are not rotatable about the longitudinal axis 112. However, for the embodiment depicted, unlike the array of inlet guide vanes 186, the array of outlet guide vanes 190 are configured as fixed-pitch outlet guide vanes.

Further, it will be appreciated that for the embodiment depicted, the fan exhaust nozzle 178 of the fan duct 172 is further configured as a variable geometry exhaust nozzle. In such a manner, the engine 100 includes one or more actuators 192 for modulating the variable geometry exhaust nozzle. For example, the variable geometry exhaust nozzle may be configured to vary a total cross-sectional area (e.g., an area of the nozzle in a plane perpendicular to the longitudinal axis 112) to modulate an amount of thrust generated based on one or more engine operating conditions (e.g., temperature, pressure, mass flowrate, etc. of an airflow through the fan duct 172). A fixed geometry exhaust nozzle may also be adopted.

The combination of the array of inlet guide vanes 186 located upstream of the ducted fan 184, the array of outlet guide vanes 190 located downstream of the ducted fan 184, and the fan exhaust nozzle 178 may result in a more efficient generation of third stream thrust, $Fn_{3S}$, during one or more engine operating conditions. Further, by introducing a variability in the geometry of the inlet guide vanes 186 and the fan exhaust nozzle 178, the engine 100 may be capable of generating more efficient third stream thrust, $Fn_{3S}$, across a relatively wide array of engine operating conditions, including takeoff and climb (where a maximum total engine thrust $Fn_{Total}$, is generally needed) as well as cruise (where a lesser amount of total engine thrust, $Fn_{Total}$, is generally needed).

Moreover, referring still to FIG. 1, in exemplary embodiments, air passing through the fan duct 172 may be relatively cooler (e.g., lower temperature) than one or more fluids utilized in the turbomachine 120. In this way, one or more heat exchangers 200 may be positioned in thermal communication with the fan duct 172. For example, one or more heat exchangers 200 may be disposed within the fan duct 172 and utilized to cool one or more fluids from the core engine with the air passing through the fan duct 172, as a resource for removing heat from a fluid, e.g., compressor bleed air, oil or fuel.

Although not depicted, the heat exchanger 200 may be an annular heat exchanger extending substantially 360 degrees in the fan duct 172 (e.g., at least 300 degrees, such as at least 330 degrees). In such a manner, the heat exchanger 200 may effectively utilize the air passing through the fan duct 172 to cool one or more systems of the engine 100 (e.g., lubrication oil systems, compressor bleed air, electrical components, etc.). The heat exchanger 200 uses the air passing through duct 172 as a heat sink and correspondingly increases the temperature of the air downstream of the heat exchanger 200 and exiting the fan exhaust nozzle 178.

Figure 2:
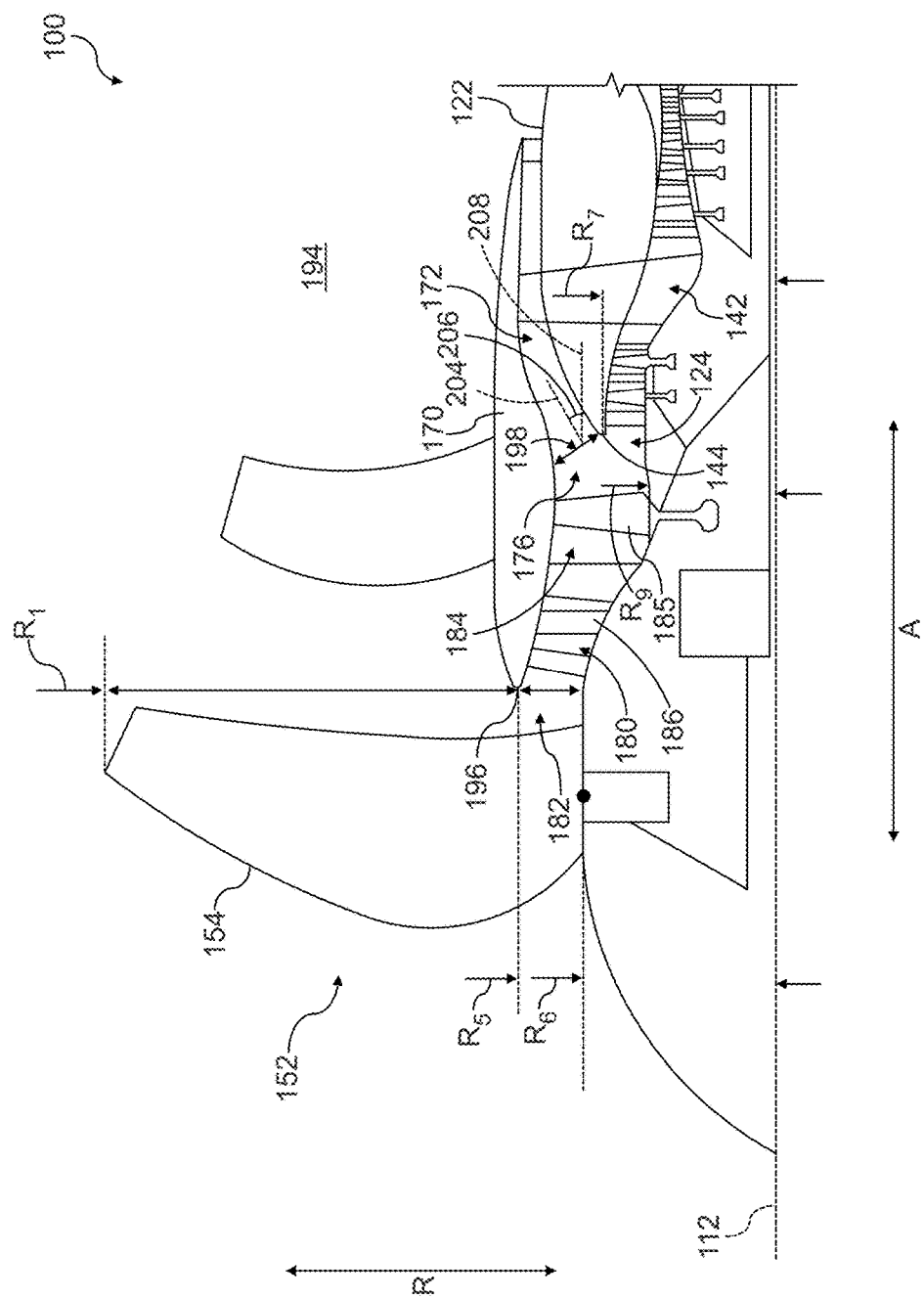
FIG. 2 is a close-up, schematic view of the exemplary three-stream engine of FIG. 1.

Referring now to FIG. 2, a close-up, simplified, schematic view of the gas turbine engine 100 of FIG. 1 is provided. The gas turbine engine 100, as noted above includes a primary fan, or rather fan 152 having fan blades 154, and a secondary fan, or rather ducted fan 184 having fan blades 185. Airflow from the fan 152 is split between a bypass region 194 (as defined below) and the inlet duct 180 by an inlet splitter 196. Airflow from the ducted fan 184 is split between the fan duct 172 and the core duct 142 by the leading edge 144 (sometimes also referred to as a fan duct splitter).

The exemplary gas turbine engine 100 depicted in FIG. 2 further defines a primary fan outer fan area, $A_{P\_Out}$, a primary fan inner fan area, $A_{P\_In}$, a secondary fan outer fan area, $A_{S\_Out}$, and a secondary fan inner fan area, $A_{S\_In}$.

The primary fan outer fan area, $A_{P\_Out}$, refers to an area defined by an annulus representing a portion of the fan 152 located outward of the inlet splitter 196 of the fan cowl 170. In particular, the gas turbine engine 100 further defines a fan cowl splitter radius, $R_5$. The fan cowl splitter radius, $R_5$, is defined along the radial direction R from the longitudinal axis 112 to the inlet splitter 196. The primary fan outer fan area, $A_{P\_Out}$, refers to an area defined by the formula: $\pi R_1^2 - \pi R_5^2$.

The primary fan inner fan area, $A_{P\_In}$, refers to an area defined by an annulus representing a portion of the fan 152 located inward of the inlet splitter 196 of the fan cowl 170. In particular, the gas turbine engine 100 further defines an engine inlet inner radius, $R_6$. The engine inlet inner radius, $R_6$, is defined along the radial direction R from the longitudinal axis 112 to an inner casing defining the engine inlet 182 directly inward along the radial direction R from the inlet splitter 196. The primary fan inner fan area, $A_{P\_In}$, refers to an area defined by the formula: $\pi R_5^2 - \pi R_6^2$.

The secondary fan outer fan area, $A_{S\_Out}$, refers to an area representing a portion of an airflow from the ducted fan 184 that is provided to the fan duct 172. In particular, the leading edge 144 defines a leading edge radius, $R_7$, and the gas turbine engine 100 defines an effective fan duct inlet outer radius, $R_8$ (see FIG. 3). The leading edge radius, $R_7$, is defined along the radial direction R from the longitudinal axis 112 to the leading edge 144.

Figure 3:
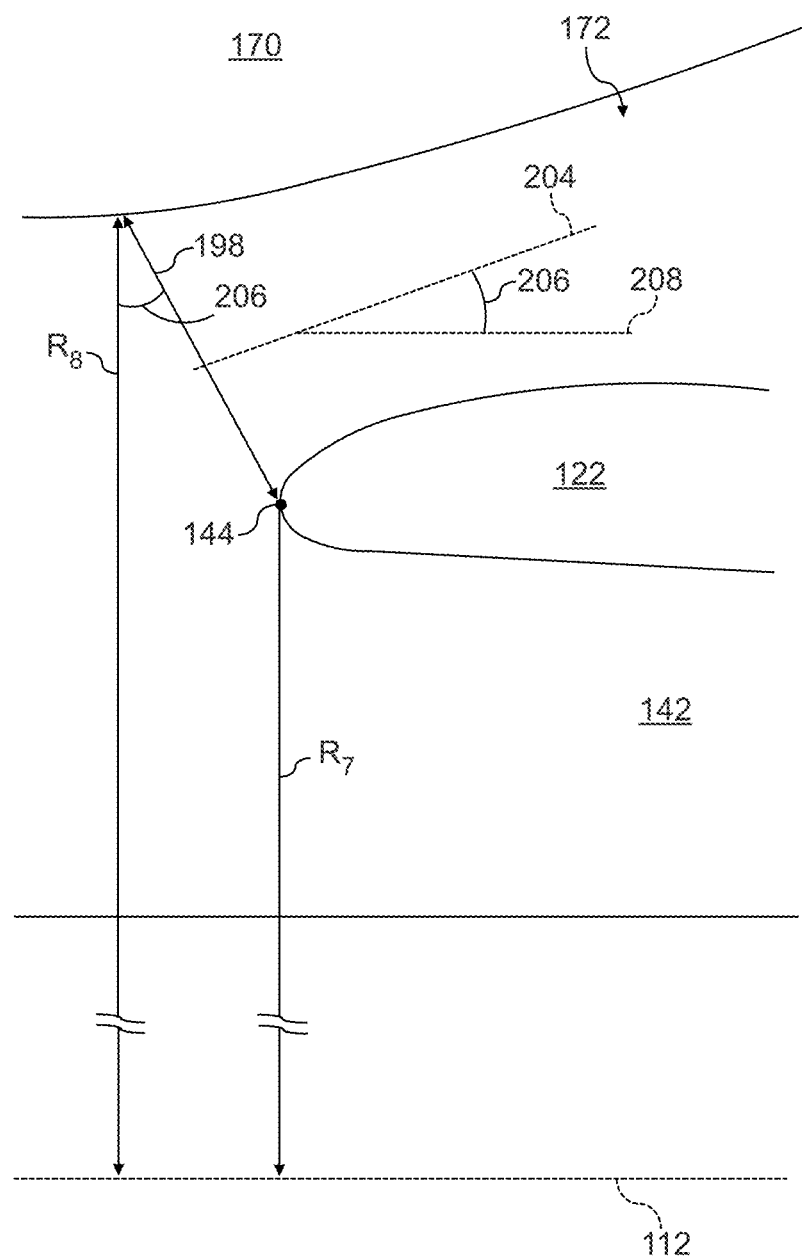
FIG. 3 is a close-up view of an area surrounding a leading edge of a core cowl of the exemplary three-stream engine of FIG. 2.

Referring briefly to FIG. 3, providing a close-up view of an area surrounding the leading edge 144, the fan duct 172 defines a cross-wise height 198 measured from the leading edge 144 to the fan cowl 170 in a direction perpendicular to a mean flow direction 204 of an airflow through a forward 10% of the fan duct 172. An angle 206 is defined by the mean flow direction 204 relative to a reference line 208 extending parallel to the longitudinal axis 112. The angle 206 is referred to as θ. In certain embodiments, the angle 206 may be between 5 degrees and 80 degrees, such as between 10 degrees and 60 degrees (an increased angle is a counterclockwise rotation in FIG. 3). The effective fan duct inlet outer radius, $R_8$, is defined along the radial direction R from the longitudinal axis 112 to where the cross-wise height 198 meets the fan cowl 170. The secondary fan outer fan area, $A_{S\_Out}$, refers to an area defined by the formula:

$$\frac{\pi (R_8^2 - R_7^2)}{\cos(\theta)}.$$

Referring back to FIG. 2, the secondary fan inner fan area, $A_{S\_In}$, refers to an area defined by an annulus representing a portion of the ducted fan 184 located inward of the leading edge 144 of the core cowl 122. In particular, the gas turbine engine 100 further defines a core inlet inner radius, $R_9$. The core inlet inner radius, $R_9$, is defined along the radial direction R from the longitudinal axis 112 to an inner casing defining the core inlet 124 directly inward along the radial direction R from the leading edge 144. The secondary fan inner fan area, $A_{S\_In}$, refers to an area defined by the formula: $\pi R_7^2 - \pi R_9^2$.

The primary fan outer fan area, $A_{P\_Out}$, the primary fan inner fan area, $A_{P\_In}$, the secondary fan outer fan area, $A_{S\_Out}$, and the secondary fan inner fan area, $A_{S\_In}$, may be used in defining various airflow ratios for the engine 100. In particular, it will be appreciated that the exemplary engine 100 of FIGS. 1 through 3 further defines a thrust to power airflow ratio and a core bypass ratio, which as discussed herein are used to define an engine in accordance with the present disclosure. The thrust to power airflow ratio is a ratio of an airflow through the bypass passage of the engine 100 and through the fan duct 172 to an airflow through the core duct 142. The bypass passage (not separately labeled) is located within the bypass region 194 and refers to a passage where airflow from the fan 152 passes over the inlet duct 180. Further, the core bypass ratio is a ratio of an airflow through the fan duct 172 to the airflow through the core duct 142. These ratios are calculated while the engine 100 is operating at a rated speed during standard day operating conditions, and the amounts of airflow used to calculate these ratios are each expressed as a mass flowrate in the same units (mass per unit time).

More specifically, the amount of airflow through the engine's bypass passage can be determined using a fan pressure ratio for the fan 152, a rotational speed of the fan 152, or both while the engine is operating at the rated speed during standard day operating conditions, and the primary fan outer fan area, $A_{P\_Out}$. The amount of airflow through the inlet duct 180 can be determined using a fan pressure ratio for the fan 152, a rotational speed of the fan 152, or both while operating at a rated speed during standard day operating conditions, and the primary fan inner fan area, $A_{P\_In}$. The amount of airflow through the fan duct 172 and the amount of airflow through the core duct 142 can be determined based on the amount of airflow through the inlet duct 180 while the engine is operating at the rated speed during standard day operating conditions; a fan pressure ratio, a rotational speed, or both of the ducted fan 184 while the engine is operating at the rated speed during standard day operating conditions; and the secondary fan outer fan area, $A_{S\_Out}$, and the secondary fan inner fan area, $A_{S\_In}$.

As alluded to earlier, the inventors discovered, unexpectedly during the course of gas turbine engine design—i.e., designing gas turbine engines (e.g., both ducted and unducted gas turbine engines and turboprop engines) having a variety of different primary fan and secondary fan characteristics—and evaluating an overall propulsive efficiency, significant relationships exist in a ratio of an airflow through a bypass passage and through a third stream to an airflow through a core duct (referred to herein as a thrust to power airflow ratio), as well as in a ratio of an airflow through the third steam to the airflow through the core duct (referred to herein as a core bypass ratio). These relationships can be thought of as an indicator of the ability of a gas turbine engine to maintain or even improve upon a desired propulsive efficiency via the third stream and, additionally, indicating an improvement in the gas turbine engine's packaging concerns and weight concerns, and thermal management capabilities.

As will be appreciated, it may generally be desirable to increase a fan diameter in order to provide a higher thrust to power airflow ratio, which typically correlates to a higher overall propulsive efficiency. However, increasing the fan diameter too much may actually result in a decrease in propulsive efficiency at higher speeds due to a drag from the fan blades. Further, increasing the fan diameter too much may also create prohibitively heavy fan blades, creating installation problems due to the resulting forces on the supporting structure (e.g., frames, pylons, etc.), exacerbated by a need to space the engine having such fan blades further from a mounting location on the aircraft to allow the engine to fit, e.g., under/over the wing, adjacent to the fuselage, etc.

Similarly, it may generally be desirable to increase an airflow through the fan duct relative to the core duct in order to provide a higher core bypass ratio, as such may also generally correlate to a higher overall propulsive efficiency. Notably, however, the higher the core bypass ratio, the less airflow provided to the core of the gas turbine engine. For a given amount of power needed to drive, e.g., a primary fan and a secondary fan of the gas turbine engine, if less airflow is provided, either a maximum temperature of the core needs to be increased or a size of the primary fan or secondary fan needs to be decreased. Such a result can lead to either premature wear of the core or a reduction in propulsive efficiency of the gas turbine engine.

As noted above, the inventors of the present disclosure discovered bounding the relationships defined by the thrust to power airflow ratio and core bypass ratio can result in a gas turbine engine maintaining or even improving upon a desired propulsive efficiency, while also taking into account the gas turbine engine's packaging concerns and weight concerns, and also providing desired thermal management capabilities. The relationship discovered, infra, can identify an improved engine configuration suited for a particular mission requirement, one that takes into account installation, packaging and loading, thermal sink needs and other factors influencing the optimal choice for an engine configuration.

In addition to yielding an improved gas turbine engine, as explained in detail above, utilizing this relationship, the inventors found that the number of suitable or feasible gas turbine engine designs incorporating a primary fan and a secondary fan, and defining a third stream, capable of meeting both the propulsive efficiency requirements and packaging, weight, and thermal sink requirements could be greatly diminished, thereby facilitating a more rapid down selection of designs to consider as a gas turbine engine is being developed. Such a benefit provides more insight to the requirements for a given gas turbine engine well before specific technologies, integration and system requirements are developed fully. Such a benefit avoids late-stage redesign.

The desired relationships providing for the improved gas turbine engine, discovered by the inventors, are expressed as:

$$TPAR = (A_B + A_{3S})/A_C \tag{1}$$

$$CBR = A_{3S}/A_C \tag{2}$$

where TPAR is a thrust to power airflow ratio, CBR is a core bypass ratio, $A_B$ is an airflow through a bypass passage of the gas turbine engine while the engine is operated at a rated speed during standard day operating conditions, $A_{3S}$ is an airflow through a third stream of the gas turbine engine while the engine is operated at the rated speed during standard day operating conditions, and $A_C$ is an airflow through a core of the gas turbine engine while the engine is operated at the rated speed during standard day operating conditions. The airflow through the core of the gas turbine engine may refer to an airflow through an upstream end of the core (e.g., an airflow through a first stage of a high pressure compressor of the core). $A_B$, $A_{3S}$, and $A_C$ are each expressed as mass flowrate, with the same units as one another.

Values for various parameters of the influencing characteristics of an engine defined by Expressions (1) and (2) are set forth below in TABLE 1:

TABLE 1

| Symbol | Description | Ranges appropriate for using Expression (1) |
|---|---|---|
| $R_1/R_3$ | Tip radius ratio | 1.35 to 10, such as 2 to 7, such as 3 to 5, such as at least 3.5, such as at least 3.7, such as at least 4, such as up to 10, such as up to 7 |
| $RqR_{Sec.-Fan}$ | Secondary fan radius ratio | 0.2 to 0.9, such as 0.2 to 0.7, such as 0.57 to 0.67 |
| $RqR_{Prim.-Fan}$ | Primary fan radius ratio | 0.2 to 0.4, such as 0.25 to 0.35 |
| TPAR | Thrust to power airflow ratio | 3.5 to 100, such as 4 to 75 (see also, TABLE 2, below) |
| CBR | Core Bypass Ratio | 0.1 to 10, such as 0.3 to 5 (see also, TABLE 2, below) |

Referring now to FIGS. 4A through 4H and 5A through 5D, the relationships between the various parameters of Expressions (1) and (2) of exemplary gas turbine engines are illustrated in accordance with one or more exemplary embodiments of the present disclosure. In particular, FIGS. 4A through 4H provide a table including numerical values corresponding to several of the plotted gas turbine engines in FIGS. 5A through 5D. FIGS. 5A through 5D are plots of gas turbine engines in accordance with one or more exemplary embodiments of the present disclosure, showing the TPAR (Y-Axis) and the CBR (X-axis). FIGS. 5A through 5D highlight preferred subranges, including subranges for unducted engines, ducted engines, and turboprop engines, as discussed hereinbelow.

Figure 5A:
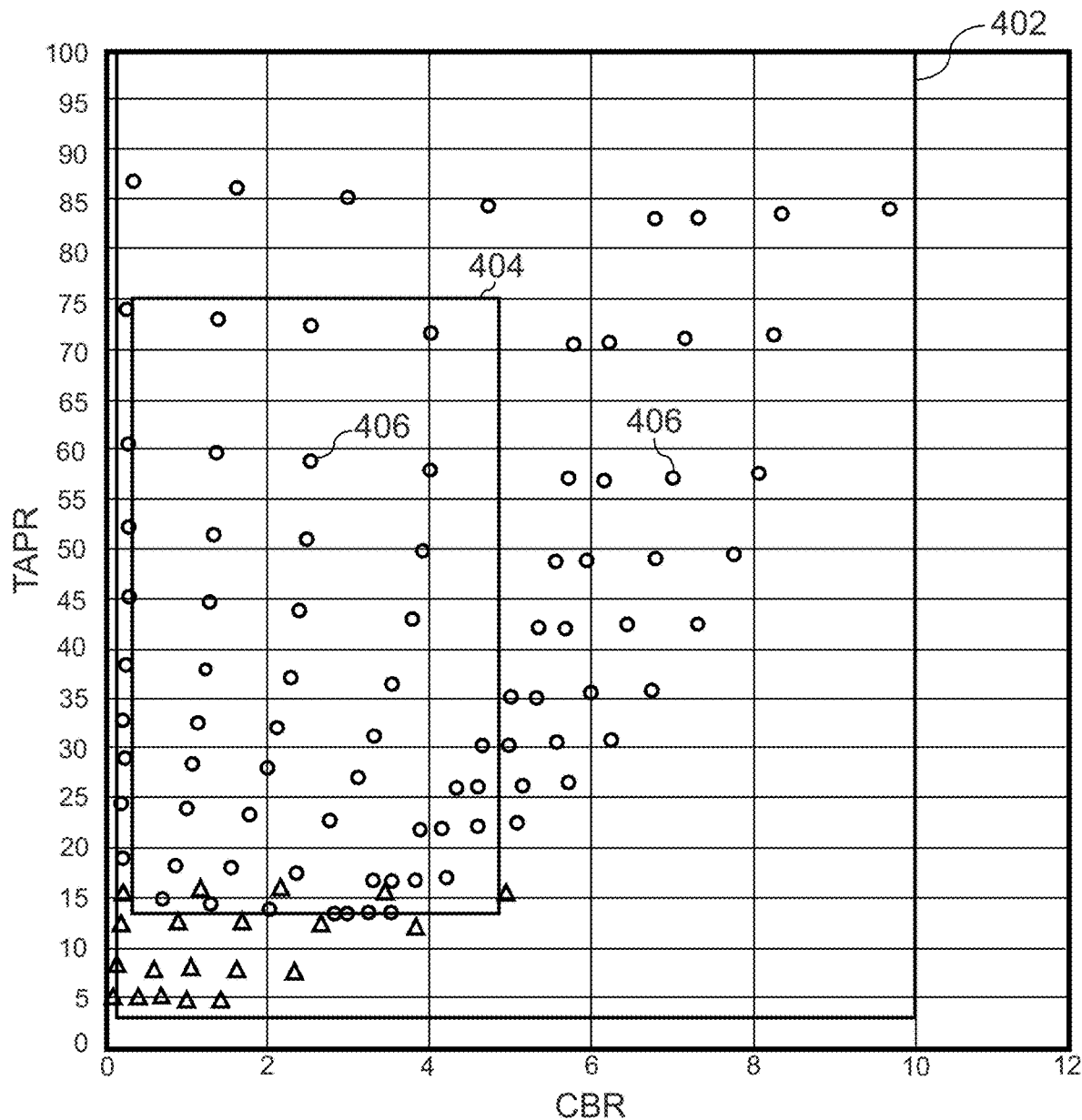
FIGS. 5A through 5D are graphs depicting a range of thrust to power airflow ratios and core bypass ratios in accordance with various example embodiments of the present disclosure.

Referring particularly to FIG. 5A, a first range 402 and a second range 404 are provided, and exemplary embodiments 406 are plotted. The exemplary embodiments 406 include a variety of gas turbine engine types in accordance with aspects of the present disclosure, including unducted gas turbine engines, ducted gas turbine engines (turbofan engines), and turboprop engines. The first range 402 corresponds to a TPAR between 3.5 and 100 and a CBR between 0.1 and 10. The first range 402 captures the benefits of the present disclosure across the variety of engine types. The second range 404 corresponds to a TPAR between 14 and 75 and a CBR between 0.3 and 5. The second range 404 may provide more desirable TPAR and CBR relationships across the variety of engine types to achieve propulsive efficiency, while still providing packaging and weight benefits, thermal benefits, etc.

Figure 5B:
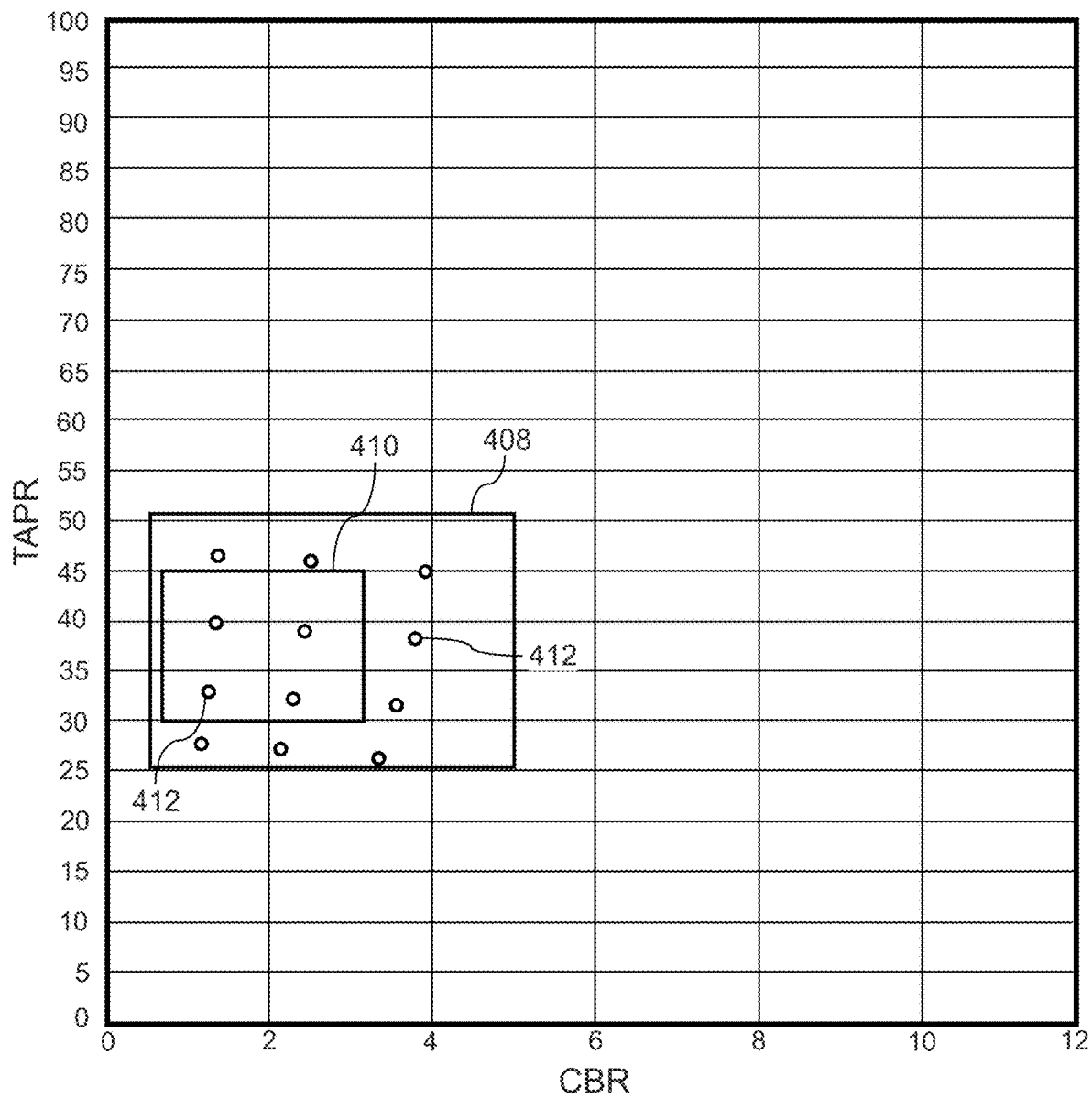

Referring particularly to FIG. 5B, a third range 408 and a fourth range 410 are provided, and exemplary embodiments 412 are plotted. The exemplary embodiments 412 include a variety of unducted gas turbine engines in accordance with aspects of the present disclosure. In particular, the exemplary embodiments 412 include a variety of gas turbine engines having an unducted primary fan, similar to the exemplary embodiments described herein with reference to FIGS. 1 and 10. The third range 408 corresponds to a TPAR between 30 and 56 and a CBR between 0.3 and 5. The third range 408 captures the benefits of the present disclosure for unducted gas turbine engines. The fourth range 410 corresponds to a TPAR between 35 and 50 and a CBR between 0.5 and 3. The fourth range 410 may provide more desirable TPAR and CBR relationships for the unducted gas turbine engines to achieve propulsive efficiency, while still providing packaging and weight benefits, thermal benefits, etc.

As will be appreciated, the unducted gas turbine engines may have, on the whole, a higher TPAR as compared to the ducted gas turbine engines (see FIG. 5C), enabled by a lack of an outer nacelle or other casing surrounding a primary fan. The range of CBR values in the fourth range 410 isn't as large as the range of CBR values in the third range 408, as in the embodiments with a higher TPAR, the CBR needs to be lower to provide a necessary amount of airflow to a core of the engine without exceeding temperature thresholds or requiring an undesired reduction in a size of the primary fan.

The inventors of the present disclosure have found that the TPAR values and CBR values in the third and fourth ranges 408, 410 shown may provide a desirable propulsive benefit, while still enabling operation of the core in a reasonable manner, and balancing installation and thermal load considerations.

Figure 5C:
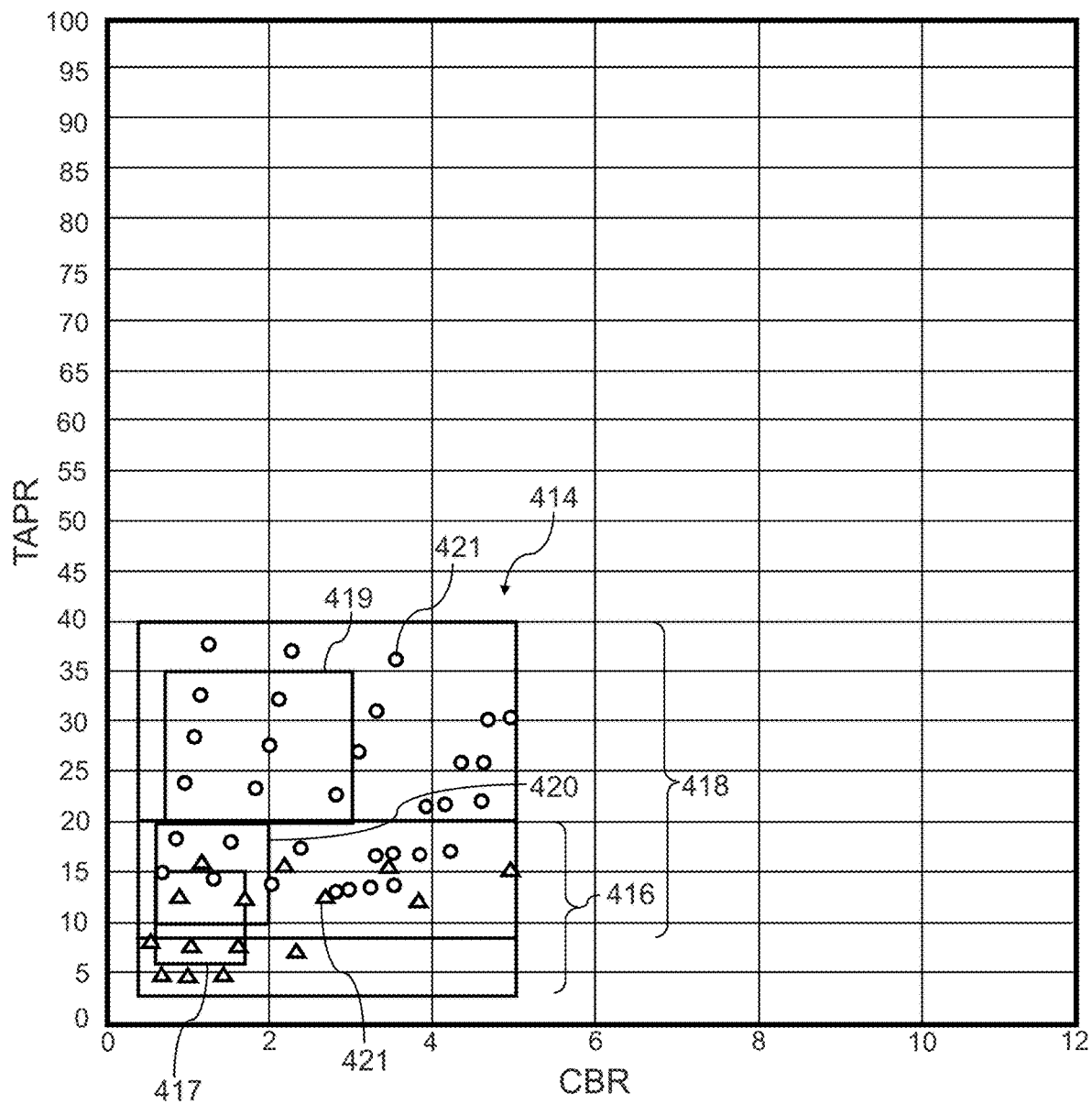

Referring particularly to FIG. 5C, a fifth range 414, a sixth range 416, a seventh range 417, an eighth range 418, a ninth range 419, and a tenth range 420 are provided, and exemplary embodiments 421 are plotted. The exemplary embodiments 421 include a variety of ducted gas turbine engines in accordance with aspects of the present disclosure. In particular, the exemplary embodiments 421 include a variety of gas turbine engines having a ducted primary fan, similar to the exemplary embodiments described herein with reference to FIGS. 7 through 9. The fifth range 414 corresponds to a TPAR between 3.5 and 40 and a CBR between 0.3 and 5. The fifth range 414 captures the benefits of the present disclosure for ducted gas turbine engines.

The sixth range 416 corresponds to a TPAR between 3.5 and 20 and a CBR between 0.2 and 5. The sixth range 416 captures the benefits of the present disclosure for ducted gas turbine engines in a direct drive configuration (see, e.g., FIG. 7). As will be appreciated, with a ducted, direct drive gas turbine engine a primary fan may be smaller, limiting a TPAR. The seventh range 417, which also corresponds to ducted gas turbine engines in a direct drive configuration, corresponds to a TPAR between 6 and 15 and a CBR between 0.3 and 1.8, and may represent a more preferrable range.

The eighth range 418 corresponds to a TPAR between 8 and 40 and a CBR between 0.2 and 5. The eighth range 418 captures the benefits of the present disclosure for ducted gas turbine engines in a geared configuration (see, e.g., FIGS. 8 and 9). As will be appreciated, with a ducted, geared gas turbine engine a primary fan may be larger as compared to a ducted, direct drive gas turbine engine, allowing for a larger TPAR. TPAR is, in turn limited by an allowable nacelle drag and fan operability.

The ninth range 419 corresponds to ducted gas turbine engines in a geared configuration having a variable pitch primary fan (see FIGS. 8 and 9) and the tenth range 420 corresponds to ducted gas turbine engines in a geared configuration having a fixed pitch primary fan. Inclusion of a variable pitch primary fan may allow for a larger fan, but may also necessitate higher heat rejection abilities for the gas turbine engine, which may, in turn increase a CBR. The ninth range 419 corresponds to a TPAR between 20 and 35 and a CBR between 0.5 and 3, and the tenth range 420 corresponds to a TPAR between 10 and 20 and a CBR between 0.3 and 2. It will be appreciated that in other exemplary aspects, a gas turbine engine of the present disclosure in a ducted, geared, variable pitch configuration may have TPAR between 15 and 40 and a CBR between 0.3 and 5, and a gas turbine engine in a ducted, geared, fixed pitch configuration may have TPAR between 8 and 25 and a CBR between 0.3 and 5.

As will be appreciated, the ducted gas turbine engines may have, on the whole, a lower TPAR than the unducted gas turbine engines as a result of an outer nacelle surrounding a primary fan (the outer nacelle becoming prohibitively heavy with higher diameter primary fans). Further, it will be appreciated that the TPAR values for geared engines may be higher than the TPAR values for direct drive engines, as inclusion of the gearbox allows the primary fan to rotate more slowly than the driving turbine, enabling a comparatively larger primary fan without overloading the primary fan or generating shock losses at a tip of the primary fan. The range of CBR values may generally be relatively high given the relatively low TPAR values (since a relatively high amount of airflow is provided to a secondary fan through an engine inlet when the TPAR values are low), as a necessary amount of airflow to a core of the ducted gas turbine engine may still be provided with a relatively high CBR without exceeding temperature thresholds or requiring a reduction in a size of the primary fan.

The inventors of the present disclosure have found that the TPAR values and CBR values in the fifth, sixth, seventh, eighth, ninth, and tenth ranges 414, 416, 417, 418, 419, 420 shown may provide a desirable propulsive benefit, while still enabling operation of the core in a reasonable manner, and balancing installation and thermal load considerations.

Figure 5D:
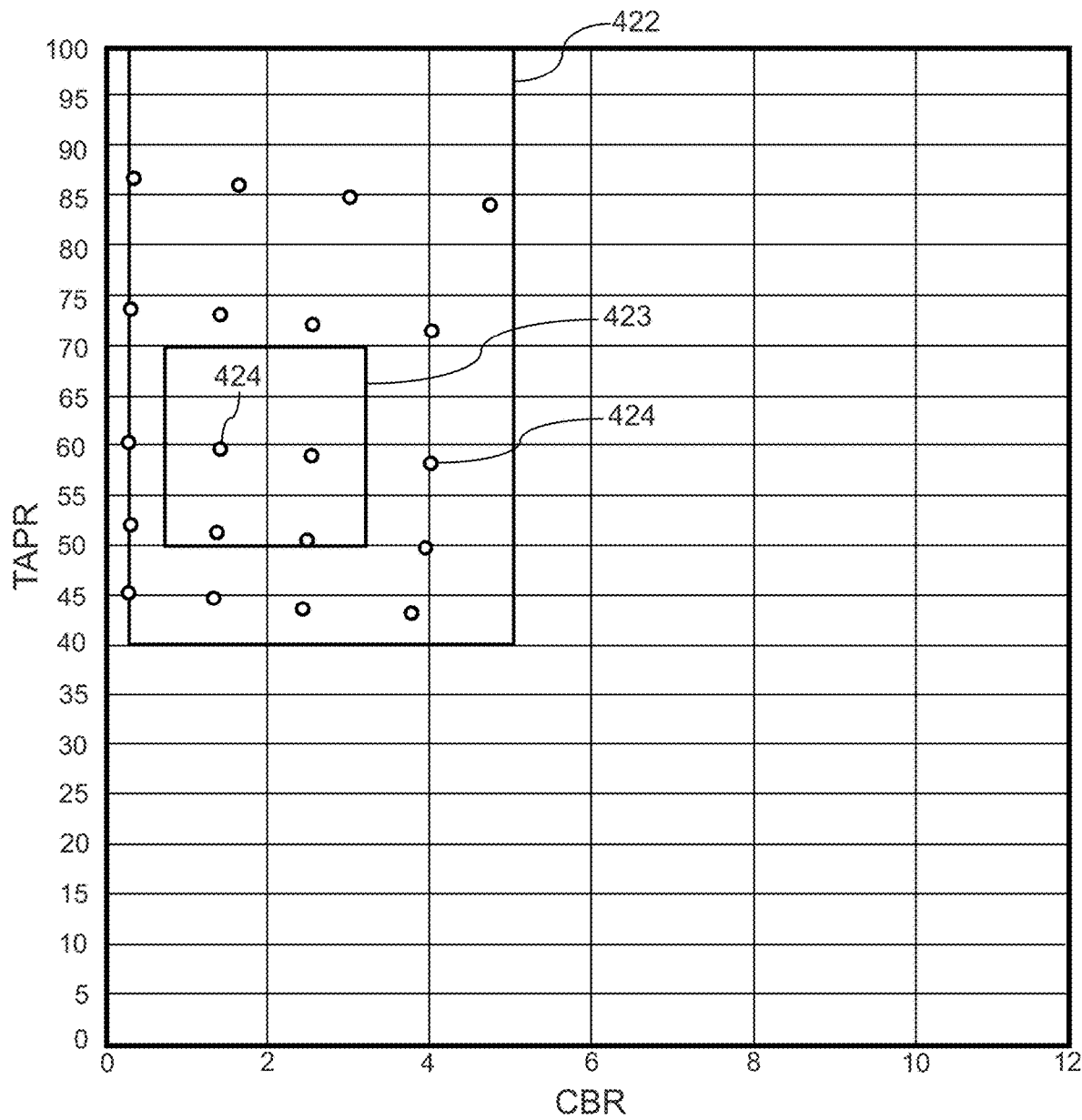

Referring particularly to FIG. 5D, an eleventh range 422 and a twelfth range 423 are provided, and exemplary embodiments 424 are plotted. The exemplary embodiments 424 include a variety of turboprop gas turbine engines in accordance with aspects of the present disclosure. In particular, the exemplary embodiments 424 include a variety of turboprop gas turbine engine similar to the exemplary embodiment described herein with reference to FIG. 6. The eleventh range 422 corresponds to a TPAR between 40 and 100 and a CBR between 0.3 and 5. The eleventh range 422 captures the benefits of the present disclosure for turboprop gas turbine engines. The twelfth range 423 corresponds to a TPAR between 50 and 70 and a CBR between 0.5 and 3, and may represent a more preferrable range.

As will be appreciated, the turboprop gas turbine engines may have, on the whole, higher TPAR values than turbofan engines, enabled by the lack of an outer nacelle or other casing surrounding a primary fan and a relatively slow operational speed of the primary fan and aircraft incorporating the turboprop gas turbine engine. The range of CBR values in the eleventh range 422 and the twelfth range 423 may be relatively small, as less air may be provided through a third stream with such a high TPAR without compromising operation of a core of the gas turbine engine.

The inventors of the present disclosure have found that the TPAR values and CBR values in the eleventh range 422 and twelfth range 423 shown may provide a desirable propulsive benefit, while still enabling operation of the core in a reasonable manner, and balancing installation and thermal load considerations.

TABLE 2, below provides a summary of TPAR values and CBR values for various gas turbine engines in accordance with one or more exemplary aspects of the present disclosure.

TABLE 2

| Engine Type | TPAR Value | CBR Value |
|---|---|---|
| All Aeronautical Gas Turbine Engines ("GTE") | 3.5 to 100 | 0.1 to 10 |
| All Aeronautical GTE | 4 to 75 | 0.3 to 5 |
| Open Rotor GTE | 30 to 60 | 0.3 to 5 |
| Open Rotor GTE | 35 to 50 | 0.5 to 3 |
| Ducted Gas GTE | 3.5 to 40 | 0.2 to 5 |
| Ducted, Geared GTE | 8 to 40 | 0.2 to 5 |
| Ducted, Geared, Variable Pitch GTE | 15 to 40 | 0.3 to 5 |
| Ducted, Geared, Variable Pitch GTE | 20 to 35 | 0.5 to 3 |
| Ducted, Geared, Fixed-Pitch GTE | 8 to 25 | 0.2 to 5 |
| Ducted, Geared, Fixed-Pitch GTE | 10 to 20 | 0.3 to 2 |
| Ducted, Direct Drive GTE | 3.5 to 20 | 0.2 to 5 |
| Ducted, Direct Drive GTE (lower flight speed) | 6 to 20 | 0.2 to 5 |
| Ducted, Direct Drive GTE (lower flight speed) | 8 to 15 | 0.3 to 1.8 |
| Ducted, Direct Drive GTE (higher flight speed) | 3.5 to 10 | 0.2 to 2 |
| Ducted, Direct Drive GTE (higher flight speed) | 3.5 to 6 | 0.3 to 1.5 |
| Turboprop GTE | 40 to 100 | 0.3 to 5 |
| Turboprop GTE | 50 to 70 | 0.5 to 3 |

Figure 6:
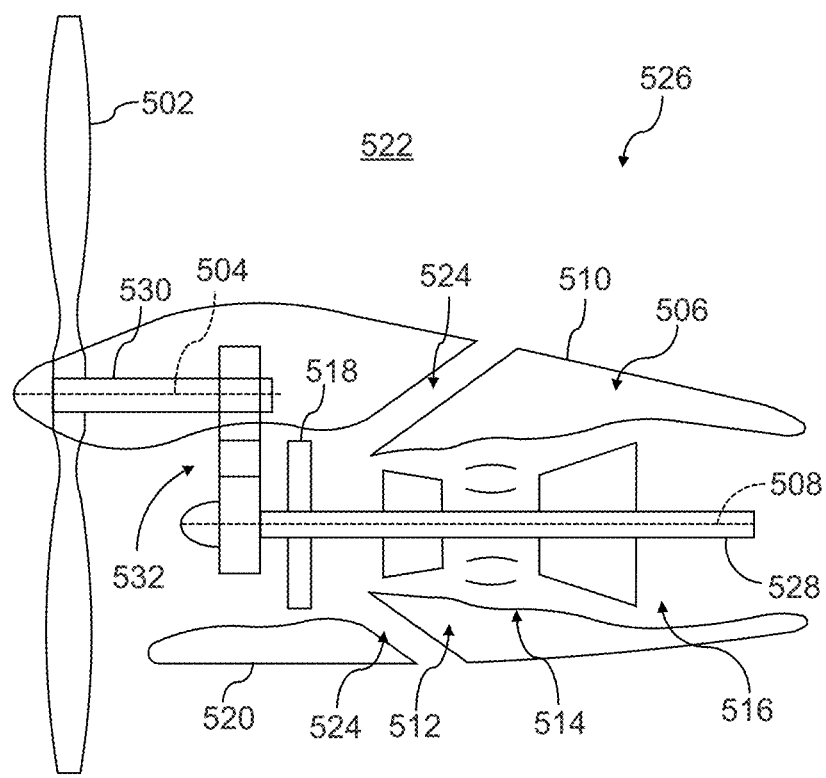
FIG. 6 is a schematic view of a turboprop engine in accordance with an exemplary aspect of the present disclosure.
Figure 7:
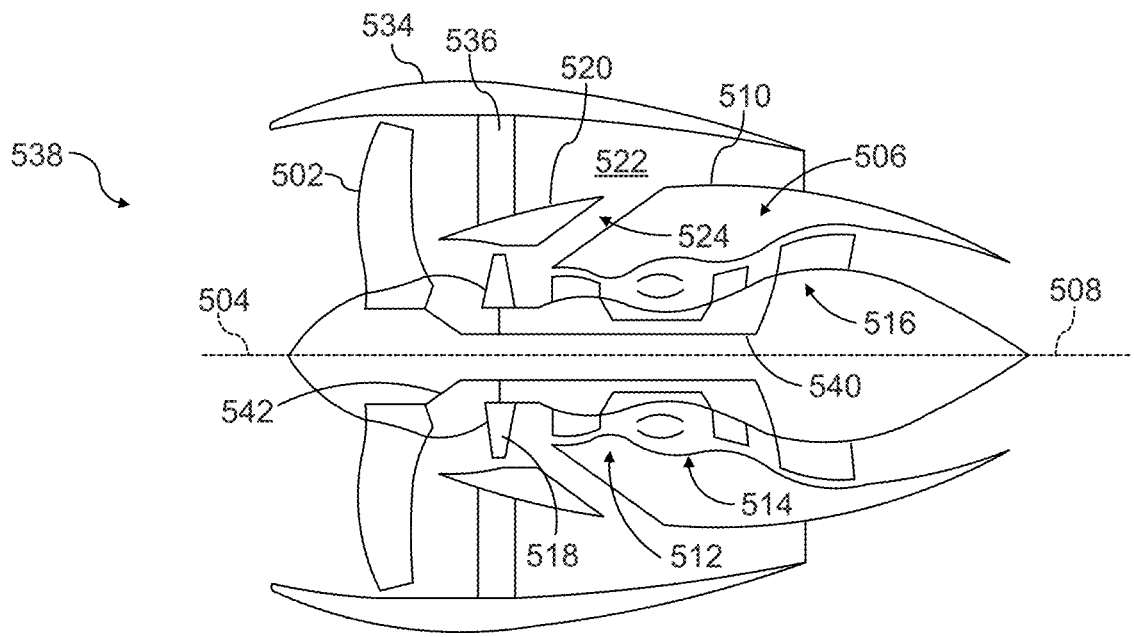
FIG. 7 is a schematic view of a direct drive, ducted, turbofan engine in accordance with an exemplary aspect of the present disclosure.
Figure 8:
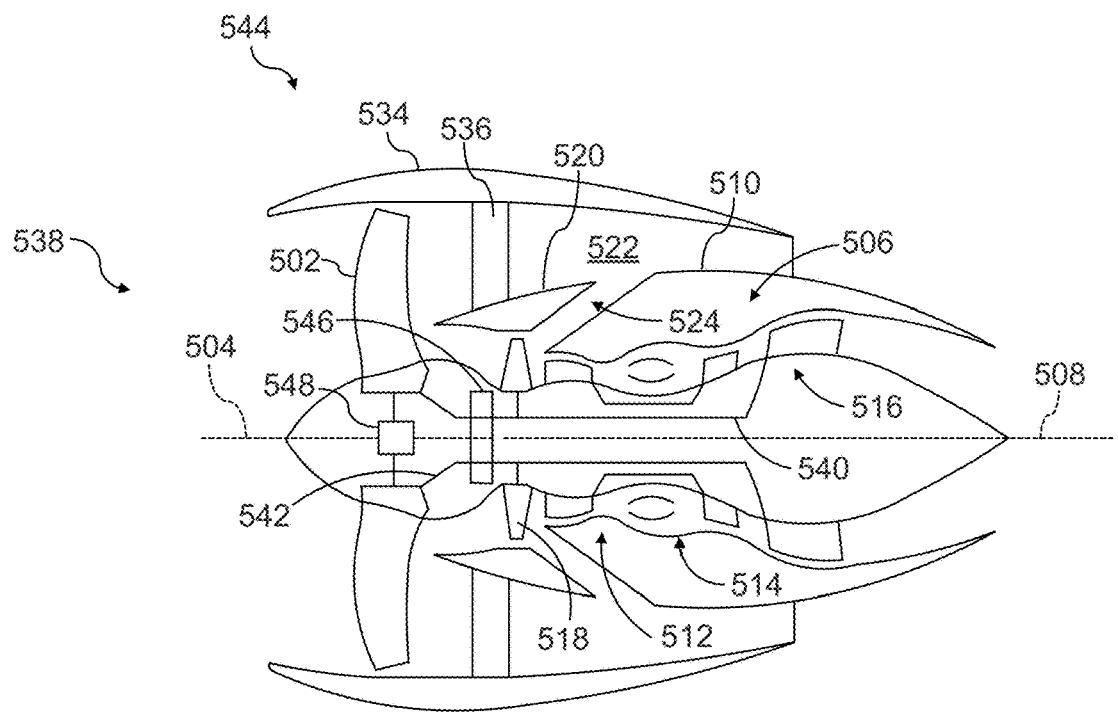
FIG. 8 is a schematic view of a geared, ducted, turbofan engine in accordance with an exemplary aspect of the present disclosure.
Figure 9:
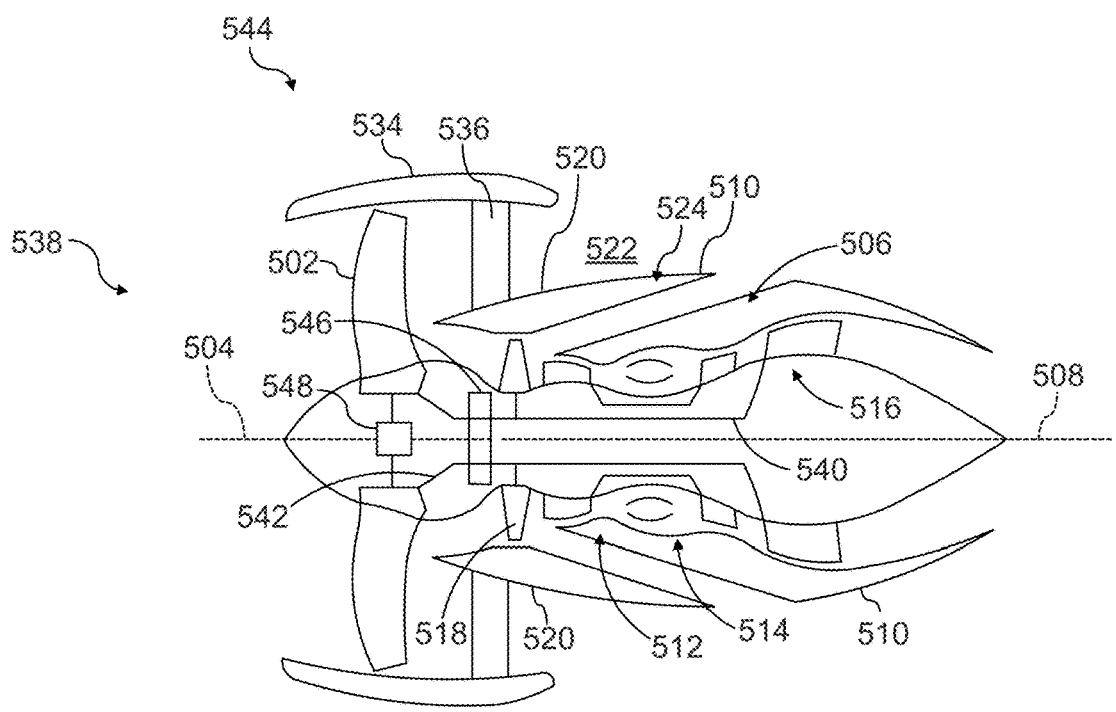
FIG. 9 is a schematic view of a geared, ducted, turbofan engine in accordance with another exemplary aspect of the present disclosure.

For the purposes of Table 2, the term "Ducted" refers to inclusion of an outer nacelle around a primary fan (see, e.g., FIGS. 7 to 9); "Open Rotor" refers to inclusion of an unducted primary fan (see, e.g., FIGS. 1, 10); "Geared" refers to inclusion of a reduction gearbox between the primary fan and a driving turbine (see, e.g., FIGS. 8 to 10); "Direct Drive" refers to exclusion of a reduction gearbox between the primary fan and a driving turbine (see, e.g., FIG. 7); "Variable Pitch" refers to inclusion of a pitch change mechanism for changing a pitch of fan blades on a primary fan (see, e.g., FIGS. 1, 8, 9); "Fixed Pitch" refers to exclusion of a pitch change mechanism for changing a pitch of fan blades on a primary fan (see, e.g., FIGS. 6 to 7); "lower flight speed" refers to an engine designed to operate at a flight speed less than 0.85 Mach; and "higher flight speed" refers to an engine designed to operate at a flight speed higher than 0.85 Mach.

It will be appreciated that although the discussion above is generally relating to the open rotor engine 100 described above with reference to FIGS. 1 and 2, in various embodiments of the present disclosure, the relationships outlined above with respect to, e.g., Expressions (1) and (2) may be applied to any other suitable engine architecture. For example, reference will now be made to FIGS. 6 through 12, each depicting schematically an engine architecture associated with the present disclosure.

Each of the gas turbine engines of FIGS. 6 through 9 generally include a rotor 502 rotatable about a rotor axis 504 and a turbomachine 506 rotatable about a longitudinal axis 508. The rotor 502 corresponds to the "primary fan" described herein. The turbomachine 506 is surrounded at least in part by a core cowl 510 and includes a compressor section 512, a combustion section 514, and a turbine section 516 in serial flow order. In addition to the rotor 502, the gas turbine engines of FIGS. 7 through 9 each also include a ducted mid-fan or secondary fan 518. The gas turbine engines each include a fan cowl 520 surrounding the secondary fan 518.

Referring still to the gas turbine engines of FIGS. 6 through 9, the gas turbine engines each also define a bypass passage 522 downstream of the respective rotor 502 and over the respective fan cowl 520 and core cowl 510, and further define a third stream 524 extending from a location downstream of the respective secondary fan 518 to the respective bypass passage 522 (at least in the embodiments depicted; in other embodiments, the third stream 524 may instead extend to a location downstream of the bypass passage 522).

Referring particularly to FIG. 6, the exemplary gas turbine engine depicted is configured as a turboprop engine 526. In such a manner, the rotor 502 (or primary fan) is configured as a propeller, defining a relatively large diameter. Further, the turboprop engine 526 includes an engine shaft 528 driven by the turbomachine 506, a fan shaft 530 rotatable with the rotor 502, and a gearbox 532 mechanically coupling the engine shaft 528 with the fan shaft 530. The gearbox 532 is an offset gearbox such that the rotor axis 504 is radially offset from the longitudinal axis 508 of the turboprop engine 526.

Notably, in other embodiments of the present disclosure, a turboprop engine may be provided with a reverse flow combustor.

Referring to FIGS. 7 through 9, the gas turbine engines are each configured as turbofan engines, and more specifically as ducted turbofan engines. In such a manner, the gas turbine engines each include an outer nacelle 534 surrounding the rotor 502, and the rotor 502 (or primary fan) of each is therefore configured as a ducted fan. Further, each of the gas turbine engines includes outlet guide vanes 536 extending through the bypass passage 522 to the outer nacelle 534 from the fan cowl 520, the core cowl 510, or both.

More specifically, still, the gas turbine engine of FIG. 7 is configured as a direct drive, ducted, turbofan engine 538. In particular, the direct drive, ducted, turbofan engine 538 includes an engine shaft 540 driven by the turbine section 516 and a fan shaft 542 rotatable with the rotor 502. The fan shaft 542 is configured to rotate directly with (i.e., at the same speed as) the engine shaft 540.

By contrast, the gas turbine engine of FIG. 8 is configured as a geared, ducted, turbofan engine 544. In particular, the geared, ducted, turbofan engine 544 includes the engine shaft 540 driven by the turbine section 516 and the fan shaft 542 rotatable with the rotor 502. However, the exemplary geared, ducted, turbofan engine 544 further includes a gearbox 546 mechanically coupling the engine shaft 540 to the fan shaft 542. The gearbox 546 allows the rotor 502 to rotate at a slower speed than the engine shaft 540, and thus at a slower speed than the secondary fan 518.

Notably, the exemplary geared, ducted, turbofan engine 544 of FIG. 8 further includes a pitch change mechanism 548 operable with the rotor 502 to change a pitch of the rotor blades of the rotor 502. Such may allow for an increased efficiency of the gas turbine engine.

Further, the exemplary gas turbine engine of FIG. 9 is again configured as a direct drive, ducted, turbofan engine 538. However, by contrast to the embodiment of FIG. 8 where a fan duct outlet defined by the fan duct is upstream of a bypass passage outlet defined by the bypass passage, in the embodiment of FIG. 9, the fan duct outlet defined by the fan duct is downstream of the bypass passage outlet defined by the bypass passage.

Moreover, in other exemplary embodiments, other suitable gas turbine engines may be provided. For example, referring now to FIG. 10, a gas turbine engine in accordance with yet another exemplary embodiment of the present disclosure is provided. The exemplary gas turbine engine of FIG. 10 may be configured in a similar manner as the exemplary gas turbine engines described above with reference to FIGS. 7 and 8.

Figure 10:
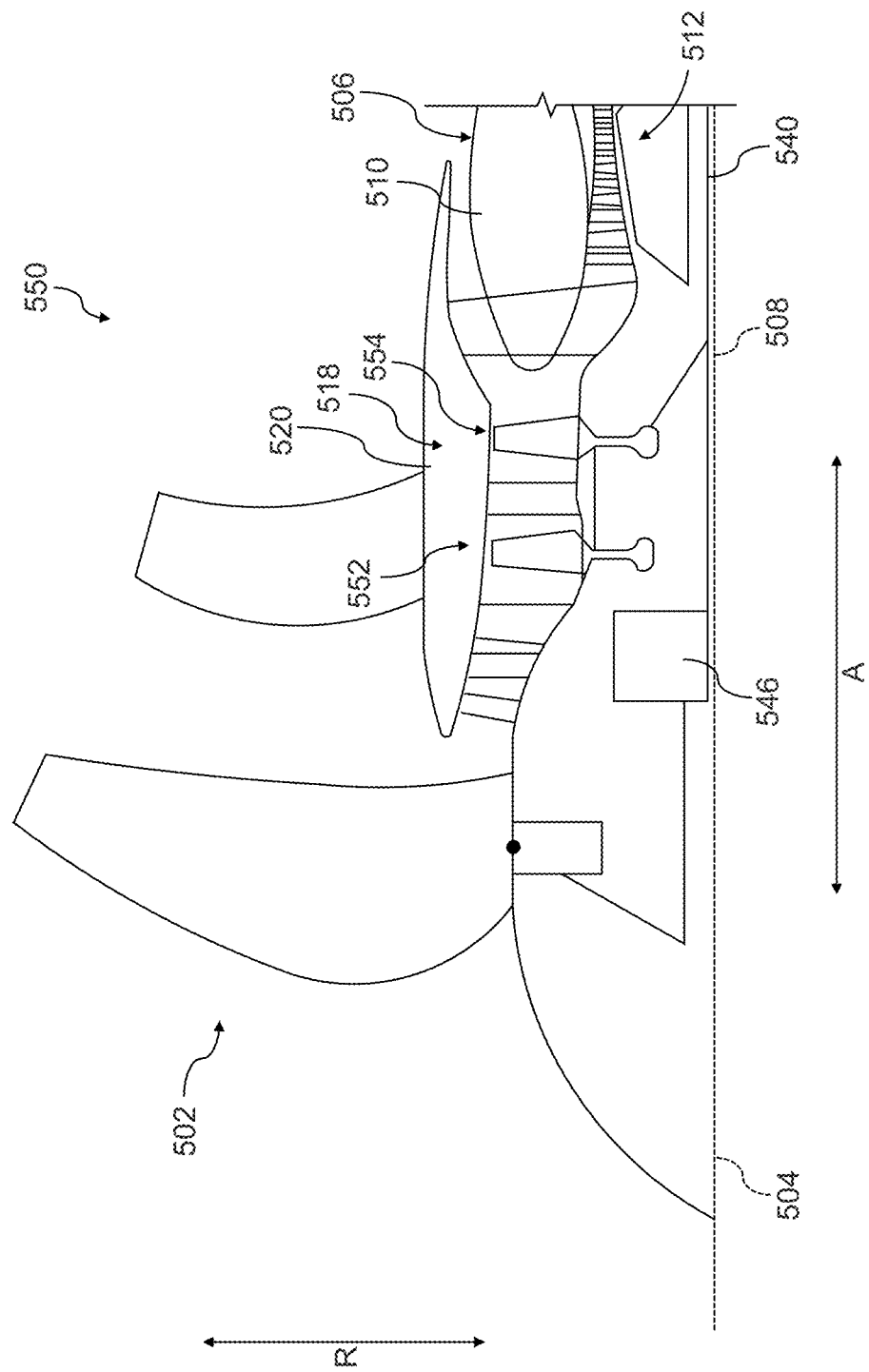
FIG. 10 is a schematic view of an unducted gas turbine engine in accordance with another exemplary aspect of the present disclosure.

For example, the exemplary gas turbine engine of FIG. 10 includes a rotor 502 rotatable about a rotor axis 504 and a turbomachine 506 rotatable about a longitudinal axis 508. The rotor axis 504 and the longitudinal axis 508 are aligned in the embodiment of FIG. 10. The rotor 502 corresponds to the "primary fan" described herein. The turbomachine 506 is surrounded at least in part by a core cowl 510 and includes a compressor section 512 (and, not shown, a combustion section and a turbine section in serial flow order with the compressor section 512). In addition to the rotor 502, the gas turbine engine also includes a ducted mid-fan or secondary fan 518 and a fan cowl 520 surrounding the secondary fan 518.

However, for the embodiment of FIG. 10, the gas turbine engine is configured as an unducted gas turbine engine 550 (see, e.g., FIG. 1), and the secondary fan 518 is not configured as a single stage fan (see fan 184 of FIG. 1). Instead, for the embodiment of FIG. 10, the secondary fan 518 is configured as a multi-stage secondary fan, and more specifically still as a two-stage secondary fan having a total of two stages of rotating compressor rotor blades, and more specifically having a first stage 552 of secondary fan rotor blades and a second stage 554 of secondary fan rotor blades. Notably, with such a configuration, the turbomachine 506 does not include a separate low pressure compressor.

Additionally, in still other exemplary embodiments, the gas turbine engine may have other configurations. For example, referring now to FIG. 11, a gas turbine engine in accordance with yet another exemplary embodiment of the present disclosure is provided. The exemplary gas turbine engine of FIG. 11 may be configured in a similar manner as the exemplary gas turbine engines described above with reference to, e.g., FIGS. 1 through 3.

Figure 11:
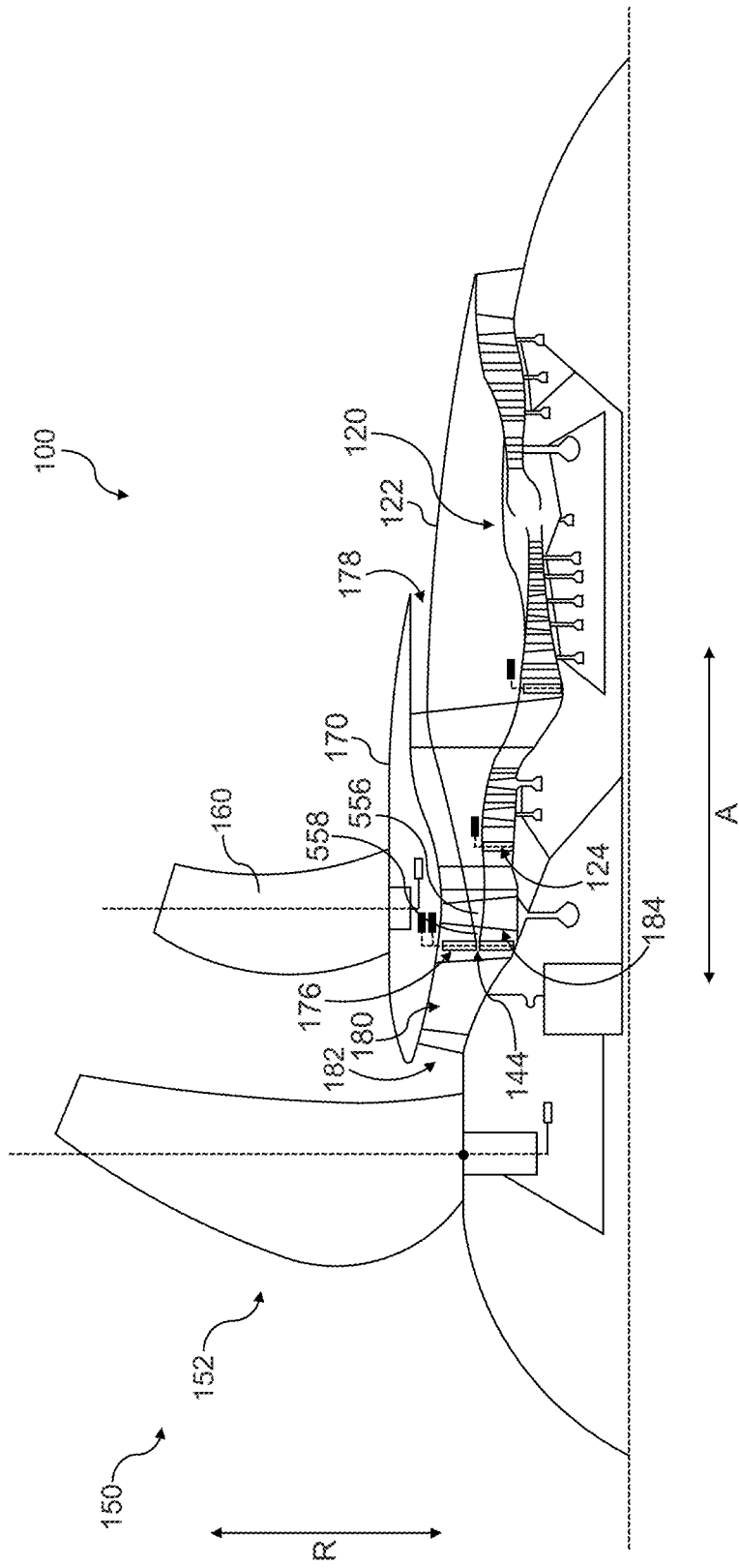
FIG. 11 is a schematic view of an unducted gas turbine engine in accordance with yet another exemplary aspect of the present disclosure.

For example, the exemplary gas turbine engine of FIG. 11 includes a turbomachine 120 and a rotor assembly, also referred to a fan section 150, positioned upstream thereof. The engine 100 further includes a fan cowl 170 and a core cowl 122, the fan cowl 170 annularly encasing at least a portion of the core cowl 122 and generally positioned outward of at least a portion of the core cowl 122 along the radial direction R. Particularly, a downstream section of the fan cowl 170 extends over a forward portion of the core cowl 122 to define a fan duct flowpath, or simply fan duct 172. Incoming air may enter through the fan duct 172 through a fan duct inlet 176 and may exit through a fan exhaust nozzle 178 to produce propulsive thrust. The fan duct 172 extends from a leading edge 144 of the core cowl 122.

The engine 100 also defines an inlet duct 180. The inlet duct 180 extends between an engine inlet 182 and a core inlet 124. The engine inlet 182 is defined generally at the forward end of the fan cowl 170 and is positioned between a fan 152 of the fan section 150 and a fan guide vane array 160 along the axial direction A. The engine 100 further includes a ducted fan 184 with a plurality of fan blades located at least partially in the inlet duct 180.

However, for the embodiment of FIG. 11, the core cowl 122 carries forward to an aft edge of the fan blades of the ducted fan 184 and the fan blades themselves include an integral splitter 556. This may be termed a blade-on-blade configuration where inner and outer blades are effectively superimposed upon one another and may be unitarily formed or otherwise fabricated to achieve the split between streams.

The core cowl 122 further includes a section 558 extending forward past the fan blades of the ducted fan 184, such that the leading edge 144 is located forward of the fan blades of the ducted fan 184. With such an arrangement, the fan duct inlet 176 is also located forward of the fan blades of the ducted fan 184, and an outer portion of the fan blades along the radial direction R is positioned within the fan duct 172.

With this configuration, a secondary fan outer fan area, $A_{S\_Out}$, may be calculated at the fan duct inlet 176 in the same manner discussed above with reference to, e.g., FIGS. 2 and 3.

Further, with such a configuration, the secondary fan inner fan area, $A_{S\_In}$, still refers to an area defined by an annulus representing a portion of the ducted fan 184 located inward of the leading edge 144 of the core cowl 122. However, a calculation of the secondary fan inner fan area, $A_{S\_In}$, is based on a leading edge radius, $R_7$, of the leading edge 144 and an inner fan duct radius, defined along the radial direction R, directly inward along the radial direction R from the leading edge 144 (and not a core inlet inner radius at the core inlet 124).

Further, still, in other exemplary embodiments, other engine configurations may be provided. For example, referring now to FIG. 12, an engine 100 in accordance with another embodiment of the present disclosure is provided. The engine 100 of FIG. 12 may be configured in a similar manner as the exemplary engine 100 of, e.g., FIGS. 1 through 3.

Figure 12:
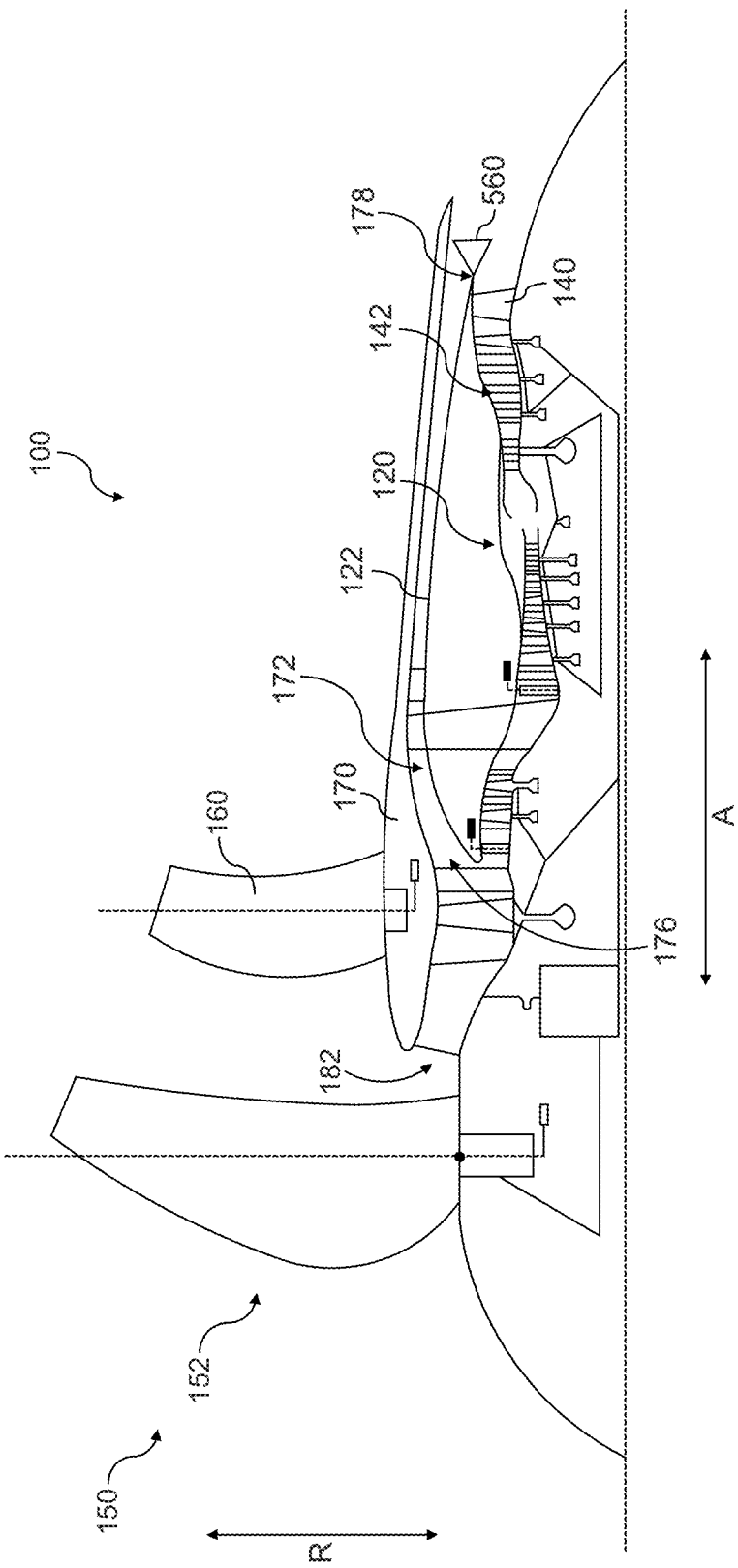
FIG. 12 is a schematic view of an unducted gas turbine engine in accordance with still another exemplary aspect of the present disclosure.

For example, the exemplary gas turbine engine of FIG. 12 includes a turbomachine 120 and a rotor assembly, also referred to a fan section 150, positioned upstream thereof. The engine 100 further includes a fan cowl 170 and a core cowl 122, the fan cowl 170 annularly encasing at least a portion of the core cowl 122 and generally positioned outward of at least a portion of the core cowl 122 along the radial direction R. Particularly, a downstream section of the fan cowl 170 extends over a forward portion of the core cowl 122 to define a fan duct flowpath, or simply fan duct 172. Incoming air may enter through the fan duct 172 through a fan duct inlet 176 and may exit through a fan exhaust nozzle 178 to produce propulsive thrust. The fan duct 172 extends from a leading edge 144 of the core cowl 122.

However, for the embodiment of FIG. 12, the fan duct 172 of the exemplary engine 100 is an elongated fan duct 172 extending between the fan cowl 170 and the core cowl 122, a full length of the core cowl 122. With such a configuration, the fan exhaust nozzle 178 is downstream of an exhaust nozzle 140 of the turbomachine 120. The engine 100 of FIG. 12 further includes a mixing device 560 in the region aft of the exhaust nozzle 140 to aid in mixing airflow from the fan duct 172 and from a working gas flowpath 142 of the turbomachine 120, e.g., to improve acoustic performance by directing airflow from the working gas flowpath 142 of the turbomachine 120 outward and from the fan duct 172 inward. Mixing in such a manner may improve performance and noise emissions.

Moreover, in other exemplary embodiments of the present disclosure, a gas turbine engine may have still other suitable configurations. For example, in other embodiments, the gas turbine engine may include any suitable number of shafts or spools, compressors, or turbines (e.g., the gas turbine engine may be a three-spool engine having three turbines and associated spools).

Further, it will be appreciated that in at least certain exemplary embodiments of the present disclosure, a method of operating a gas turbine engine is provided. The method may be utilized with one or more of the exemplary gas turbine engines discussed herein, such as in FIGS. 1 through 12. The method includes operating the gas turbine engine at a rated speed, wherein operating the gas turbine engine at the rated speed comprises operating the gas turbine engine to define a thrust to power airflow ratio between 3.5 and 100 and a core bypass ratio between 0.1 and 5. For the exemplary method, the thrust to power airflow ratio is a ratio of an airflow through a bypass passage over a turbomachine of the gas turbine engine plus an airflow through a fan duct to an airflow through a core duct, and the core bypass ratio is a ratio of the airflow through the fan duct to the airflow through the core duct.

As will be appreciated from the description herein, various embodiments of a gas turbine engine are provided. Certain of these embodiments may be an unducted, single rotor gas turbine engine (see FIGS. 1 and 2, 11, and 12), a turboprop engine (see FIG. 6), or a ducted turbofan engine (see FIGS. 7 through 9). Another example of a ducted turbofan engine can be found in U.S. patent application Ser. No. 16/811,368 (Published as U.S. Patent Application Publication No. 2021/0108597), filed Mar. 6, 2020 (FIG. 10, Paragraph [0062], et al.; including an annular fan case 13 surrounding the airfoil blades 21 of rotating element 20 and surrounding vanes 31 of stationary element 30; and including a third stream/fan duct 73 (shown in FIG. 10, described extensively throughout the application)). Various additional aspects of one or more of these embodiments are discussed below. These exemplary aspects may be combined with one or more of the exemplary gas turbine engine(s) discussed above with respect to the figures.

For example, in some embodiments of the present disclosure, the engine may include a heat exchanger located in an annular duct, such as in a third stream. The heat exchanger may extend substantially continuously in a circumferential direction of the gas turbine engine (e.g., at least 300 degrees, such as at least 330 degrees).

In one or more of these embodiments, a threshold power or disk loading for a fan (e.g., an unducted single rotor or primary forward fan) may range from 25 horsepower per square foot ($hp/ft^2$) or greater at cruise altitude during a cruise operating mode. In particular embodiments of the engine, structures and methods provided herein generate power loading between 80 $hp/ft^2$ and 160 $hp/ft^2$ or higher at cruise altitude during a cruise operating mode, depending on whether the engine is an open rotor or ducted engine.

In various embodiments, an engine of the present disclosure is applied to a vehicle with a cruise altitude up to approximately 65,000 ft. In certain embodiments, cruise altitude is between approximately 28,000 ft and approximately 45,000 ft. In still certain embodiments, cruise altitude is expressed in flight levels based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 psia and approximately 0.82 psia based on a sea level pressure of approximately 14.70 psia and sea level temperature at approximately 59 degrees Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

As such, it will be appreciated that an engine of such a configuration may be configured to generate at least 25,000 pounds and less than 80,000 of thrust during operation at a rated speed, such as between 25,000 and 50,000 pounds of thrust during operation at a rated speed, such as between 25,000 and 40,000 pounds of thrust during operation at a rated speed. Alternatively, in other exemplary aspects, an engine of the present disclosure may be configured to generate much less power, such as at least 2,000 pounds of thrust during operation at a rated speed.

In various exemplary embodiments, the fan (or rotor) may include twelve (12) fan blades. From a loading standpoint, such a blade count may allow a span of each blade to be reduced such that the overall diameter of the primary fan may also be reduced (e.g., to twelve feet in one exemplary embodiment). That said, in other embodiments, the fan may have any suitable blade count and any suitable diameter. In certain suitable embodiments, the fan includes at least eight (8) blades. In another suitable embodiment, the fan may have at least twelve (12) blades. In yet another suitable embodiment, the fan may have at least fifteen (15) blades. In yet another suitable embodiment, the fan may have at least eighteen (18) blades. In one or more of these embodiments, the fan includes twenty-six (26) or fewer blades, such as twenty (20) or fewer blades. Alternatively, in certain suitable embodiments, the fan may only include at least four (4) blades, such as with a fan of a turboprop engine.

Further, in certain exemplary embodiments, the rotor assembly may define a rotor diameter (or fan diameter) of at least 10 feet, such as at least 11 feet, such as at least 12 feet, such as at least 13 feet, such as at least 15 feet, such as at least 17 feet, such as up to 28 feet, such as up to 26 feet, such as up to 24 feet, such as up to 18 feet.

In various embodiments, it will be appreciated that the engine includes a ratio of a quantity of vanes to a quantity of blades that could be less than, equal to, or greater than 1:1. For example, in particular embodiments, the engine includes twelve (12) fan blades and ten (10) vanes. In other embodiments, the vane assembly includes a greater quantity of vanes to fan blades. For example, in particular embodiments, the engine includes ten (10) fan blades and twenty-three (23) vanes. For example, in certain embodiments, the engine may include a ratio of a quantity of vanes to a quantity of blades between 1:2 and 5:2. The ratio may be tuned based on a variety of factors including a size of the vanes to ensure a desired amount of swirl is removed for an airflow from the primary fan.

Additionally, in certain exemplary embodiments, where the engine includes the third stream and a mid-fan (a ducted fan aft of the primary, forward fan), a ratio R1/R2 may be between 1 and 10, or 2 and 7, or at least 3.3, at least 3.5, at least 4 and less than or equal to 7, where R1 is the radius of the primary fan and R2 is the radius of the mid-fan.

It should be appreciated that various embodiments of the engine, such as the single unducted rotor engine depicted and described herein, may allow for normal subsonic aircraft cruise altitude operation at or above Mach 0.5. In certain embodiments, the engine allows for normal aircraft operation between Mach 0.55 and Mach 0.85 at cruise altitude. In still particular embodiments, the engine allows for normal aircraft operation between Mach 0.75 and Mach 0.85. In certain embodiments, the engine allows for rotor blade tip speeds at or less than 750 feet per second (fps). In other embodiments, the rotor blade tip speed at a cruise flight condition can be 650 to 900 fps, or 700 to 800 fps. Alternatively, in certain suitable embodiments, the engine allows for normal aircraft operation of at least Mach 0.3, such as with turboprop engines.

A fan pressure ratio (FPR) for the primary fan of the fan assembly can be 1.04 to 2.20, or in some embodiments 1.05 to 1.2, or in some embodiments less than 1.08, as measured across the fan blades of the primary fan at a cruise flight condition.

In order for the gas turbine engine to operate with a fan having the above characteristics to define the above FPR, a gear assembly may be provided to reduce a rotational speed of the fan assembly relative to a driving shaft (such as a low pressure shaft coupled to a low pressure turbine). In some embodiments, a gear ratio of the input rotational speed to the output rotational speed is between 3.0 and 4.0, between 3.2 and 3.5, or between 3.5 and 4.5. In some embodiments, a gear ratio of the input rotational speed to the output rotational speed is greater than 4.1. For example, in particular embodiments, the gear ratio is within a range of 4.0 to 4.5, within a range of 4.1 to 14.0, within a range of 4.5 to 14.0, or within a range of 6.0 to 14.0. In certain embodiments, the gear ratio is within a range of 4.5 to 12 or within a range of 6.0 to 11.0.

With respect to a turbomachine of the gas turbine engine, the compressors and/or turbines can include various stage counts. As disclosed herein, the stage count includes the number of rotors or blade stages in a particular component (e.g., a compressor or turbine). For example, in some embodiments, a low pressure compressor may include 1 to 8 stages, a high-pressure compressor may include 4 to 15 stages, a high-pressure turbine may include 1 to 2 stages, and/or a low pressure turbine (LPT) may include 1 to 7 stages. In particular, the LPT may have 4 stages, or between 4 and 7 stages. For example, in certain embodiments, an engine may include a one stage low pressure compressor, an 11 stage high pressure compressor, a two stage high pressure turbine, and 4 stages, or between 4 and 7 stages for the LPT. As another example, an engine can include a three stage low-pressure compressor, a 10 stage high pressure compressor, a two stage high pressure turbine, and a 7 stage low pressure turbine.

A core engine is generally encased in an outer casing defining one half of a core diameter (Dcore), which may be thought of as the maximum extent from a centerline axis (datum for R). In certain embodiments, the engine includes a length (L) from a longitudinally (or axial) forward end to a longitudinally aft end. In various embodiments, the engine defines a ratio of L/Dcore that provides for reduced installed drag. In one embodiment, L/Dcore is at least 2. In another embodiment, L/Dcore is at least 2.5. In some embodiments, the L/Dcore is less than 5, less than 4, and less than 3. In various embodiments, it should be appreciated that the L/Dcore is for a single unducted rotor engine.

The reduced installed drag may further provide for improved efficiency, such as improved specific fuel consumption. Additionally, or alternatively, the reduced installed drag may provide for cruise altitude engine and aircraft operation at the above describe Mach numbers at cruise altitude. Still particular embodiments may provide such benefits with reduced interaction noise between the blade assembly and the vane assembly and/or decreased overall noise generated by the engine by virtue of structures located in an annular duct of the engine.

Additionally, it should be appreciated that ranges of power loading and/or rotor blade tip speed may correspond to certain structures, core sizes, thrust outputs, etc., or other structures of the core engine. However, as previously stated, to the extent one or more structures provided herein may be known in the art, it should be appreciated that the present disclosure may include combinations of structures not previously known to combine, at least for reasons based in part on conflicting benefits versus losses, desired modes of operation, or other forms of teaching away in the art.

Although depicted above as an unshrouded or open rotor engine in the embodiments depicted above, it should be appreciated that aspects of the disclosure provided herein may be applied to shrouded or ducted engines, partially ducted engines, aft-fan engines, or other gas turbine engine configurations, including those for marine, industrial, or aero-propulsion systems. Certain aspects of the disclosure may be applicable to turbofan, turboprop, or turboshaft engines. However, it should be appreciated that certain aspects of the disclosure may address issues that may be particular to unshrouded or open rotor engines, such as, but not limited to, issues related to gear ratios, fan diameter, fan speed, length (L) of the engine, maximum diameter of the core engine (Dcore) of the engine, L/Dcore of the engine, desired cruise altitude, and/or desired operating cruise speed, or combinations thereof.

In various exemplary aspects of the present disclosure, a three-stream gas turbine engine is provided, equipped with an embedded electric machine. Notably, the inventors of the present disclosure have found that certain architectural arrangements of the three-stream gas turbine engine having an embedded electric machine with certain operating relationships between components thereof can provide advantages over conventional gas turbine engines.

For example, incorporating one or more embedded electric machines in the gas turbine engine can allow for the gas turbine engine to increase efficiency by, e.g., extracting power from a more efficient shaft or spool and providing such power to, e.g., a less efficient shaft or spool (power sharing), one or more domestic systems, one or more aircraft systems, etc. Additionally, or alternatively, incorporating one or more embedded electric machines in the gas turbine engine can allow for the gas turbine engine to provide power from a power source to one or more shafts of the engine during certain engine operations to improve an operability of the gas turbine engine (allowing the engine to run closer to stall lines, etc.). Additionally, or alternatively still, incorporating one or more embedded electric machines in the gas turbine engine can allow for the gas turbine engine to manage thermal loads of the gas turbine engine at shutdown by motoring one or more shafts of the gas turbine engine.

In particular, the inventors of the present disclosure found that by incorporating one or more embedded electric machines in the gas turbine engine, in combination with one or more of the embodiments described hereinabove (e.g., an engine having a fan duct with particular thrust to power airflow ratios (TPAR) and core bypass ratios (CBR)) can result in an engine having unexpected and complementary benefits. For example, the TPAR and CBR ranges provide for a relative core size and fan power for the gas turbine engine. This relationship further sets a size of the fan duct. The fan duct can beneficially be used to provide cooling for the one or more embedded electric machines, and therefore a size of the fan duct can set parameters for a size of the one more electric machines.

Furthermore, disclosed hereinbelow are one or more structural parameters (e.g., electric machine tip radius, electric machine length), and further one or more operational parameters (e.g., tip speed) for the one or more embedded electric machines to ensure a desired amount of power is provided at desired efficiency for the gas turbine engine. By designing the gas turbine engine within the TPAR and CBR ranges disclosed hereinabove and further designing the gas turbine engine to have one or more embedded electric machines within the structure parameter ranges set forth herein below, operational parameter ranges set forth herein below, or both, the resulting gas turbine engine will be better suited for providing one or more of the above benefits associated with inclusion of an embedded electric machine, or otherwise meeting a particular set of mission requires with a desired efficiency. For example, such a gas turbine engine can exhibit enhanced operability during certain mission requirements by designing the gas turbine engine to have one or more embedded electric machines within the structural volume, size, weight envelope ranges disclosed herein below, operational ranges set forth herein below, or both.

Figure 13:
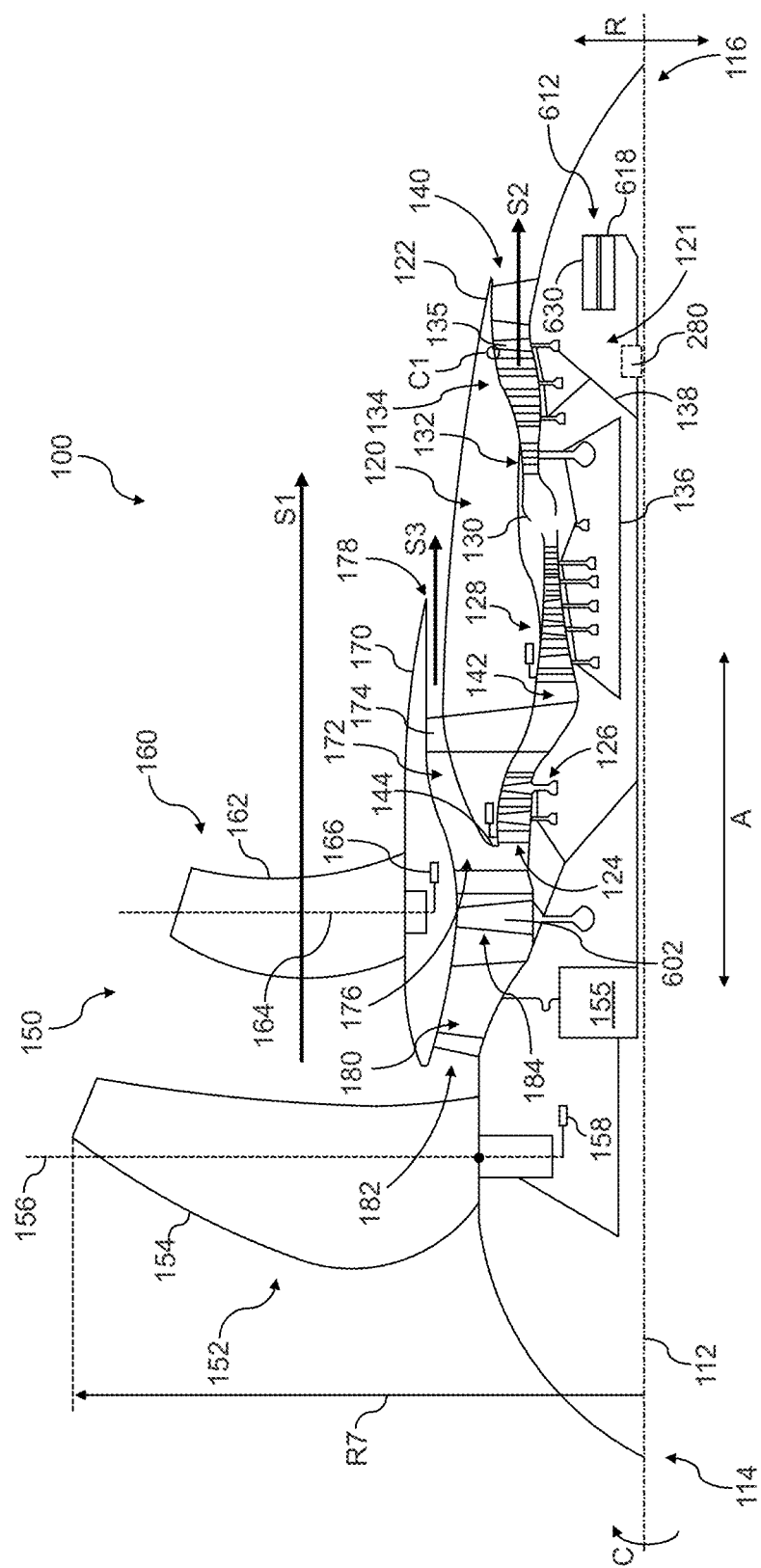
FIG. 13 provides a schematic cross-sectional view of a three-stream gas turbine engine according to various embodiments of the present disclosure.

Turning now back to the drawings, FIG. 13 provides a schematic cross-sectional view of a gas turbine engine according to another example embodiment of the present disclosure. Particularly, FIG. 13 is configured in substantially the same manner as the exemplary gas turbine engine 100 described above with reference to FIG. 1, and the same or similar numbers may refer to the same or similar parts. The engine 100 of FIG. 13 can be mounted to an aerial vehicle, such as a fixed-wing aircraft, and can produce thrust for propulsion of the aerial vehicle. The engine 100 is a "three-stream engine" in that its architecture includes a third stream, providing three distinct streams of thrust-producing airflow during operation.

In particular, the engine 100 defines an axial direction A, a radial direction R, and a circumferential direction C. Moreover, the engine 100 defines an axial centerline or longitudinal axis 112 that extends along the axial direction A.

The engine 100 includes a turbomachine 120 and a fan section 150 positioned upstream thereof. Generally, the turbomachine 120 includes, in serial flow order, a compressor section, a combustion section, a turbine section, and an exhaust section. Particularly, as shown in FIG. 13, the turbomachine 120 includes an engine core 121 and a core cowl 122 that annularly surrounds the engine core 121. The engine core 121 and core cowl 122 define an annular core inlet 124. The core cowl 122 additionally encloses and supports a booster or low pressure compressor 126 for pressurizing the air that enters the turbomachine 120 through core inlet 124. A high pressure, multi-stage, axial-flow compressor 128 receives pressurized air from the LP compressor 126 and further increases the pressure of the air. The pressurized air stream flows downstream to a combustor 130 where fuel is injected into the pressurized air stream and ignited to raise the temperature and energy level of the pressurized air.

Additionally, the high energy combustion products flow from the combustor 130 downstream to a high pressure turbine 132. The high pressure turbine 132 drives the high pressure compressor 128 through a first shaft or high pressure shaft 136. In this regard, the high pressure turbine 132 is drivingly coupled with the high pressure compressor 128. The high energy combustion products then flow to a low pressure turbine 134. The low pressure turbine 134 drives the low pressure compressor 126, components of the fan section 150, and an electric machine 612 through a second shaft or low pressure shaft 138. In this regard, the low pressure turbine 134 is drivingly coupled with the low pressure compressor 126, components of the fan section 150, and the electric machine 612. A low pressure ("LP") shaft 138 is coaxial with a high pressure ("HP") shaft 136 in this example embodiment. After driving each of the turbines 132, 134, the combustion products exit the turbomachine 120 through a core exhaust nozzle 140 to produce propulsive thrust. Accordingly, the turbomachine 120 defines a working gas flowpath or core duct 142 that extends between the core inlet 124 and the core exhaust nozzle 140. The core duct 142 is an annular duct positioned generally inward of the core cowl 122 along the radial direction R.

Figure 14:
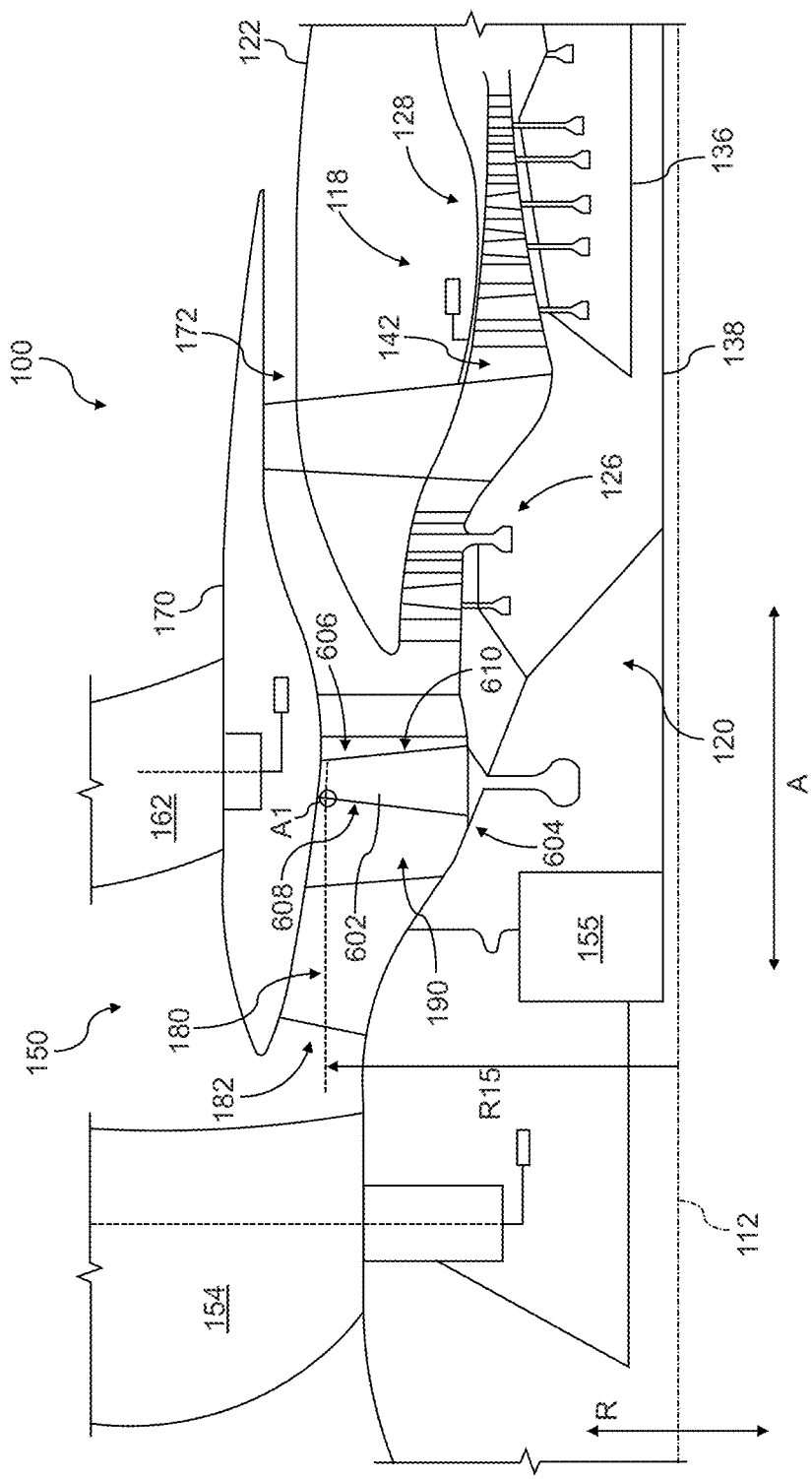
FIG. 14 provides a close-up, schematic cross-sectional view of a forward portion of the three-stream engine of FIG. 1.

Referring now to FIG. 14 in addition to FIG. 13, FIG. 14 provides a close-up, schematic cross-sectional view of a forward portion of the engine 100. As depicted, the fan section 150 also includes a mid-fan 184 (also referred to herein as a secondary fan or ducted fan). The mid-fan 184 includes an array of mid-fan blades 602 (only one shown in FIG. 1). The mid-fan blades 602 are rotatable, e.g., about the longitudinal axis 112. The mid-fan 184 is drivingly coupled with the low pressure turbine 134 via the LP shaft 138. The mid-fan blades 602 can be arranged in equal circumferential spacing around the longitudinal axis 112. As shown best in FIG. 14, each mid-fan blade 602 has a root 604 and a tip 606 and a span defined therebetween. Moreover, each mid-fan blade 602 has a leading edge 608 and a trailing edge 610. The mid-fan blades 602 are annularly surrounded or ducted by the fan cowl 170. In this regard, the mid-fan 184 is positioned inward of the fan cowl 170 along the radial direction R. Moreover, for this example embodiment, the mid-fan 184 is positioned within the inlet duct 180 upstream of both the core duct 142 and the fan duct 172.

Air flowing through the inlet duct 180 flows across the mid-fan blades 602 and is accelerated downstream thereof, particularly at the tips 606 of the mid-fan blades 602. At least a portion of the air accelerated by the mid-fan blades 602 flows into the fan duct 172 and is ultimately exhausted through the fan exhaust nozzle 178 to produce propulsive thrust. Also, at least a portion of the air accelerated by the mid-fan blades 602 flows into the core duct 142 and is ultimately exhausted through the core exhaust nozzle 140 to produce propulsive thrust. Generally, the mid-fan 184 is a compression device positioned downstream of the engine inlet 182. The mid-fan 184 is operable to accelerate air into the fan duct 172 or secondary bypass passage.

It will be appreciated that embodiments of the engine, system, and methods provided herein generate an increased unducted rotor efficiency at and above a threshold power loading (i.e., power/area of rotor airfoil). As such, it will be appreciated that an engine of such a configuration can be configured to generate between about 25,000 and 35,000 pounds of thrust during operation at a rated speed.

Referring still to FIG. 13, for the exemplary embodiment of FIG. 13, the primary fan 152 includes twelve (12) fan blades 154. From a loading standpoint, such a blade count may allow a span of each blade 154 to be reduced such that the overall diameter of the primary fan 152 may also be reduced (e.g., to about twelve feet in the exemplary embodiment). That said, in other embodiments, the primary fan 152 may have any suitable blade count and any suitable diameter.

Moreover, the engine 100 can be arranged to define a primary fan radius to mid-fan radius ratio. The primary fan radius to mid-fan radius ratio is defined as: Primary Fan Radius/Mid-Fan Radius (Ratio 1).

The Primary Fan Radius is measured as a radial length or radius spanning along the radial direction R between the longitudinal axis 112 and a leading edge tip of one of the fan blades 154 of the primary fan 152. Particularly, as shown best in FIG. 13, the Primary Fan Radius is measured as Radius R7, which spans along the radial direction R between the longitudinal axis 112 and a leading edge tip of one of the primary fan blades 154. The Mid-Fan Radius is measured as a radial length or radius spanning along the radial direction R between the longitudinal axis 112 and a leading edge tip of one of the mid-fan blades 602 of the mid-fan 184. Particularly, as shown best in FIG. 14, the Mid-Fan Radius is measured as Radius R15, which spans along the radial direction R between the longitudinal axis 112 and a leading edge tip of one of the mid-fan blades 602.

In certain exemplary embodiments, the engine 100 defines the primary fan radius to mid-fan radius ratio as being equal to or greater than 2.0 and less than or equal to 6.5. Particularly, in some embodiments, the engine 100 defines the primary fan radius to mid-fan radius ratio as being at least about 2.0. In other embodiments, the engine 100 defines the primary fan radius to mid-fan radius ratio as being at least about 2.5. In still other embodiments, the engine 100 defines the primary fan radius to mid-fan radius ratio as being at least about 3.0. For example, in FIG. 13, the primary fan radius to mid-fan radius ratio is slightly greater than 3.0. In some further embodiments, the engine 100 defines the primary fan radius to mid-fan radius ratio as being at least about 4.0. In yet other embodiments, the engine 100 defines the primary fan radius to mid-fan radius ratio as being at least about 6.0. In some other embodiments, the engine 100 defines the primary fan radius to mid-fan radius ratio as being about 6.5. For the embodiments having the stated lower bounds of the primary fan radius to mid-fan radius ratio mentioned in this paragraph, unless stated otherwise, the upper bound of these noted ratios may be up to 6.5. The inventors of the present disclosure have found that three-stream engines having a primary fan and mid-fan arranged according to the noted ranges/ratios advantageously balance aerodynamic performance and engine efficiency with mechanical constraints of the primary fan and mid-fan.

Referring still to FIG. 13, operation of the engine 100 may be summarized in the following exemplary manner. During operation, an initial or incoming airflow passes through the fan blades 154 of the primary fan 152 and splits into a first airflow and a second airflow. The first airflow bypasses the engine inlet 182 and flows generally along the axial direction A outward of the fan cowl 170 along the radial direction R. The first airflow accelerated by the primary fan blades 154 passes through the fan guide vanes 162 and continues downstream thereafter to produce a primary propulsion stream or first thrust stream S1. The vast majority of the net thrust produced by the engine 100 is produced by the first thrust stream S1. The second airflow enters the inlet duct 180 through annular engine inlet 182.

Further, the second airflow flowing downstream through the inlet duct 180 flows through the mid-fan blades 602 of the mid-fan 184 and is consequently compressed. The second airflow flowing downstream of the mid-fan 184 is split by the splitter 144 located at the forward end of the core cowl 122. Particularly, a portion of the second airflow flowing downstream of the mid-fan 184 flows into the core duct 142 through the core inlet 124. The portion of the second airflow that flows into the core duct 142 is progressively compressed by the LP compressor 126 and HP compressor 128 and is ultimately discharged into the combustion section. The discharged pressurized air stream flows downstream to the combustor 130 where fuel is introduced to generate combustion gases or products.

More specifically, the combustor 130 defines an annular combustion chamber that is generally coaxial with the longitudinal centerline axis 112. The combustor 130 receives an annular stream of pressurized air from the HP compressor 128 via a pressure compressor discharge outlet. A portion of this compressor discharge air flows into a mixer (not shown). Fuel is injected by a fuel nozzle to mix with the air thereby forming a fuel-air mixture that is provided to the combustion chamber for combustion. Ignition of the fuel-air mixture is accomplished by one or more suitable igniters, and the resulting combustion gases flow along the axial direction A toward and into an annular, first stage turbine nozzle of the HP turbine 132. The first stage nozzle is defined by an annular flow channel that includes a plurality of radially-extending, circumferentially-spaced nozzle vanes that turn the gases so that they flow angularly and impinge upon the first stage turbine blades of the HP turbine 132. The combustion products exit the HP turbine 132 and flow through the LP turbine 134 and exit the core duct 142 through the core exhaust nozzle 140 to produce a core air stream or second thrust stream S2. For this embodiment, as noted above, the HP turbine 132 drives the HP compressor 128 via the HP shaft 136 and the LP turbine 134 drives the LP compressor 126, the primary fan 152, the mid-fan 184, and the electric machine 612 via the LP shaft 138.

The other portion of the second airflow flowing downstream of the mid-fan 184 is split by the splitter 144 into the fan duct 172. The air enters the fan duct 172 through the fan duct inlet 176. The air flows generally along the axial direction A through the fan duct 172 and is ultimately exhausted from the fan duct 172 through the fan exhaust nozzle 178 to produce a third thrust stream S3.

In some embodiments, a pressure ratio of the third stream (denoted "S3" in FIG. 1) is higher than that of the primary propulsion stream (e.g., a bypass or propeller driven propulsion stream). The thrust may be produced through a dedicated nozzle or through mixing of the secondary air stream with the primary propulsion stream or a core air stream, e.g., into a common nozzle.

Figure 17:
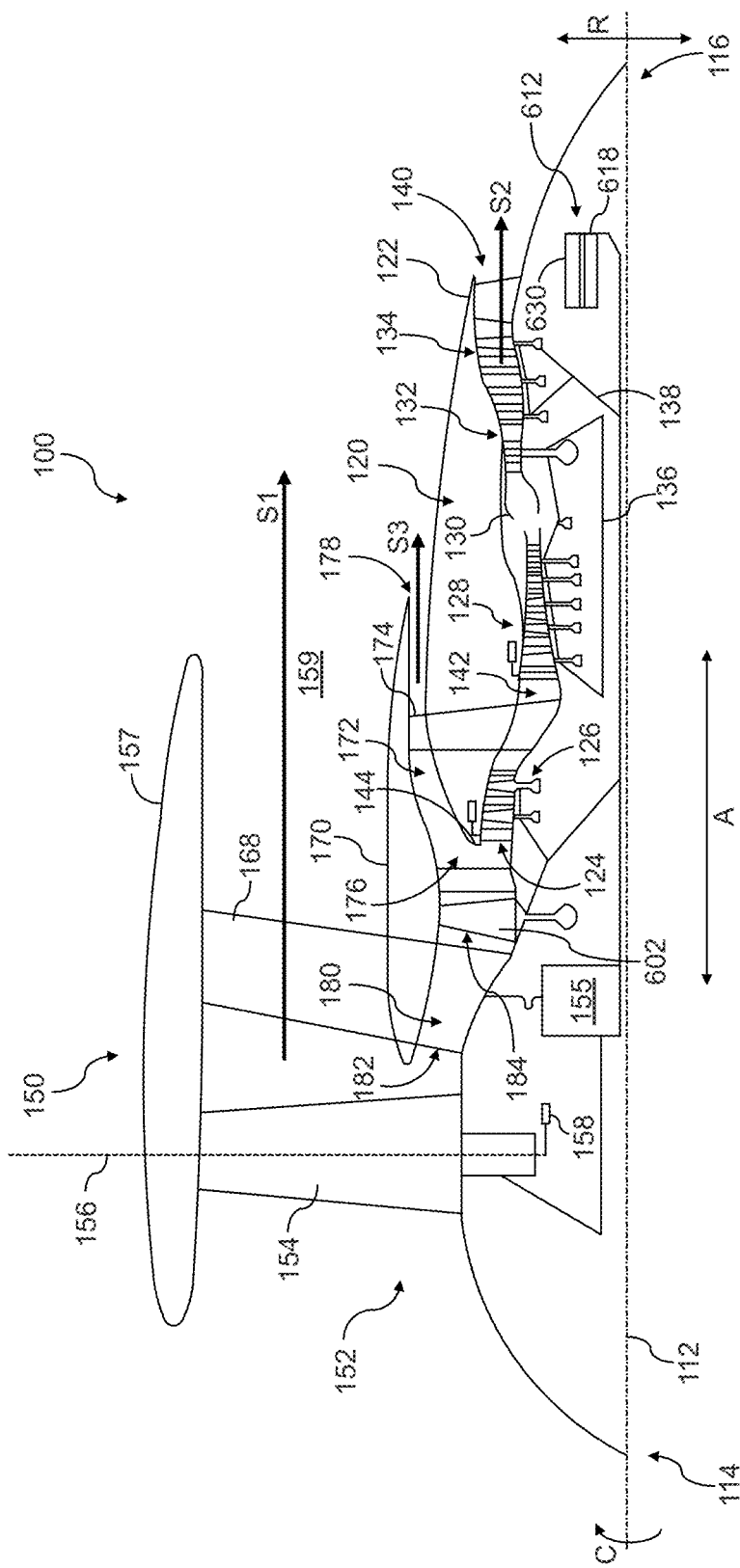
FIG. 17 provides a schematic cross-sectional view of a three-stream gas turbine engine having a ducted primary fan according to various embodiments of the present disclosure.

Although the engine 100 has been described and illustrated in FIG. 13 as representing an example three-stream gas turbine engine operable to produce first thrust stream S1, second thrust stream S2, and third thrust stream S3, it will be appreciated that the inventive aspects of the present disclosure may apply to three-stream gas turbine engines having other configurations. For example, in other example embodiments, the primary fan 152 can be ducted by fan casing 157 or outer nacelle. Such a configuration is shown, e.g., in FIG. 17. As is depicted in FIG. 17, a bypass passage 159 may be defined between the fan casing 157 and the fan cowl 170. The first thrust stream S1 may flow through the bypass passage 159. One or more circumferentially-spaced outlet guide vanes 168 (only one shown in FIG. 17) can extend between and connect the fan casing 157, the fan cowl 170, and the engine core 121 to provide structural support for these components. The bypass passage (not separately labeled) is located within the bypass region 194 and refers to a passage where airflow from the fan 152 passes over the inlet duct 180

Further, for the depicted embodiment of FIG. 13 (as well as the embodiment of FIG. 17), the engine 100 includes an electric machine operably coupled with a rotating component thereof. In this regard, the engine 100 is an aeronautical hybrid-electric propulsion machine.

More specifically, as shown in FIG. 13, the engine 100 includes electric machine 612 operatively coupled with the LP shaft 138. The electric machine 612 can be directly mechanically connected to the LP shaft 138, or alternatively, the electric machine 612 can be mechanically coupled with the LP shaft 138 indirectly, e.g., by way of a gearbox 280. Further, although the electric machine 612 is operatively coupled with the LP shaft 138 at an aft end of the LP shaft 138, the electric machine 612 can be coupled with the LP shaft 138 at any suitable location or can be coupled to other rotating components of the engine 100, such as the HP shaft 136.

As will be appreciated, in some embodiments, the electric machine 612 can be an electric motor operable to drive or motor the LP shaft 138, e.g., during an engine burst. In other embodiments, the electric machine 612 can be an electric generator operable to convert mechanical energy into electrical energy. In this way, electrical power generated by the electric machine 612 can be directed to various engine and/or aircraft systems. In certain exemplary embodiments, the electric machine 612 can be a motor/generator with dual functionality. The electric machine 612 will be further described below with respect to FIG. 15.

Figure 15:
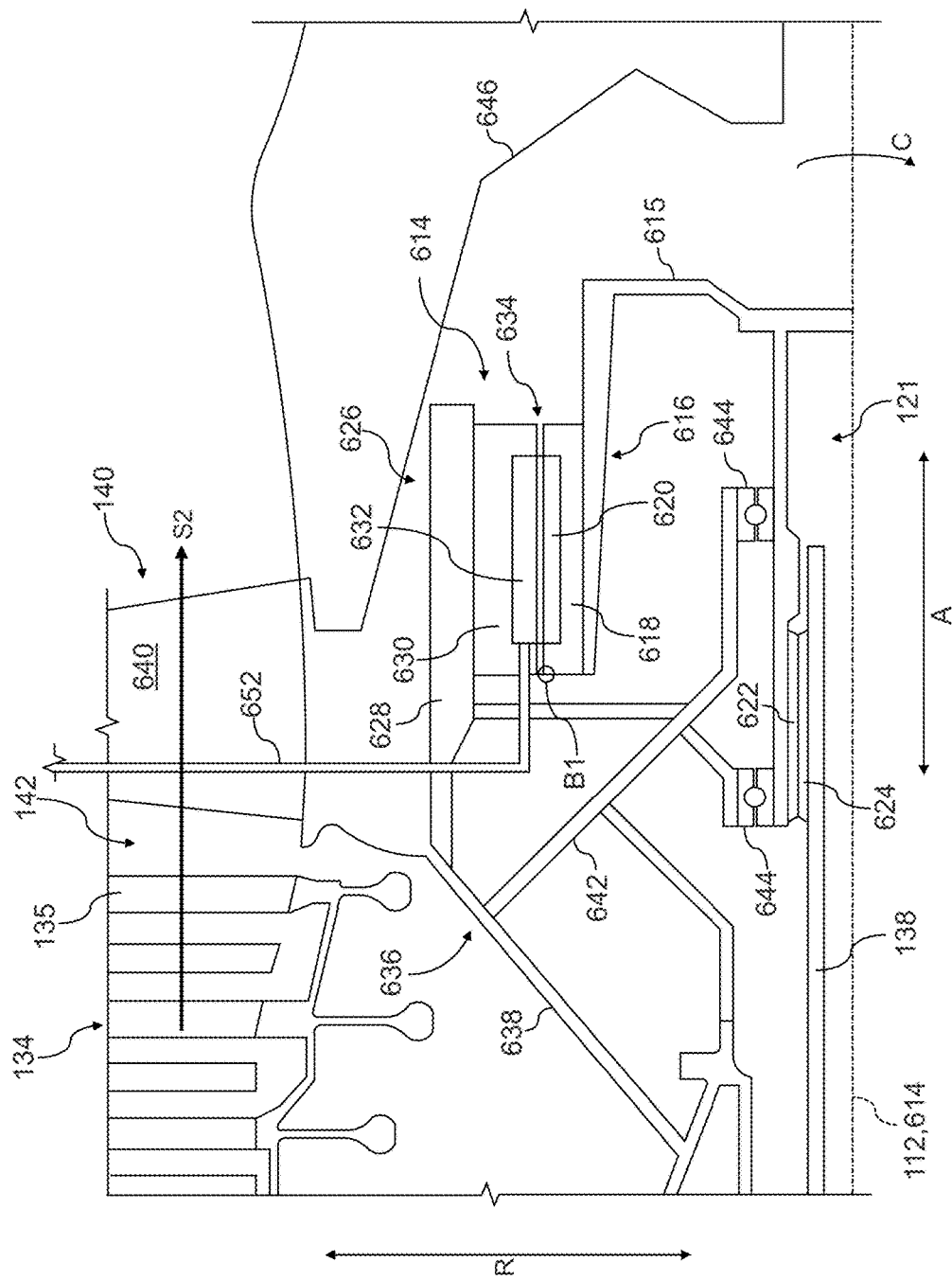
FIG. 15 provides a schematic, cross-sectional view of an electric machine embedded in the three-stream gas turbine engine of FIG. 1.
Figure 18:
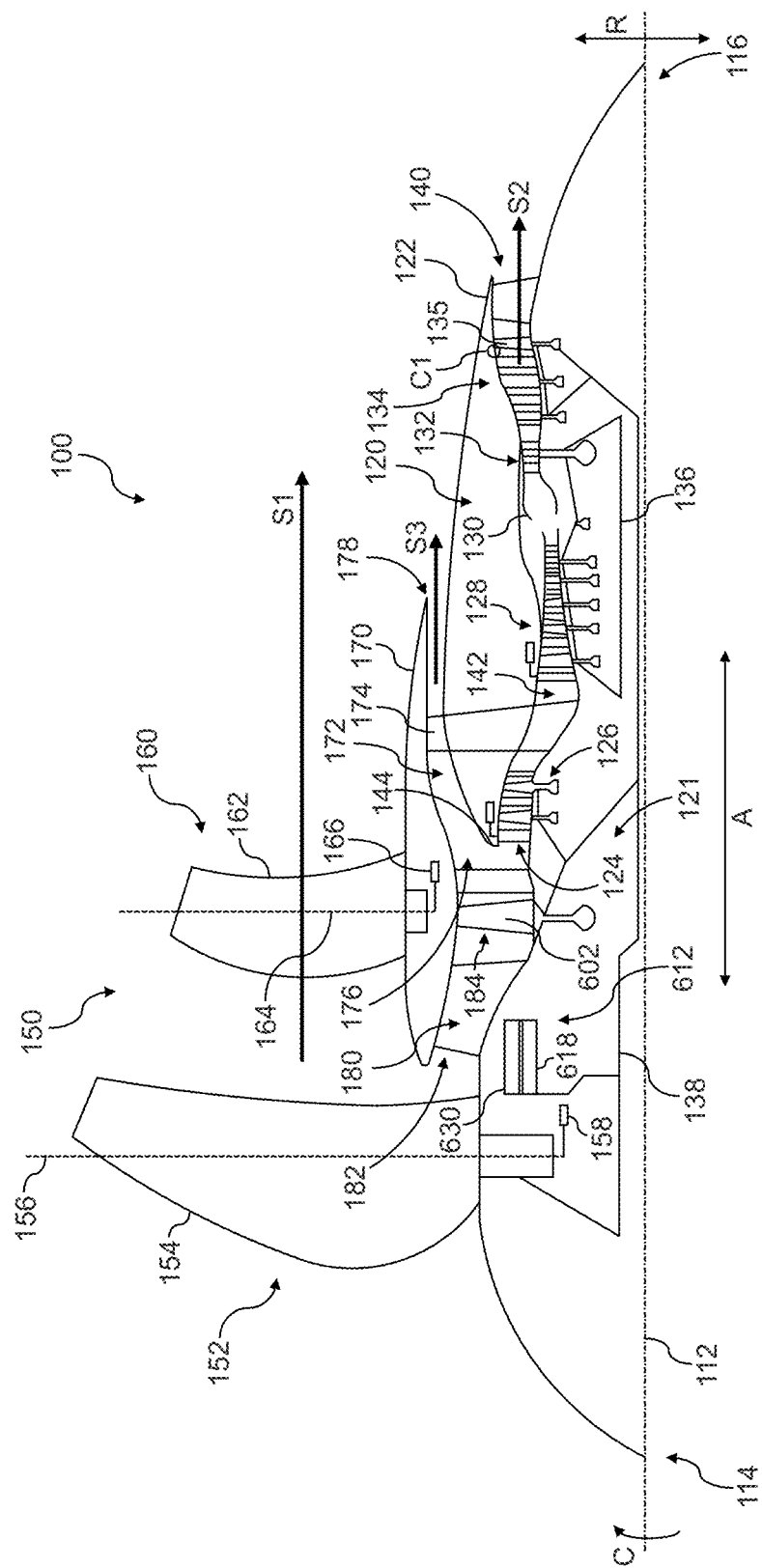
FIG. 18 provides a schematic cross-sectional view of a three-stream gas turbine engine having an embedded electric machine positioned forward of a mid-fan according to various embodiments of the present disclosure.

Referring still to FIG. 13 and now also to FIG. 15, FIG. 15 provides a close-up schematic view of the electric machine 612 embedded within the engine 100. As shown, the electric machine 612 is embedded within the engine 100 proximate its aft end 116. Particularly, the electric machine 612 is positioned aft of the mid-fan 184 and at least partially overlapping with or aft of the LP turbine 134 along the axial direction A. Moreover, for this embodiment, the electric machine 612 is positioned inward of the core duct 142 along the radial direction R. The electric machine 612 is operatively coupled with the LP shaft 138, as noted above. It will be appreciated that in other exemplary embodiments the electric machine 612 may be positioned at other suitable locations within the engine 100. For example, in some embodiments, the electric machine 612 can be coupled with the LP shaft 138 and positioned forward of the mid-fan 184 along the axial direction, e.g., as shown in FIG. 18.

Particularly referring to FIG. 15, the electric machine 612 includes a rotor assembly 616 and a stator assembly 626. The electric machine 612 also defines a centerline 614, which is aligned with or coaxial with the longitudinal axis 112 of the engine 100 in this example embodiment. The rotor assembly 616 includes a rotor connection member 615 and a rotor 618. The stator assembly 626 similarly includes stator connection member 628 and a stator 630. The rotor 618 of the rotor assembly 616 and the stator 630 of the stator assembly 626 together define an air gap 634 therebetween. Moreover, for this embodiment, the rotor 618 includes a plurality of magnets 620, such as a plurality of permanent magnets, and the stator 630 includes a plurality of windings or coils 632. As such, the electric machine 612 may be referred to as a permanent magnet electric machine.

However, in other embodiments of the present disclosure, the electric machine 612 may be configured in any suitable manner. For example, the electric machine 612 may be configured as an electromagnetic electric machine, including a plurality of electromagnets and active circuitry, as an induction type electric machine, a switched reluctance type electric machine, a synchronous AC electric machine, an asynchronous electric machine, or as any other suitable electric generator/motor.

Referring still to the embodiment of FIG. 15, the rotor assembly 616 of the electric machine 612 is coupled with or attached to the LP shaft 138. In such a manner, the rotor assembly 616 is rotatable with the LP shaft 138. The attachment of the rotor assembly 616 to the LP shaft 138 will be described in more detail below. The stator assembly 626 is coupled with or attached to a structural support member 638 of the turbine section. More specifically, the stator connection member 628 extends from the structural support member 638 to the stator 630 to support the stator 630. The structural support member 638 is configured as part of an aft frame assembly 636. The aft frame assembly 636 further includes an aft frame strut 640 extending through the core duct 142 of the turbomachine 120. The aft frame strut 640 provides structural support for the engine 100. The structural support member 638 extends from an inner end of the aft frame strut 640 along the radial direction R.

The engine 100 further includes a cavity wall 646 surrounding at least a portion of the electric machine 612. More specifically, the cavity wall 646 substantially completely surrounds the electric machine 612, extending from a location proximate a forward end of the electric machine 612 to a location aft of the electric machine 612 along the axial direction A. The cavity wall 646 may function as, e.g., a cooling air cavity wall, a sump for cooling fluid, a protective cover for the electric machine 612, etc. For example, in certain embodiments, the engine 100 may further include a second cavity wall (not shown) to form a buffer cavity surrounding the electric machine 612 and thermally protect the electric machine 612.

During at least certain operations of the engine 100, the LP shaft 138 rotates the rotor assembly 616 of the electric machine 612, allowing the electric machine 612 to generate electrical power. Thus, the electric machine 612 is operable in a generator mode. In certain exemplary embodiments, in addition or alternatively to being operable in a generator mode, the electric machine 612 is operable in a drive mode during certain operations of the engine 100. In a drive mode, the rotor assembly 616 of the electric machine 612 drives the LP shaft 138. The electric machine 612 is electrically connected to an electric power bus 652. The electric power bus 652 is electrically connected to the electric machine 612 at a location inward of the core duct 142 along the radial direction R. The electric power bus 652 may extend through the core duct 142 (e.g., through the aft frame strut 640) and electrically connect the electric machine 612 to one or more electrical loads (accessory systems, electric/hybrid-electric propulsion devices, etc.), electrical sources (other electric machines, electric energy storage units, etc.), or both. Electrical power can be provided to the electric machine 612 via the electric power bus 652, e.g., when the electric machine 612 is operating in a drive mode, and electrical power generated by the electric machine 612 can be carried or transmitted to electrical systems via the electric power bus 652, e.g., when the electric machine 612 is operating in a generator mode.

As noted above, for the embodiment depicted, the rotor assembly 616 is coupled to the LP shaft 138. As is depicted, the rotor connection member 615 extends between the LP shaft 138 and the rotor 618 for connecting the rotor 618 to the LP shaft 138. For the embodiment shown, the rotor connection member 615 is connected to the LP shaft 138 through a splined connection. More particularly, the rotor connection member 615 includes a connection portion having a plurality of teeth 622 extending generally along the axial direction A, and similarly, the LP shaft 138 includes a connection portion having a plurality of teeth 624 extending generally along the axial direction A. The plurality of teeth 622 of the rotor connection member 615 are configured to engage with the plurality of teeth 624 of the LP shaft 138, fixing the two components to one another. In alternative embodiments, the rotor connection member 615 may be coupled to the LP shaft 138 in any other suitable manner. One or more bearings 644 coupled with an extension support member 642 of the aft frame assembly 636 may support the rotor connection member 615 relative to the LP shaft 138.

It will be appreciated, however, that although the electric machine 612 has been described and illustrated in FIG. 15 as having a particular configuration, it will be appreciated that the inventive aspects of the present disclosure may apply to electric machines having alternative configurations. For example, the stator assembly 626 and/or rotor assembly 616 may have different configurations or may be arranged in a different manner than illustrated in FIG. 15. As one example, in some embodiments, the electric machine 612 may have a tapered configuration in which the rotor 618 and the stator 630 may extend lengthwise along the axial direction A at an angle with respect to the longitudinal axis 112, e.g., so that they are not oriented parallel with the longitudinal axis 112.

It will be appreciated that the inventors of the present disclosure discovered, during the course developing the aforementioned embodiments, certain operating and geometric relationships between various components of three-stream gas turbine engines having an embedded electric machine that provide certain advantages over conventional turbofan engines. Additionally, the inventors discovered, during the course of conceiving various embodiments of turbomachines (including those illustrated and described above), certain relationships, which if adopted for a turbomachine can simplify the selection, integration or development process for other subsystems residing within the overall architecture, in addition to providing the noted advantages inherent in the selection of one or more these relationships for an engine. As one example, a three-stream engine having an embedded electric machine, such as disclosed in FIGS. 13, 14, and 15 as well as in other noted embodiments provided herein, may include components operating or arranged geometrically in advantageous relationships, as explained in greater detail below. Ultimately, adoption of a three-stream engine having an embedded electric machine as disclosed herein can provide significant fuel burn advantages over conventional turbofans, among other benefits, which also takes into account the operational, integration, and sizing constraints for a turbomachine adopting such an architecture. Additionally, the disclosure informs the skilled artisan of the impact that such an architecture has on an overall propulsive system, how related systems may be selected as suitable or not suitable, where subsystems can be located and what the operational, environmental, etc. requirements may be, based on the relationships defined herein.

Referring now to FIGS. 13, 14, and 15, as noted, the electric machine 612 and the mid-fan 184 are operatively coupled with the LP shaft 138. In this regard, the electric machine 612 and the mid-fan 184 are both tied to the LP shaft 138 and can operate at a tip speed ratio with respect to one another. The tip speed ratio can be constant, particularly during high efficiency operations and excluding situations where the electric machine 612 is decoupled from the LP shaft 138, e.g., by way of a clutch (not shown). The tip speed ratio is defined by a tip speed of the rotor 618 of the electric machine 612 to a tip speed of one of the mid-fan blades 602 of the mid-fan 184. Stated another way, the tip speed ratio may be defined as: EM Tip Speed/Mid-Fan Tip Speed (Ratio 2).

Figure 16:
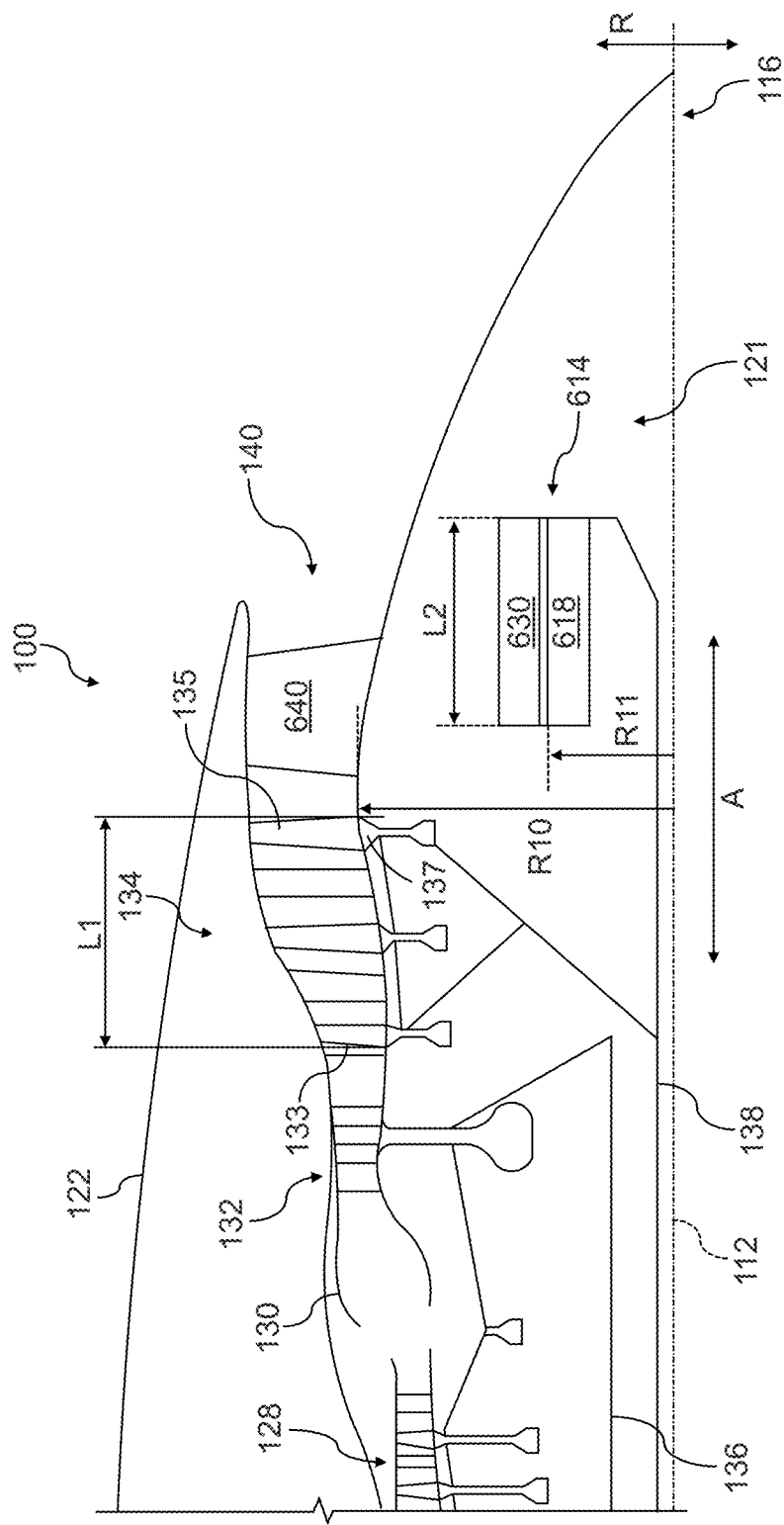
FIG. 16 provides a schematic, cross-sectional view of an aft portion of the three-stream gas turbine engine of FIG. 1.

The EM Tip Speed is measured at an outermost point of the rotor 618 of the electric machine 612, e.g., at a location B1 depicted in FIG. 15. The outermost point of the rotor 618 is defined as the outermost point of the rotor 618 along the radial direction R with respect to the longitudinal axis 112. The Mid-Fan Tip Speed is measured at a leading edge tip of one of the mid-fan blades 602, e.g., at a location A1 depicted in FIG. 14. The tip speeds can be measured in any suitable units of speed, such as meters per second. The same unit of speed is to be used for both the EM Tip Speed and the Mid-Fan Tip Speed when determining the tip speed ratio. In certain exemplary embodiments, when the engine 100 is operated, the rotor 618 of the electric machine 612 has a rotor tip speed being equal to or greater than 50 meters per second and less than or equal to 200 meters per second. In yet other embodiments, when the engine 100 is operated, the rotor 618 of the electric machine 612 has a rotor tip speed being equal to or greater than 140 meters per second and less than or equal to 190 meters per second. Such a rotor tip speed range is particularly suited for electric machines operated and arranged as shown in FIGS. 13, 15, and 16, e.g., in a "tail cone" or aft position. Such a rotor tip speed range is also particularly suited for electric machines operated and arranged as shown in FIGS. 13, 15, and 16 except that the electric machine has an outer rotor configuration instead of the inner rotor configuration shown in FIGS. 13, 15, and 16. However, as noted, the rotor 618 of the electric machine 612 may have a rotor tip speed being equal to or greater than 50 meters per second and less than or equal to 200 meters per second.

In at least certain exemplary embodiments, the engine 100 is operated so as to define the tip speed ratio as being equal to or greater than 0.2 and less than or equal to 1.0. In this regard, the speed of the tip of the rotor 618 of the electric machine 612 is less than or equal to the leading edge tip speed of one of the mid-fan blades 602 of the mid-fan 184. The range for the tip speed ratio captures the architectural and operating relationship between the mid-fan 184 and the electric machine 612 of the engine 100, both of which are coupled to the LP shaft 138. The electric machine tip speed defines the mechanical and operating constraints associated with the electric machine 612 while the mid-fan tip speed defines the mechanical and operating constraints associated with the mid-fan 184. The inventors of the present disclosure have found that three-stream engines operated so as to define the tip speed ratio within one or more of the noted ranges have certain architectural and operating advantages. For example, operating a three-stream engine within the noted ranges for the tip speed ratio can prevent unacceptable penalties on the power density of the electric machine 612, can prevent too much tip speed on the mid-fan 184, and can prevent the mechanical capabilities of electrical components of the electric machine 612 from exceeding their limits, among other benefits.

With reference still to FIGS. 13 through 15 and also to FIG. 16, in some embodiments, the engine 100 can be arranged to define a mid-fan radius to electric machine radius ratio. The mid-fan radius to electric machine radius ratio is defined as: Mid-Fan Radius/EM Tip Radius (Ratio 3).

The mid-fan radius to electric machine radius ratio can be a fixed ratio as these two radii can be fixed. The Mid-Fan Radius is measured as a radial length or radius spanning along the radial direction R between the longitudinal axis 112 and a leading edge tip of one of the mid-fan blades 602 of the mid-fan 184. More specifically, as shown best in FIG. 14, the Mid-Fan Radius is measured as Radius R15, which spans along the radial direction R between the longitudinal axis 112 and a leading edge tip of one of the mid-fan blades 602. As shown best in FIG. 16, the EM Tip Radius is measured as a Radius R11 spanning along the radial direction R between the longitudinal axis 112 and an outermost point of the rotor 618 of the electric machine 612.

In certain exemplary embodiments, the engine 100 defines the mid-fan radius to electric machine radius ratio as being equal to or greater than 1.33 and less than or equal to 3.8. In some further embodiments, the engine 100 defines the mid-fan radius to electric machine radius ratio as being equal to or greater than 2.5 and less than or equal to 3.3. In yet other embodiments, the engine 100 defines the mid-fan radius to electric machine radius ratio as being equal to or greater than 2.9 and less than or equal to 3.2. The ranges for the mid-fan radius to electric machine radius ratio capture the architectural and operating relationship between the electric machine 612 and the mid-fan 184 of the engine 100, both of which are coupled to the LP shaft 138 in such example embodiments.

More specifically, the inventors of the present disclosure have found that three-stream engines having an electric machine and mid-fan arranged according to the noted ranges advantageously balance aerodynamic performance and mechanical constraints of the mid-fan with electric machine performance, mechanical capabilities of electrical components of the electric machine, physical space required for the electric machine, and thermal management of the electric machine. For example, in accordance with the noted ranges for the mid-fan radius to electric machine radius ratio, the mid-fan may be positioned far enough from the longitudinal axis so that a satisfactory thrust contribution is produced by the third stream and so that acceptable efficiency is achieved, and further, the mid-fan is positioned close enough to the longitudinal axis so that shock losses from supersonic tip speeds do not unduly affect performance and so that the weight of the mid-fan is acceptable. The noted ranges allow for the mid-fan to be arranged to achieve these advantages whilst preventing unacceptable penalties on the power density of the electric machine as well as preventing the mechanical capabilities of electrical components of the electric machine from exceeding their limits.

Referring still to FIGS. 13 through 16, in certain exemplary embodiments, the engine 100 can be arranged to define an electric machine length to low pressure turbine length ratio. The electric machine length to low pressure turbine length ratio is defined by an axial length of the electric machine 612 to an axial length of the LP turbine 134. Stated another way, the electric machine length to low pressure turbine length ratio may be defined as: EM Length/LPT Length (Ratio 4).

The electric machine length to low pressure turbine length ratio can be a fixed ratio as the axial length of the electric machine 612 and the axial length of the LP turbine 134 are fixed. The EM Length is measured as the axial length of the electric machine 612. More specifically, as illustrated in FIG. 16, the axial length of the electric machine 612 is defined as a length L2 spanning along the axial direction A between a leading edge of the rotor 618 and a trailing edge of the rotor 618 of the electric machine 612. The LPT Length is measured as the axial length of the LP turbine 134. More specifically, as shown best in FIG. 16, the axial length of the LP turbine 134 is defined as a length L1 spanning along the axial direction A between a leading edge of a hub of one of the first stage turbine blades 133 of the LP turbine 134 to a trailing edge of a hub of one of the last stage turbine blades 135 of the LP turbine 134. The same unit of length is to be used for both the EM Length and the LPT Length when determining the electric machine length to low pressure turbine length ratio.

In certain exemplary embodiments, the electric machine 612 and the LP turbine 134 of the engine 100 define the electric machine length to low pressure turbine length ratio as being equal to or greater than 0.01 and less than or equal to 3.0. In other embodiments, the electric machine length to low pressure turbine length ratio is equal to or greater than 0.01 and less than or equal to 0.5, equal to or greater than 0.3 and less than or equal to 1.0, or greater than 1.0 and less than or equal to 3.0, or greater than 2.0 and less than or equal to 3.0. The ranges for the electric machine length to low pressure turbine length ratio capture the architectural and operating relationship between the electric machine 612 and the LP turbine 134 of the engine 100, both of which are coupled to the LP shaft 138 in such example embodiments. More specifically, the inventors of the present disclosure have found that three-stream engines having an electric machine and LP turbine arranged according to the noted range advantageously balance weight and loading or efficiency considerations of the LP turbine with the space, size, and performance requirements of the electric machine.

Referring still to FIGS. 13 through 16, in some embodiments, the engine 100 can be arranged to define an electric machine tip radius to low pressure turbine last stage hub radius ratio. The electric machine tip radius to low pressure turbine last stage hub radius ratio may be defined as: EM Tip Radius/LPT Last Stage Blade Hub Radius (Ratio 5).

The electric machine tip radius to low pressure turbine last stage hub radius ratio can be a fixed ratio as these two radii can be fixed. The EM Tip Radius is measured as a Radius R11 spanning along the radial direction R between the longitudinal axis 112 and an outermost point of the rotor 618 of the electric machine 612. The LPT Last Stage Blade Hub Radius is measured as a radial length or radius spanning along the radial direction R between the longitudinal axis 112 and an outermost point of a hub of one of the last stage turbine blades 135 of the LP turbine 134. More specifically, as shown best in FIG. 16, the LPT Last Stage Blade Hub Radius is measured as Radius R10, which spans along the radial direction R between the longitudinal axis 112 and an outermost point taken at the trailing edge of a hub 137 of one of the last stage turbine blades 135 of the LP turbine 134. The outermost point taken at the trailing edge of the hub 137 is the outermost point of the hub 137 with respect to the longitudinal axis 112 along the radial direction R.

In certain exemplary embodiments, the LP turbine 134 and the electric machine 612 of the engine 100 define the electric machine tip radius to low pressure turbine last stage hub radius ratio as being equal to or greater than 0.1 and less than or equal to 1.0, or equal to or greater than 0.1 and less than or equal to 0.5, or equal to or greater than 0.4 and less than or equal to 1.0, or equal to or greater than 0.7 and less than or equal to 1.0. The ranges for the electric machine tip radius to low pressure turbine last stage hub radius ratio capture the architectural and operating relationship between the electric machine 612 and the LP turbine 134 of the engine 100, both of which are coupled to the LP shaft 138.

The inventors of the present disclosure have found that three-stream engines having an electric machine and LP turbine arranged according to the noted range advantageously balances the geometry constraints and operating performance and efficiency of the LP turbine and electric machine, and also accounts for thermal constraints associated with the electric machine, particularly for three-stream engines having an embedded electric machine positioned as shown best in FIGS. 13, 15, and 16. Specifically, the inventors have recognized that architectures with the noted range result in two optimizations. In accordance with the noted range of the electric machine tip radius to low pressure turbine last stage hub radius ratio, the LP turbine is positioned far enough from the longitudinal axis to provide satisfactory turbine efficiency as well as physical space for the electric machine while not being positioned too far from the longitudinal axis to make installation and packaging of the engine unworkable. Further, in accordance with the noted range of the electric machine tip radius to low pressure turbine last stage hub radius ratio, the electric machine is positioned far enough from the longitudinal axis to provide satisfactory electric machine performance whilst also accounting for the thermal constraints associated with the electric machine.

Additionally, as noted previously, the mid-fan 184 and the LP turbine 134 are operatively coupled with the LP shaft 138. In this regard, the mid-fan 184 and the LP turbine 134 are both tied to the LP shaft 138 and can operate so as to define a mid-fan tip speed to low pressure turbine tip speed ratio. The mid-fan tip speed to low pressure turbine tip speed ratio can be constant, particularly during high efficiency operations of the engine 100. The mid-fan tip speed to low pressure turbine tip speed ratio is defined by a tip speed of one of the mid-fan blades 602 of the mid-fan 184 to a tip speed of a last stage turbine blade 135 (see FIGS. 13 and 15) of the LP turbine 134. Stated another way, the mid-fan tip speed to low pressure turbine tip speed ratio may be defined as: Mid-Fan Tip Speed/LPT Tip Speed (Ratio 6).

As noted, the Mid-Fan Tip Speed is measured at a leading edge tip of one of the mid-fan blades 602, e.g., at a location A1 depicted in FIG. 14. The LPT Tip Speed is measured at a leading edge tip of one of the last stage turbine blades 135 of the LP turbine 134, e.g., at a location C1 depicted in FIG. 13.

In certain exemplary embodiments, the engine 100 is operated so as to define the mid-fan tip speed to low pressure turbine tip speed ratio as being equal to or greater than 0.7 and less than or equal to 1.5. In still other embodiments, the engine 100 is operated so as to define the mid-fan tip speed to low pressure turbine tip speed ratio as being equal to or greater than 0.8 and less than or equal to 1.2. In still further embodiments, the engine 100 is operated so as to define the mid-fan tip speed to low pressure turbine tip speed ratio as being equal to or greater than 0.9 and less than or equal to 1.1. Such measurements can be taken at a red line speed of the engine 100 or at any other speed.

The inventors of the present disclosure have found that three-stream engines operated so as to define the mid-fan tip speed to low pressure turbine tip speed ratio within one or more of the noted ranges have certain architectural and operating advantages. More specifically, operating a three-stream engine within the noted ranges for the mid-fan tip speed to low pressure turbine tip speed ratio can ensure that the radius of the mid-fan (i.e., a radial length or radius spanning along the radial direction R between the longitudinal axis and a leading edge tip of one of the mid-fan blades of the mid-fan) is optimized relative to the low pressure turbine architecture. For example, when the mid-fan radius is too large, the tip speed of the mid-fan may drive unacceptable aerodynamic losses. Further, mechanical stresses on the mid-fan may become excessive. In contrast, when the mid-fan radius is too small, the average velocity in the low pressure turbine blade passage may become too high, which may drive increased aerodynamic losses. Alternatively, the hub radii of the mid-fan blades may need to be reduced to pass the required flow. As such, this may increase the engine length due to duct slope limitations and other packaging constraints. The inventors of the present disclosure have taken these considerations into account in developing the noted ranges for the mid-fan tip speed to low pressure turbine tip speed ratio.

Moreover, as noted above, the electric machine 612 and the LP turbine 134 are operatively coupled with the LP shaft 138. In this regard, the electric machine 612 and the LP turbine 134 are both tied to the LP shaft 138 and can operate so as to define a low pressure turbine tip speed to electric machine tip speed ratio. The low pressure turbine tip speed to electric machine tip speed ratio can be constant, particularly during high efficiency operations and excluding situations where the electric machine 612 is decoupled from the LP shaft 138. The low pressure turbine tip speed to electric machine tip speed ratio is defined by a tip speed taken at a leading edge of a last stage turbine blade 135 (see FIGS. 13 and 15) of the LP turbine 134 to a tip speed of the rotor 618 of the electric machine 612. Stated another way low pressure turbine tip speed to electric machine tip speed ratio may be defined as: LPT Tip Speed/EM Tip Speed (Ratio 7).

The LPT Tip Speed is measured at a leading edge tip of one of the last stage turbine blades 135 of the LP turbine 134, e.g., at a location C1 depicted in FIG. 13. The EM Tip Speed is measured at an outermost point of the rotor 618 of the electric machine 612, e.g., at a location B1 depicted in FIG. 15. As noted previously the outermost point of the rotor 618 is defined as the outermost point of the rotor 618 along the radial direction R with respect to the longitudinal axis 112.

In certain exemplary embodiments, the engine 100 is operated so as to define the low pressure turbine tip speed to electric machine tip speed ratio as being equal to or greater than 0.1 and less than or equal to 1.0, equal to or greater than 0.1 and less than or equal to 0.3, or equal to or greater than 0.5 and less than or equal to 0.9. Such measurements can be taken at a red line speed of the engine 100 or at any other speed, notwithstanding situations where the electric machine 612 is decoupled from the LP shaft 138. The inventors of the present disclosure have found that three-stream engines operated so as to define the low pressure turbine tip speed to electric machine tip speed ratio within one or more of the noted ranges have certain architectural and operating advantages. For example, operating a three-stream engine within the noted ranges for the low pressure turbine tip speed to electric machine tip speed ratio can prevent unacceptable penalties on the power density of the electric machine, can prevent too much tip speed on the low pressure turbine, can prevent the mechanical capabilities of electrical components of the electric machine 612 from exceeding their limits, among other benefits.

Referring to FIGS. 13 through 16, in some embodiments, the engine 100 and the electric machine 612 embedded therein are operated so as to define an electric machine power to low pressure turbine power ratio (Ratio 8). The unit of measure for the power output by the electric machine is to be kW and the unit of measure for the power output by the low pressure turbine is to be horsepower hp when determining the electric machine power to low pressure turbine power ratio, or stated another way, kW/hp.

In certain exemplary embodiments, the LP turbine 134 and the electric machine 612 of the engine 100 define the electric machine power to low pressure turbine power ratio as being equal to or greater than 0.01 and less than or equal to 1.0. In certain exemplary embodiments, the LP turbine 134 and the electric machine 612 of the engine 100 can define the electric machine power to low pressure turbine power ratio as being equal to or greater than 0.01 and less than or equal to 1.0 at flight idle, equal to or greater than 0.01 and less than or equal to 0.2 at flight idle, equal to or greater than 0.1 and less than or equal to 0.45 at flight idle, or equal to or greater than 0.45 and less than or equal to 1.0 at flight idle. Flight idle, as used herein, refers to an engine speed in flight at a given altitude with a throttle set to a minimum, or idle, position. The engine speed may increase with an increase in altitude based on, e.g., ambient air conditions. The inventors of the present disclosure have found that three-stream engines having an electric machine and LP turbine arranged and operated according to the noted ranges advantageously balance the geometric and physical space constraints, thermal needs, efficiency, and performance of the electric machine and low pressure turbine.

Referring still to FIGS. 13 through 16, in some embodiments, the engine 100, and more More specifically, the electric machine 612 embedded therein is operated so as to define a power to voltage ratio. The power to voltage ratio can be constant, particularly during high efficiency operations and excluding situations where the electric machine 612 is decoupled from the LP shaft 138. The power to voltage ratio is defined by an electrical power output by the electric machine 612 in kilowatts to a voltage level of the electric machine 612 in volts of direct current. Stated another way, the power to voltage ratio may be defined as: EM Power/EM Voltage (Ratio 9).

As noted, the EM Power is measured as the electrical power output by the electric machine 612 in kilowatts. In certain exemplary embodiments, the electrical power output by the electric machine 612 ranges from 100 kilowatts to 3 megawatts (100 KW-3 MW). Further, the EM Voltage is measured as the voltage level of the electric machine 612 in volts of direct current Vdc. In certain exemplary embodiments, the voltage level of the electric machine 612 ranges from 270 Vdc to 3 kVdc. Accordingly, the unit of measure for power is to be kW and the unit of measure for voltage is to be Vdc when determining the power to voltage ratio, or stated another way, kW/Vdc. Such measurements can be taken at a red line speed of the engine 100 or at any other speed, notwithstanding situations where the electric machine 612 is decoupled from the LP shaft 138.

In certain exemplary embodiments, the electric machine 612 of the engine 100 is operated so as to define the power to voltage ratio as being equal to or greater than 0.3 and less than or equal to 2.0. In yet other embodiments, the electric machine 612 of the engine 100 is operated so as to define the power to voltage ratio as being equal to or greater than 0.35 and less than or equal to 0.5, or equal to or greater than 0.4 and 0.5. The noted ranges for the power to voltage ratio capture the operating relationship between the electrical power associated with the electric machine and the voltage associated with the electric machine.

The inventors of the present disclosure have found that three-stream engines having an electric machine arranged as shown and described and operated according to the noted ranges advantageously balances the physical space required for the electric machine, the physical space needed between electrically conducting components of the electric machine, and partial discharge considerations with electric current levels and consequently increased weight of cables and busbars associated with the electric machine and/or power systems of the aircraft. Generally, for higher values of the ratio, more physical space is available and the electric machine is less susceptible to undesirable partial discharge while higher electric current levels and thus weight associated with cables and busbars are expected. The lower the value of the ratio, lower electric current levels and thus weight associated with cables and busbars are to be expected while there is less physical space available and the electric machine is more susceptible to undesirable partial discharge. The power to voltage ratio being equal to or greater than 0.35 and less than or equal to 0.5 is particularly suited for electric machines operated and arranged as shown in FIGS. 13, 15, and 16, e.g., in a "tail cone" or aft position. However, as noted, the power to voltage ratio may be equal to or greater than 0.3 and less than or equal to 2.0.

Referring still to FIGS. 13 through 16, in some embodiments, the engine 100, and more More specifically, the electric machine 612 embedded therein is operated so as to define a power to AC rated current ratio. The power to AC rated current ratio can be constant, particularly during high efficiency operations and excluding situations where the electric machine 612 is decoupled from the LP shaft 138. The power to AC rated current ratio is defined by an electrical power associated with the electric machine 612 in kilowatts (e.g., electrical power output by the electric machine 612) to an AC rated current of the electric machine in ampere root mean square (arms). Stated another way, the power to AC rated current ratio may be defined as: EM Power/EM AC Rated Current (Ratio 10).

As noted, the EM Power is measured as the electrical power output by the electric machine 612 in kilowatts. In certain exemplary embodiments, the electrical power output by the electric machine 612 ranges from 100 kilowatts to 3 megawatts (100 KW-3 MW). Further, the EM AC Rated Current is measured as the AC rated current associated with an AC side of the electric machine 612 in ampere root mean square (arms). Accordingly, the unit of measure for power is to be kW and the unit of measure for voltage is to be arms when determining the power to AC rated current ratio, or stated another way, kW/arms. Such measurements can be taken at a red line speed of the engine 100 or at any other speed, notwithstanding situations where the electric machine 612 is decoupled from the LP shaft 138.

In certain exemplary embodiments, the electric machine 612 of the engine 100 is operated so as to define the power to AC rated current ratio as being equal to or greater than as being equal to or greater than 0.2 and less than or equal to 2.5. In yet other embodiments, the electric machine 612 of the engine 100 is operated so as to define the power to AC rated current ratio as being equal to or greater than as being equal to or greater than 0.6 and less than or equal to 2.0, or equal to or greater than 0.2 and less than or equal to 1.2, equal to or greater than 1.8 and less than or equal to 2.5, or equal to or greater than 1.2 and less than or equal to 1.8. The noted ranges for the power to AC rated current ratio capture the operating relationship between the electrical power associated with the electric machine and the AC rated current associated with the electric machine.

The inventors of the present disclosure have found that three-stream engines having an electric machine arranged as shown and described and operated according to the noted ranges advantageously balances the physical space required for the electric machine, the physical space needed between electrically conducting components of the electric machine, and partial discharge considerations with electric current levels and consequently increased weight of cables and busbars associated with the electric machine and/or power systems of the aircraft. Generally, for lower values of the power to AC rated current ratio, more physical space is available and the electric machine is less susceptible to undesirable partial discharge while higher electric current levels and thus weight associated with cables and busbars are expected. The higher values of the power to AC rated current ratio, lower electric current levels and thus weight associated with cables and busbars are to be expected while there is less physical space available and the electric machine is more susceptible to undesirable partial discharge. The power to AC rated current ratio being equal to or greater than 0.6 and less than or equal to 2.0 is particularly suited for electric machines operated and arranged as shown in FIGS. 13, 15, and 16, e.g., in a "tail cone" or aft position. However, as noted, the power to AC rated current ratio may be equal to or greater than 0.2 and less than or equal to 2.5.

Referring still to FIGS. 13 through 16, in some embodiments, the engine 100, and more More specifically, the electric machine 612 embedded therein is operated so as to define a torque at maximum speed to AC rated current ratio. The torque at maximum speed to AC rated current ratio is defined by a torque associated with a rotor of the electric machine at maximum speed of the electric machine in newton meters to an AC rated current of the electric machine in ampere root mean square. Stated another way, the torque at maximum speed to AC rated current ratio may be defined as: EM Torque at Max Speed/EM AC Rated Current (Ratio 11).

In certain exemplary embodiments, the electric machine 612 of the engine 100 is operated so as to define the torque at maximum speed to AC rated current ratio as being equal to or greater than as being equal to or greater than 0.1 and less than or equal to 6.0. In yet other embodiments, the electric machine 612 of the engine 100 is operated so as to define the power to AC rated current ratio as being equal to or greater than as being equal to or greater than 0.6 and less than or equal to 1.0. The range for the torque at maximum speed to AC rated current ratio captures the operating relationship between the torque associated with a rotor of the electric machine and the AC rated current associated with the electric machine.

The inventors of the present disclosure have found that three-stream engines having an electric machine arranged as shown and described and operated according to the noted ranges advantageously balance the torque associated with the rotor of the electric machine with the electric current at the AC side of the electric machine. The torque at maximum speed to AC rated current ratio being equal to or greater than 0.6 and less than or equal to 1.0 is particularly suited for electric machines operated and arranged as shown in FIGS. 13, 15, and 16, e.g., in a "tail cone" or aft position. However, as noted, the torque at maximum speed to AC rated current ratio may be equal to or greater than 0.1 and less than or equal to 6.0.

In certain exemplary embodiments, the engine 100 of FIGS. 13 through 16 and/or the three-stream engine of FIG. 17 and/or FIG. 18 may define a combination of the ratios noted above. For example, the engine 100 of FIGS. 13 through 16 may be arranged and operated to define any suitable combination of Ratio 1, Ratio 2, Ratio 3, Ratio 4, Ratio 5, Ratio 6, Ratio 7, Ratio 8, Ratio 9, Ratio 10, and Ratio 11. Embodiments of the three-stream engine may be arranged and operated to define a single one of the above-noted ratios or some combination thereof.

Various examples are provided in the description below. For each example embodiment, the three-stream engine may include a primary fan and a mid-fan. Each example three-stream engine may be arranged to define a primary fan radius to mid-fan radius ratio as being equal to or greater than 2.0 and less than or equal to 6.5. In some example embodiments, for example, the three-stream engine may be arranged to define the primary fan radius to mid-fan radius ratio as being as being at least about 3.0 and less than 4.0.

A first example is now provided (Example 1): A three-stream engine having a micro-hybridization configuration has a low pressure shaft, a primary fan operatively coupled with the shaft, e.g., via a gearbox and connecting fan rotor, a mid-fan positioned downstream of the primary fan and directly operatively coupled with the low pressure shaft, the mid-fan having mid-fan blades. The third stream further includes a low pressure turbine. The three-stream engine also includes an electric machine operatively coupled with the low pressure shaft. The electric machine is operable to output 350 KW at flight idle. The electric machine has a rotor rotatable with the low pressure shaft. The three-stream engine is arranged to define an electric machine length to low pressure turbine length ratio. The electric machine length to low pressure turbine length ratio is defined by an axial length of the electric machine to an axial length of the LP turbine. The electric machine length is a length spanning along an axial direction defined by the three-stream engine between a leading edge of the rotor and a trailing edge of the rotor of the electric machine. The low pressure turbine length is a length spanning along the axial direction between a leading edge of a hub of one of the first stage turbine blades of the low pressure turbine to a trailing edge of a hub of one of the last stage turbine blades of the low pressure turbine. The three-stream engine defines the electric machine length to low pressure turbine length ratio as 0.32.

A second example is now provided (Example 2): A three-stream engine being a part of a distributed propulsion system has a low pressure shaft, a primary fan operatively coupled with the shaft, e.g., via a gearbox and connecting fan rotor, a mid-fan positioned downstream of the primary fan and directly operatively coupled with the low pressure shaft, the mid-fan having mid-fan blades. The third stream further includes a low pressure turbine. The three-stream engine also includes an electric machine operatively coupled with the low pressure shaft. The electric machine is operable to output 3 MW. The electric machine has a rotor rotatable with the low pressure shaft. The three-stream engine is arranged to define an electric machine length to low pressure turbine length ratio. The electric machine length to low pressure turbine length ratio is defined by an axial length of the electric machine to an axial length of the LP turbine. The electric machine length is a length spanning along an axial direction defined by the three-stream engine between a leading edge of the rotor and a trailing edge of the rotor of the electric machine. The low pressure turbine length is a length spanning along the axial direction between a leading edge of a hub of one of the first stage turbine blades of the low pressure turbine to a trailing edge of a hub of one of the last stage turbine blades of the low pressure turbine. The three-stream engine defines the electric machine length to low pressure turbine length ratio as 3.0.

A third example is now provided (Example 3): A three-stream engine having a micro-hybridization configuration has a low pressure shaft, a primary fan operatively coupled with the shaft, e.g., via a gearbox and connecting fan rotor, a mid-fan positioned downstream of the primary fan and directly operatively coupled with the low pressure shaft, the mid-fan having mid-fan blades. The third stream further includes a low pressure turbine. The three-stream engine also includes an electric machine operatively coupled with the low pressure shaft. The electric machine is operable to output 350 KW at flight idle. The electric machine has a rotor rotatable with the low pressure shaft. The three-stream engine is arranged to define an electric machine tip radius to low pressure turbine last stage hub radius ratio. The electric machine tip radius spans along a radial direction R defined by the three-stream engine between a longitudinal axis of the engine and an outermost point of the rotor of the electric machine. The low pressure turbine last stage hub radius spans along the radial direction R between the longitudinal axis of the engine and an outermost point of a hub of one of the last stage turbine blades of the low pressure turbine. The three-stream engine defines the electric machine tip radius to low pressure turbine last stage hub radius ratio as 0.48.

A fourth example is now provided (Example 4): A three-stream engine being a part of a distributed propulsion system has a low pressure shaft, a primary fan operatively coupled with the shaft, e.g., via a gearbox and connecting fan rotor, a mid-fan positioned downstream of the primary fan and directly operatively coupled with the low pressure shaft, the mid-fan having mid-fan blades. The third stream further includes a low pressure turbine. The three-stream engine also includes an electric machine operatively coupled with the low pressure shaft. The electric machine is operable to output 3 MW. The electric machine has a rotor rotatable with the low pressure shaft. The three-stream engine is arranged to define an electric machine tip radius to low pressure turbine last stage hub radius ratio. The electric machine tip radius spans along a radial direction R defined by the three-stream engine between a longitudinal axis of the engine and an outermost point of the rotor of the electric machine. The low pressure turbine last stage hub radius spans along the radial direction R between the longitudinal axis of the engine and an outermost point of a hub of one of the last stage turbine blades of the low pressure turbine. The three-stream engine defines the electric machine tip radius to low pressure turbine last stage hub radius ratio as being less than or equal to 0.48.

A fifth example is now provided (Example 5): A three-stream engine having a micro-hybridization configuration has a low pressure shaft, a primary fan operatively coupled with the shaft, e.g., via a gearbox and connecting fan rotor, a mid-fan positioned downstream of the primary fan and directly operatively coupled with the low pressure shaft, the mid-fan having mid-fan blades. The third stream further includes a low pressure turbine. The three-stream engine also includes an electric machine operatively coupled with the low pressure shaft. The electric machine has a rotor rotatable with the low pressure shaft. The three-stream engine is arranged to define an electric machine power to low pressure turbine power ratio. The unit of measure for the power output by the electric machine is measured in kilowatts (kW) and the unit of measure for the power output by the low pressure turbine is measured in horsepower (hp). The three-stream engine, when operated at 37,000 feet, defines the electric machine power to low pressure turbine power ratio as 0.62.

A sixth example is now provided (Example 6): A three-stream engine having a micro-hybridization configuration has a low pressure shaft, a primary fan operatively coupled with the shaft, e.g., via a gearbox and connecting fan rotor, a mid-fan positioned downstream of the primary fan and directly operatively coupled with the low pressure shaft, the mid-fan having mid-fan blades. The third stream further includes a low pressure turbine. The three-stream engine also includes an electric machine operatively coupled with the low pressure shaft. The electric machine has a rotor rotatable with the low pressure shaft. The three-stream engine is arranged to define an electric machine power to low pressure turbine power ratio. The unit of measure for the power output by the electric machine is measured in kilowatts (kW) and the unit of measure for the power output by the low pressure turbine is measured in horsepower (hp). The three-stream engine, when operated at 14,000 feet, defines the electric machine power to low pressure turbine power ratio as 0.41.

A seventh example is now provided (Example 7): A three-stream engine being a part of a distributed propulsion system has a low pressure shaft, a primary fan operatively coupled with the shaft, e.g., via a gearbox and connecting fan rotor, a mid-fan positioned downstream of the primary fan and directly operatively coupled with the low pressure shaft, the mid-fan having mid-fan blades. The third stream further includes a low pressure turbine. The three-stream engine also includes an electric machine operatively coupled with the low pressure shaft. The electric machine has a rotor rotatable with the low pressure shaft. The electric machine is operable to output between 3 MW and 15 MW, including the endpoints. The three-stream engine is arranged to define an electric machine power to low pressure turbine power ratio. The unit of measure for the power output by the electric machine is measured in kilowatts (kW) and the unit of measure for the power output by the low pressure turbine is measured in horsepower (hp). The three-stream engine, when operated, defines the electric machine power to low pressure turbine power ratio as 0.2.

An eighth example is now provided (Example 8): A three-stream engine has a low pressure shaft, a primary fan operatively coupled with the shaft, e.g., via a gearbox and connecting fan rotor, a mid-fan positioned downstream of the primary fan and directly operatively coupled with the low pressure shaft, the mid-fan having mid-fan blades. The third stream further includes a low pressure turbine. The three-stream engine also includes an electric machine operatively coupled with the low pressure shaft. The electric machine has a rotor rotatable with the low pressure shaft. The three-stream engine is arranged to define a mid-fan tip speed to low pressure turbine tip speed ratio as being about equal to 1.0.

A ninth example is now provided (Example 9): A three-stream engine has a low pressure shaft, a primary fan operatively coupled with the shaft, e.g., via a gearbox and connecting fan rotor, a mid-fan positioned downstream of the primary fan and directly operatively coupled with the low pressure shaft, the mid-fan having mid-fan blades. The third stream further includes a low pressure turbine. The three-stream engine also includes an electric machine operatively coupled with the low pressure shaft. The electric machine has a rotor rotatable with the low pressure shaft. The three-stream engine is arranged and operated so as to define a low pressure turbine tip speed to electric machine tip speed ratio as being equal to or greater than 0.1 and less than or equal to 1.0. Such measurements can be taken at a red line speed of the engine 100 or at any other speed, notwithstanding situations where the electric machine 612 is decoupled from the low pressure shaft.

Figure 19:
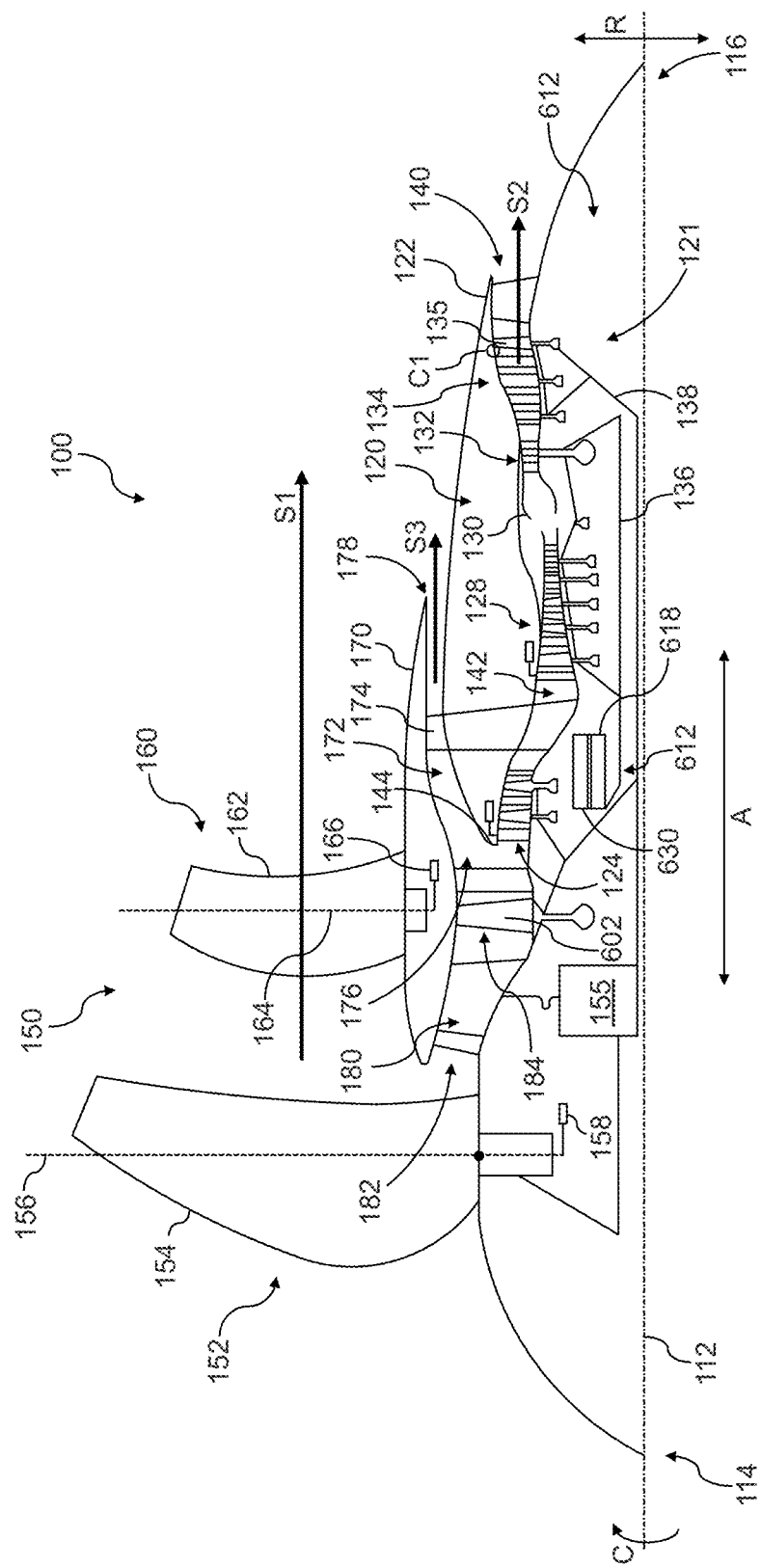
FIG. 19 provides a schematic cross-sectional view of a three-stream gas turbine engine according to various embodiments of the present disclosure.
Figure 20:
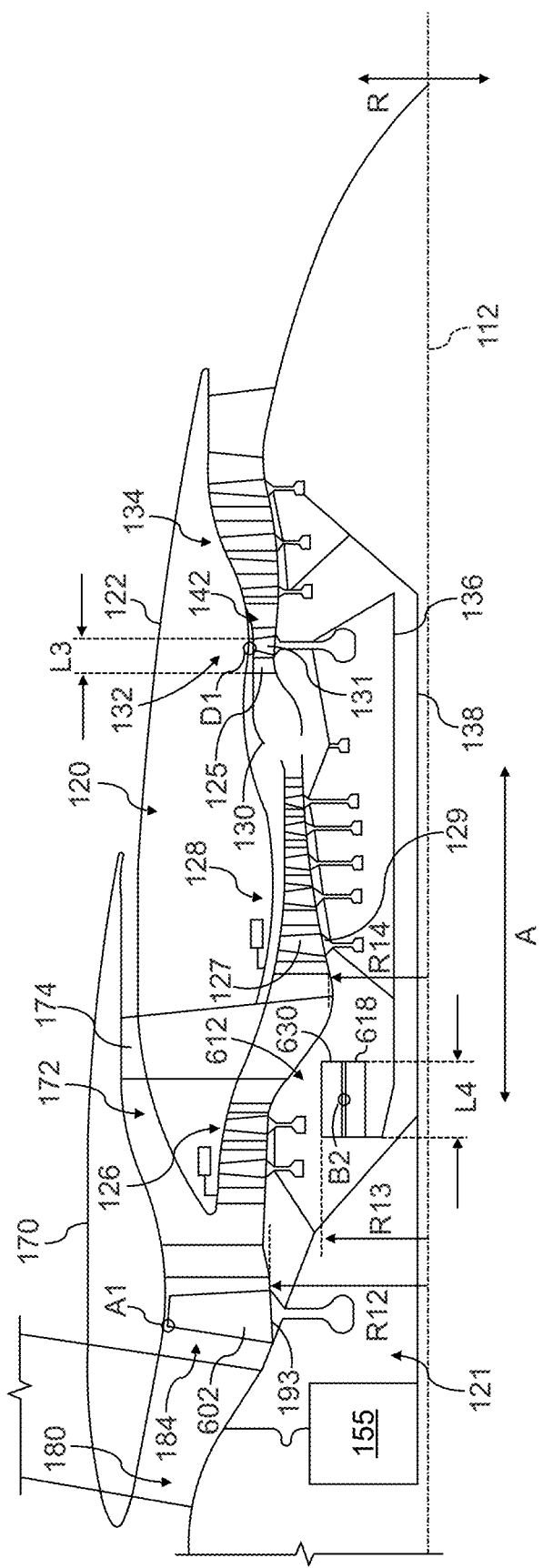
FIG. 20 provides a close-up, schematic cross-sectional view of the three-stream gas turbine engine of FIG. 19.

Referring now to FIGS. 19 and 20, FIG. 19 provides a schematic cross-sectional view of another exemplary engine 100 according to various embodiments of the present disclosure. FIG. 20 provides a close-up, schematic cross-sectional view of the three-stream gas turbine engine 100 of FIG. 19. The engine 100 of FIGS. 19 and 20 is configured in a similar manner to the engine 100 of FIGS. 13 through 16 except as provided below.

Figure 21:
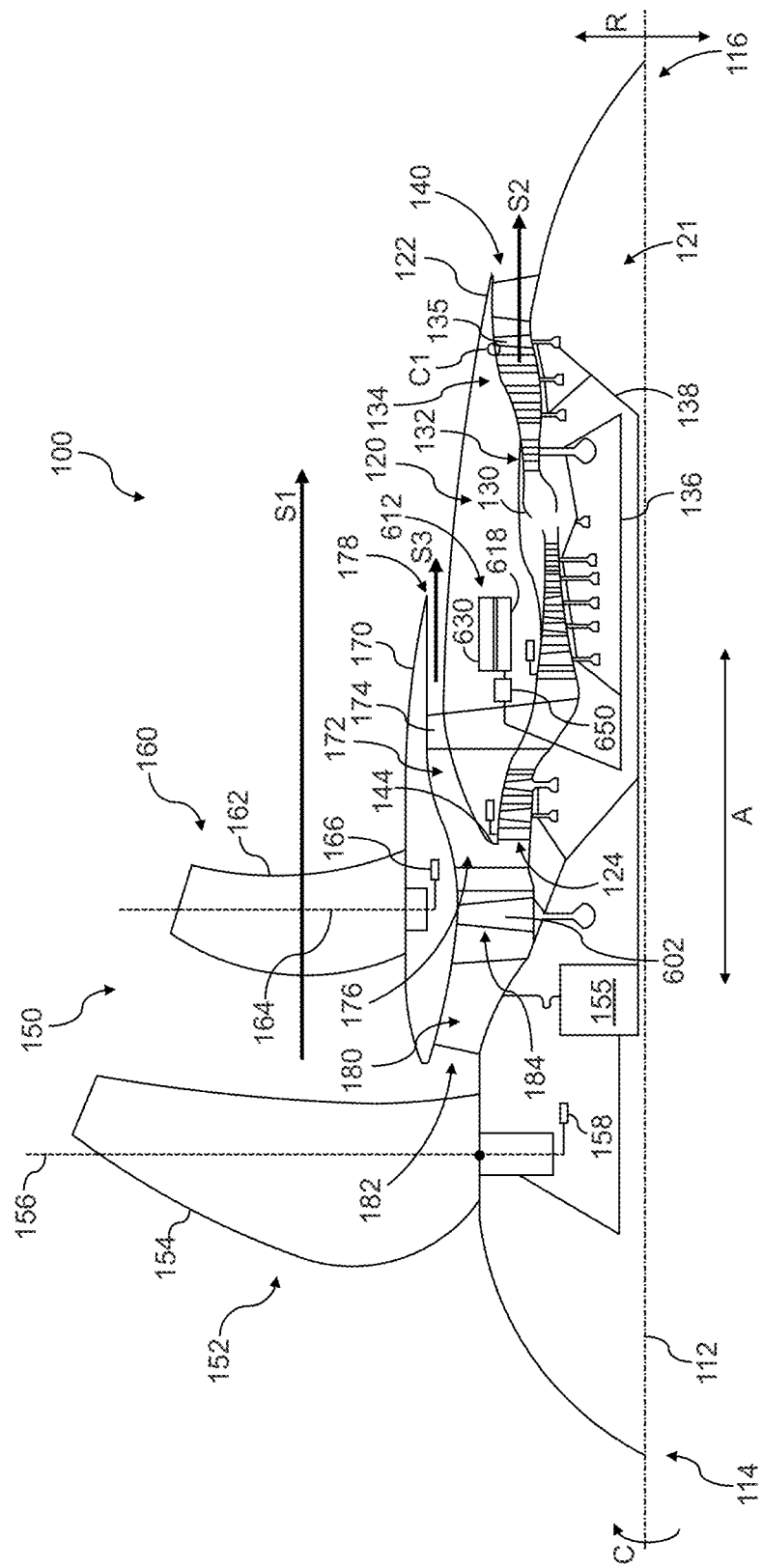
FIG. 21 provides a schematic cross-sectional view of a three-stream gas turbine engine according to yet other various embodiments of the present disclosure.

As is depicted, for this embodiment, the electric machine 612 is operatively coupled with the HP shaft 136. More specifically, for this embodiment, the rotor 618 of the electric machine 612 is directly mechanically coupled with the HP shaft 136. The electric machine 612 is positioned forward of the HP compressor 128 but aft of the mid-fan 184 along the axial direction A. Moreover, the electric machine 612 is positioned inward of the core duct 142 along the radial direction R. The rotor 618 is rotatably about its centerline, which is coaxial with the longitudinal axis 112 in this example embodiment, relative to the stator 630. In such a manner, as will be appreciated, the electric machine 612 can generate electrical power, e.g., when operated in a generator mode, or may drive the HP shaft 136, e.g., when operated in a drive mode. In other example embodiments, the electric machine 612 of the engine 100 of FIGS. 19 and 20 can be positioned in other suitable locations. For example, in some embodiments, the electric machine 612 can be positioned within the core cowl 122 as depicted in FIG. 21. For the embodiment of FIG. 21, the electric machine 612 is indirectly mechanically coupled with the HP shaft 136 via a gearbox 650.

It will be appreciated that the inventors of the present disclosure have found or otherwise discovered that there are certain operating and geometric relationships between various components of a three-stream gas turbine engine having an embedded electric machine coupled with a high pressure shaft or spool that provide certain advantages over conventional turbofan engines. As one example, a three-stream engine having an electric machine operatively coupled with an HP shaft of the engine, such as disclosed in FIG. 19 as well as in other noted embodiments provided herein, may include components operating or arranged geometrically in advantageous relationships that ultimately provide significant fuel burn advantages over conventional turbofans, among other benefits.

As shown in FIGS. 19 and 20, the mid-fan 184 is operatively coupled with the LP shaft 138 and the HP turbine 132 is operatively coupled with the HP shaft 136. In this regard, the engine 100 can operate at a mid-fan tip speed to high pressure turbine tip speed ratio. The mid-fan tip speed to high pressure turbine tip speed ratio can be constant. The mid-fan tip speed to high pressure turbine tip speed ratio is defined by a tip speed of one of the mid-fan blades 602 of the mid-fan 184 to a tip speed of one of the last stage turbine blades 131 of the HP turbine 132. Stated another way, the mid-fan tip speed to high pressure turbine tip speed ratio may be defined as: Mid-Fan Tip Speed/HPT Tip Speed (Ratio 12).

The Mid-Fan Tip Speed is measured at a leading edge tip of one of the mid-fan blades 602, e.g., at a location A1 depicted in FIG. 20. The HPT Tip Speed is measured at a leading edge tip of one of the last stage turbine blades 131 of the HP turbine 132, e.g., at a location D1 depicted in FIG. 20. For the depicted embodiment of FIG. 20, the last stage turbine blades 131 of the HP turbine 132 is also the first stage as there is only one stage of high pressure turbine blades in this example embodiment.

In certain exemplary embodiments, the engine 100 is operated so as to define the mid-fan tip speed to high pressure turbine tip speed ratio as being equal to or greater than 0.7 and less than or equal to 1.5. In yet other embodiments, the engine 100 is operated so as to define the mid-fan tip speed to high pressure turbine tip speed ratio as being equal to or greater than 0.8 and less than or equal to 1.2. In some further embodiments, the engine 100 is operated so as to define the mid-fan tip speed to high pressure turbine tip speed ratio as being equal to or greater than 0.9 and less than or equal to 1.1, or about 1.0. Such measurements can be taken at a red line speed of the engine 100 or at any other speed.

The inventors of the present disclosure have found that three-stream engines operated so as to define the mid-fan tip speed to high pressure turbine tip speed ratio within one or more of the noted ranges have certain architectural and operating advantages. More specifically, operating a three-stream engine within the noted ranges for the mid-fan tip speed to high pressure turbine tip speed ratio can ensure that the radius of the mid-fan (i.e., a radial length or radius spanning along the radial direction R between the longitudinal axis and a leading edge tip of one of the mid-fan blades of the mid-fan) is optimized relative to the high pressure turbine architecture. For example, when the mid-fan radius is too large, the tip speed of the mid-fan may drive unacceptable aerodynamic losses. Moreover, mechanical stresses on the mid-fan may become excessive. In contrast, when the mid-fan radius is too small, the average velocity in the high pressure turbine blade passage may become too high, which may drive increased aerodynamic losses. The inventors of the present disclosure have taken these considerations into account in developing the noted ranges for the mid-fan tip speed to high pressure turbine tip speed ratio.

Referring to FIGS. 19 and 20, in some embodiments, the engine 100 can be arranged to define a mid-fan hub radius to electric machine radius ratio. The mid-fan hub radius to electric machine radius ratio may be defined as: Mid-Fan Blade Hub Radius/EM Radius (Ratio 13).

The mid-fan hub radius to electric machine radius ratio can be a fixed ratio as these two radii can be fixed. The Mid-Fan Blade Hub Radius is measured as a radial length or radius spanning along the radial direction R between the longitudinal axis 112 and an outermost point of a hub of one of the mid-fan blades 602 of the mid-fan 184. More specifically, as shown best in FIGS. 6 and 8, the Mid-Fan Blade Hub Radius is measured as Radius R12, which spans along the radial direction R between the longitudinal axis 112 and an outermost point taken at the trailing edge of a hub 193 of one of the mid-fan blades 602 of the mid-fan 184. The outermost point taken at the trailing edge of the hub 193 is the outermost point of the hub 193 with respect to the longitudinal axis 112 along the radial direction R.

The EM Radius is measured as a Radius R13 spanning along the radial direction R between the longitudinal axis 112 and an outermost point of the rotor 618 or the stator 630 depending on which one is positioned outward of the other along the radial direction R. For example, when the rotor 618 is positioned outward of the stator 630 along the radial direction R (i.e., when the electric machine 612 has an outer-rotor configuration), the outermost point is taken as the outermost point of the rotor 618. In contrast, when the stator 630 is positioned outward of the rotor 618 along the radial direction R, (i.e., when the electric machine 612 has an inner-rotor configuration as shown in FIG. 18), the outermost point is taken as the outermost point of the stator 630.

In certain exemplary embodiments, the mid-fan 184 and the electric machine 612 of the engine 100 define the mid-fan hub radius to electric machine radius ratio as being equal to or greater than 0.1 and less than or equal to 1.0, equal to or greater than 0.1 and less than or equal to 0.4, equal to or greater than 0.4 and less than or equal to 0.8, or equal to or greater than 0.6 and less than or equal to 1.0. In such a manner, the outermost point taken at the trailing edge of the hub 193 is positioned even with or outward of the outermost point of the rotor 618 or stator 630 of the electric machine 612 along the radial direction R (depending on which one is positioned outward of the other along the radial direction R). The inventors of the present disclosure have found that three-stream engines having an electric machine and mid-fan arranged according to the noted ranges advantageously balance the geometry constraints and operating performance and efficiency of the mid-fan and electric machine, and also accounts for thermal constraints associated with the electric machine, particularly for three-stream engines having an embedded electric machine positioned as shown best in FIGS. 19 and 20.

Moreover, in some embodiments, the engine 100 can be arranged to define a high pressure compressor blade hub radius to electric machine tip radius ratio. The high pressure compressor hub radius to electric machine radius ratio may be defined as: HPC Blade Hub Radius/EM Radius (Ratio 14).

The high pressure compressor hub radius to electric machine radius ratio can be a fixed ratio as these two radii can be fixed. As shown best in FIG. 20, the HPC Blade Hub Radius is measured as a radial length or Radius R14 spanning along the radial direction R between the longitudinal axis 112 and an outermost point taken at a leading edge of a hub 129 of one of the first stage blades 127 of the HP compressor 128. The EM Radius is measured as a Radius R13 spanning along the radial direction R between the longitudinal axis 112 and an outermost point of the rotor 618 or the stator 630 depending on which one is positioned outward of the other along the radial direction R.

In certain exemplary embodiments, the high pressure compressor 128 and the electric machine 612 of the engine 100 define the high pressure compressor hub radius to electric machine radius ratio as being equal to or greater than 0.1 and less than or equal to 1.0, equal to or greater than 0.1 and less than or equal to 0.25, equal to or greater than 0.25 and less than or equal to 0.5, or equal to or greater than 0.5 and less than or equal to 1.0. In such a manner, the outermost point taken at a leading edge of a hub 129 of one of the first stage blades 127 of the HP compressor 128 is positioned even with or outward of the outermost point of the rotor 618 or stator 630 of the electric machine 612 along the radial direction R (depending on which one is positioned outward of the other along the radial direction R).

The inventors of the present disclosure have found that three-stream engines having an electric machine coupled with the HP shaft and high pressure compressor arranged according to the noted ranges advantageously balance the geometry constraints and operating performance and efficiency of the HP compressor and electric machine, and also account for thermal constraints associated with the electric machine, particularly for three-stream engines having an embedded electric machine positioned as shown best in FIGS. 19 and 20.

Referring still to FIGS. 19 and 20, as noted for this embodiment, the HP turbine 132 is operatively coupled with the HP shaft 136 and the electric machine 612 is operatively coupled with the HP shaft 136 as well. In this regard, the engine 100 can operate at a high pressure turbine tip speed to electric machine tip speed ratio. The high pressure turbine tip speed to electric machine tip speed ratio can be constant, except when the electric machine 612 is decoupled from the HP shaft 136, e.g., by way of a clutch (not shown). The high pressure turbine tip speed to electric machine tip speed ratio is defined by a tip speed of one of the last stage turbine blades 131 of the HP turbine 132 to a tip speed of the rotor 618 of the electric machine 612. Stated another way, the high pressure turbine tip speed to electric machine tip speed ratio may be defined as: HPT Tip Speed/EM Tip Speed (Ratio 15).

The HPT Tip Speed is measured at a leading edge tip of one of the last stage turbine blades 131 of the HP turbine 132, e.g., at a location D1 depicted in FIG. 20. The EM Tip Speed is measured at an outermost point of the rotor 618 of the electric machine 612, e.g., at a location B2 depicted in FIG. 20. As noted previously the outermost point of the rotor 618 is defined as the outermost point of the rotor 618 along the radial direction R with respect to the longitudinal axis 112.

In certain exemplary embodiments, the engine 100 is operated so as to define the high pressure turbine tip speed to electric machine tip speed ratio as being equal to or greater than 0.1 and less than or equal to 1.0, equal to or greater than 0.1 and less than or equal to 0.3, equal to or greater than 0.3 and less than or equal to 0.6, equal to or greater than 0.4 and less than or equal to 1.0. Such measurements can be taken at a red line speed of the engine 100 or at any other speed. The inventors of the present disclosure have found that three-stream engines operated so as to define the high pressure turbine tip speed to electric machine tip speed ratio within one or more of the noted ranges have certain architectural and operating advantages. For example, operating a three-stream engine within the noted ranges for the high pressure turbine tip speed to electric machine tip speed ratio can prevent unacceptable penalties on the power density of the electric machine, can prevent too much tip speed on the high pressure turbine and high pressure compressor, and can prevent the mechanical capabilities of electrical components of the electric machine from exceeding their limits, among other benefits.

In certain exemplary embodiments, the engine 100 depicted in FIGS. 19 and 20 can be arranged to define a high pressure turbine length to electric machine length ratio. The high pressure turbine length to electric machine length ratio is defined by an axial length of the HP turbine 132 to an axial length of the electric machine 612. Stated another way, the high pressure turbine length to electric machine length ratio may be defined as: HPT Length/EM Length (Ratio 16).

The high pressure turbine length to electric machine length ratio can be a fixed ratio as the axial length of the HP turbine 132 and the axial length of the electric machine 612 are fixed. The HPT Length is measured as the axial length of the HP turbine 132. As shown best in FIG. 20, the axial length of the HP turbine 132 is defined as a length L3 spanning along the axial direction A between a leading edge of one of the first stage turbine nozzles 125 of the HP turbine 132 to a trailing edge of one of the last stage turbine blades 131 of the HP turbine 132. The EM Length is measured as the axial length of the electric machine 612. As illustrated in FIG. 20, the axial length of the electric machine 612 is defined as a length L4 spanning along the axial direction A between a leading edge of the rotor 618 of the electric machine 612 and a trailing edge of the rotor 618 of the electric machine 612.

In certain exemplary embodiments, the HP turbine 132 and the electric machine 612 of the engine 100 define the high pressure turbine length to electric machine length ratio as being equal to or greater than 0.1 and less than or equal to 1.5, equal to or greater than 0.1 and less than or equal to 0.5, equal to or greater than 0.5 and less than or equal to 0.85, or equal to or greater than 0.85 and less than or equal to 1.5. The ranges for the high pressure turbine length to electric machine length ratio capture the architectural and operating relationship between the electric machine and the high pressure turbine of the three-stream engine, both of which are coupled to the high pressure shaft in such example embodiments. More specifically, the inventors of the present disclosure have found that three-stream engines having an electric machine and high pressure turbine arranged according to the noted ranges advantageously balance weight and loading or efficiency considerations of the high pressure turbine with the performance requirements of the electric machine.

Referring still to FIGS. 19 and 20, in some embodiments, the engine 100, and more More specifically, the electric machine 612 embedded therein is operated so as to define a power to voltage ratio, wherein the electric machine 612 is operatively coupled with the HP shaft 136. The power to voltage ratio can be constant, particularly during high efficiency operations and excluding situations where the electric machine 612 is decoupled from the HP shaft 136. The power to voltage ratio is defined by an electrical power output by the electric machine 612 in kilowatts to a voltage level of the electric machine 612 in volts of direct current. Stated another way, the power to voltage ratio may be defined as: EM Power/EM Voltage (Ratio 17).

As noted above, the EM Power is measured as the electrical power output by the electric machine 612 in kilowatts. In certain exemplary embodiments, the electrical power output by the electric machine 612 ranges from 100 kilowatts to 1 megawatts (100 KW-1 MW). Further, the EM Voltage is measured as the voltage level of the electric machine 612 in volts of direct current Vdc. In certain exemplary embodiments, the voltage level of the electric machine 612 ranges from 270 Vdc to 3 kVdc.

In certain exemplary embodiments, the electric machine 612 of the engine 100 is operated so as to define the power to voltage ratio as being equal to or greater than 0.3 and less than or equal to 2.0, equal to or greater than 0.3 and less than or equal to 1.1, equal to or greater than 0.3 and less than or equal to 0.6, or equal to or greater than 0.6 and less than or equal to 1.1, or equal to or greater than 1.0 and less than or equal to 2.0. Such measurements can be taken at a red line speed of the engine 100 or at any other speed, notwithstanding situations where the electric machine 612 is decoupled from the LP shaft 138.

The inventors of the present disclosure have found that three-stream engines having an electric machine arranged as shown and described and operated according to the noted ranges advantageously balance the physical space required for the electric machine, the physical space needed between electrically conducting components of the electric machine, and partial discharge considerations with electric current levels and consequently increased weight of cables and busbars associated with the electric machine and/or power systems of the aircraft.

In certain exemplary embodiments, the engine 100 of FIGS. 19 and 20 and/or the three-stream engine of FIG. 21 may define a combination of the ratios noted above. For example, the engine 100 of FIGS. 19 and 20 may be arranged and operated to define any suitable combination of Ratio 1, Ratio 12, Ratio 13, Ratio 14, Ratio 15, Ratio 16, and Ratio 17. Embodiments of the three-stream engine may be arranged and operated to define a single one of the above-noted ratios or some combination thereof.

Various examples are provided in the description below. For each example embodiment, the three-stream engine may include a primary fan and a mid-fan. Each example three-stream engine may be arranged to define a primary fan radius to mid-fan radius ratio as being equal to or greater than 2.0 and less than or equal to 6.5. In some example embodiments, for example, the three-stream engine may be arranged to define the primary fan radius to mid-fan radius ratio as being as being at least about 3.0 and less than 4.0.

A tenth example is now provided (Example 10): A three-stream engine has a low pressure shaft, a primary fan operatively coupled with the shaft, e.g., via a gearbox and connecting fan rotor, a mid-fan positioned downstream of the primary fan and directly operatively coupled with the low pressure shaft, the mid-fan having mid-fan blades. The third stream further includes a high pressure turbine operatively coupled with a high pressure shaft. The three-stream engine also includes an electric machine operatively coupled with the high pressure shaft. The electric machine has a rotor rotatable with the high pressure shaft. The three-stream engine is arranged to define a mid-fan tip speed to high pressure turbine tip speed ratio. The mid-fan tip speed is measured at a leading edge tip of one of the mid-fan blades. The high pressure tip speed is measured at a leading edge tip of one of the last stage turbine blades of the HP turbine. The three-stream engine defines the mid-fan tip speed to high pressure turbine tip speed ratio as 1.0.

An eleventh example is now provided (Example 11): A three-stream engine has a low pressure shaft, a primary fan operatively coupled with the low pressure shaft, e.g., via a gearbox and connecting fan rotor, a mid-fan positioned downstream of the primary fan and directly operatively coupled with the low pressure shaft, the mid-fan having mid-fan blades. The third stream further includes a high pressure turbine operatively coupled with a high pressure shaft. The three-stream engine also includes an electric machine operatively coupled with the high pressure shaft. The electric machine has a rotor rotatable with the high pressure shaft. The three-stream engine is arranged to define a high pressure turbine tip speed to electric machine tip speed ratio. The high pressure turbine tip speed is measured at a leading edge tip of one of the last stage turbine blades of the high pressure turbine and the electric machine tip speed is measured at an outermost point of the rotor of the electric machine. The three-stream engine defines the high pressure turbine tip speed to electric machine tip speed ratio as 0.4.

A twelfth example is now provided (Example 12): A three-stream engine has a low pressure shaft, a primary fan operatively coupled with the low pressure shaft, e.g., via a gearbox and connecting fan rotor, a mid-fan positioned downstream of the primary fan and directly operatively coupled with the low pressure shaft, the mid-fan having mid-fan blades. The third stream further includes a high pressure turbine operatively coupled with a high pressure shaft. The three-stream engine also includes an electric machine operatively coupled with the high pressure shaft. The electric machine has a rotor rotatable with the high pressure shaft. The three-stream engine is arranged to define a high pressure turbine length to electric machine length ratio. The high pressure turbine length is measured as the axial length of the high pressure turbine, i.e., a length spanning along the axial direction between a leading edge of one of the first stage turbine nozzles of the high pressure turbine to a trailing edge of one of the last stage turbine blades of the high pressure turbine. The electric machine length is measured as the axial length of the electric machine. The three-stream engine defines the high pressure turbine length to electric machine length ratio as 1.3.

Figure 22:
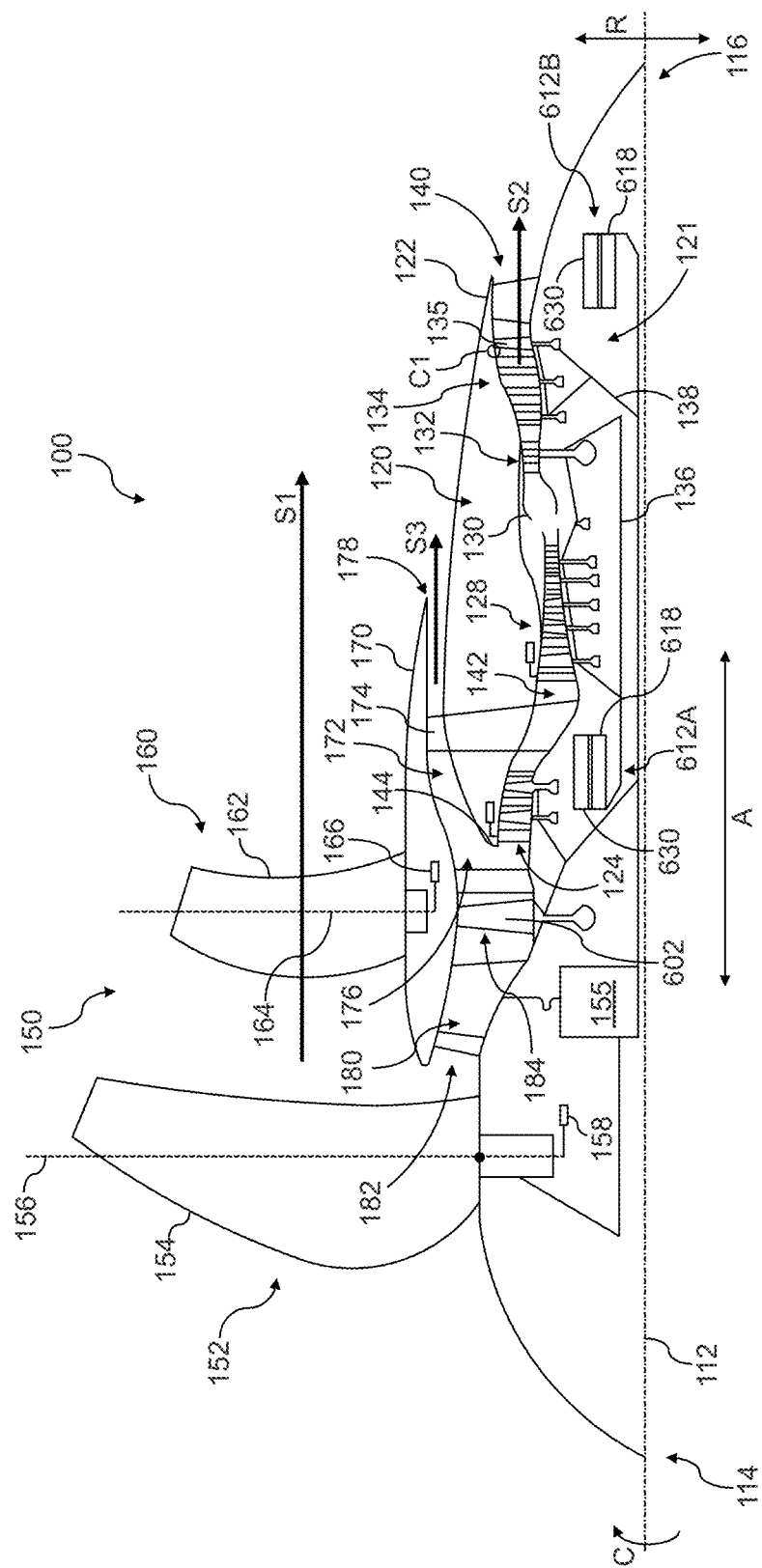
FIG. 22 provides a schematic cross-sectional view of a three-stream gas turbine engine according to various embodiments of the present disclosure.

With reference now to FIG. 22, FIG. 22 provides a schematic cross-sectional view of a three-stream gas turbine engine 100 according to various embodiments of the present disclosure. The engine 100 of FIG. 22 is configured in a similar manner to the engine 100 of FIGS. 13 through 16 and FIGS. 19 and 20 except as provided below.

For this embodiment, the three-stream gas turbine engine 100 includes a first electric machine 612A operatively coupled with a first shaft or HP shaft 136 and a second electric machine 612B operatively coupled with a second shaft or LP shaft 138. The electric machines 612A, 612B can be mechanically connected to their respective shafts 136, 138 directly or indirectly, e.g., by way of a gearbox. The first electric machine 612A is positioned in the same location as the electric machine 612 of FIGS. 19 and 20 and the second electric machine 612B is positioned in the same location as the electric machine 612 of FIGS. 13 through 16 in this example embodiment. However, in other embodiments, the electric machines 612A, 612B may be positioned in other suitable locations. In certain exemplary embodiments, the engine 100 of FIG. 22 may define one or more of the ratios noted herein.

Notably, the inventors of the present disclosure have found that there are certain operating relationships between various components of a three-stream gas turbine engine having a first embedded electric machine operatively coupled with a high pressure shaft or spool and a second embedded electric machine operatively coupled with a low pressure shaft or spool that provide certain advantages over conventional turbofan engines.

For example, with reference to FIG. 22, the engine 100 can operate so as to define a second electric machine power to first electric machine power ratio. The second electric machine power to first electric machine power ratio can be constant, particularly during high efficiency operations of the engine 100 and excluding situations where the first electric machine 612A is decoupled from the HP shaft 136 and/or the second electric machine 612B is decoupled form the LP shaft 138. The second electric machine power to first electric machine power ratio is defined by an electrical power output by the second electric machine in kilowatts to an electrical power output by the first electric machine in kilowatts. Stated another way, the second electric machine power to first electric machine power ratio may be defined as: Second EM Power/First EM Power (Ratio 18).

In certain exemplary embodiments, the engine 100 is operated so as to define the second electric machine power to first electric machine power ratio as being equal to or greater than 0.1 and less than or equal to 1.5. In yet other embodiments, the engine 100 is operated so as to define the second electric machine power to first electric machine power ratio as being equal to or greater than 0.5 and less than or equal to 1.2, equal to or greater than 0.5 and less than or equal to 0.75, equal to or greater than 0.75 and less than or equal to 1.2. In some further embodiments, the engine 100 is operated so as to define the second electric machine power to first electric machine power ratio as being equal to or greater than 0.6 and less than or equal to 0.9. Such measurements can be taken at a red line speed of the engine 100 or at any other speed. In some implementations, the electrical power output of the second electric machine ranges from 100 kilowatts to 3 megawatts and the electrical power output of the first electric machine ranges from 100 kilowatts to 1 megawatt.

The inventors of the present disclosure have found that three-stream engines having a second electric machine and a first electric machine arranged and operated according to the noted ranges advantageously balances the geometric and physical space constraints, thermal needs, efficiency, and performance of the first and second electric machines.

In certain exemplary embodiments, the engine 100 of FIG. 22 may define a combination of the ratios noted above. For example, the engine 100 of FIG. 22 may be arranged and operated to define any suitable combination of Ratio 1 to Ratio 18. Embodiments of the three-stream engine may be arranged and operated to define a single one of the above-noted ratios or some combination thereof.

A thirteenth example is now provided (Example 13): A three-stream engine has a low pressure shaft, a primary fan operatively coupled with the low pressure shaft, e.g., via a gearbox and connecting fan rotor, a mid-fan positioned downstream of the primary fan and directly operatively coupled with the low pressure shaft, the mid-fan having mid-fan blades. The three-stream engine further includes a first electric machine mechanically coupled with the low pressure shaft. The third stream also includes a high pressure shaft and a second electric machine mechanically coupled thereto. The three-stream engine is arranged to define a second electric machine power to first electric machine power ratio. The three-stream engine defines the second electric machine power to first electric machine power ratio as 0.7.

Figure 23A:
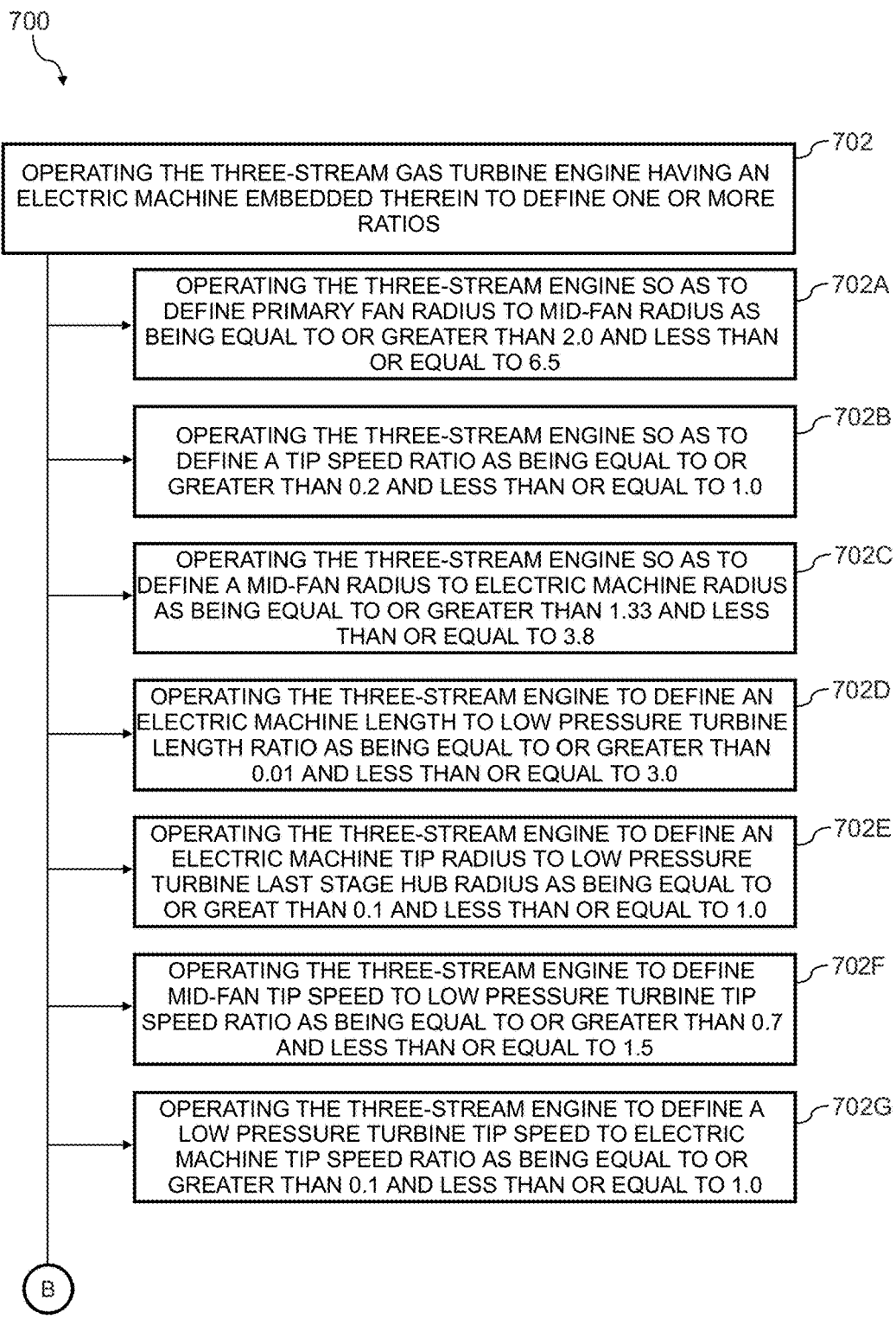
FIGS. 23A and 23B provide a flow diagram for a method of operating a three-stream engine according to one example embodiment of the present disclosure.
Figure 23B:
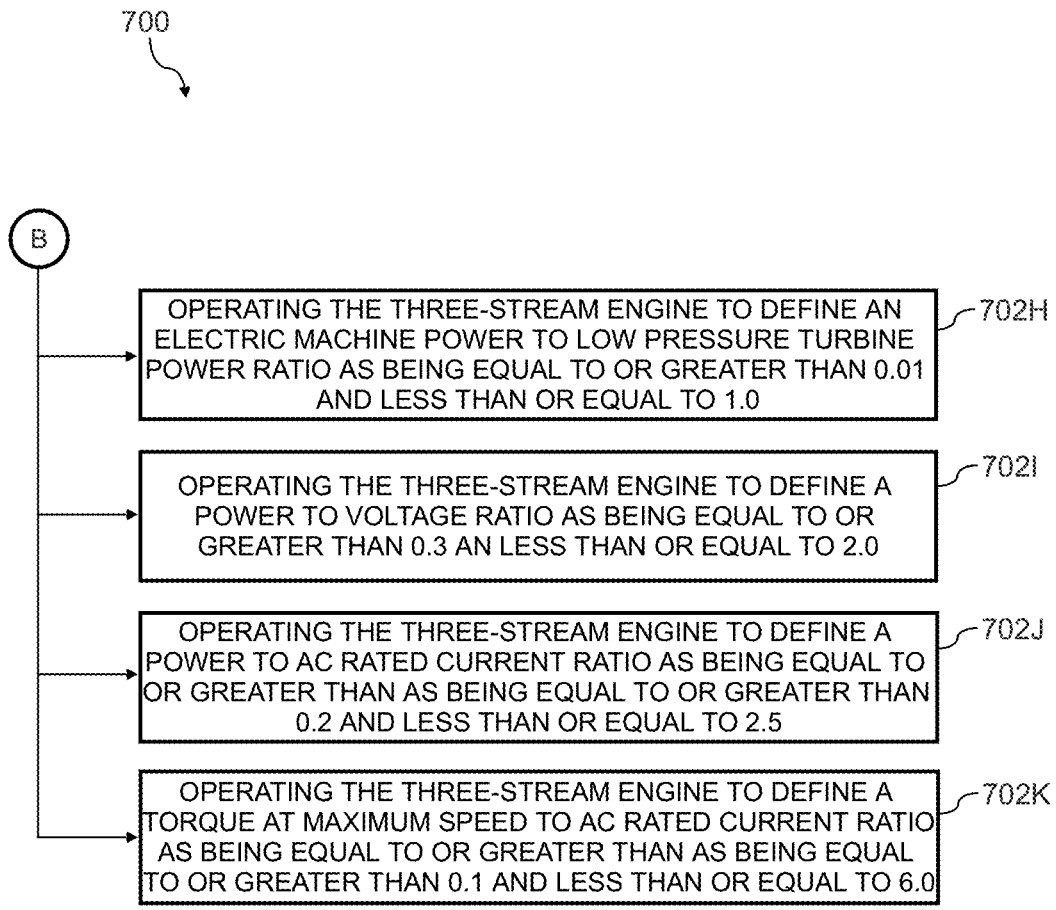

FIG. 23A and FIG. 23B provide a flow diagram for a method (400) of operating a three-stream engine according to one example embodiment of the present disclosure. For example, method (400) can be used to operate the three-stream gas turbine engine of FIGS. 13 through 16, FIG. 17, FIG. 18, or any other three-stream engine having an embedded electric machine operatively coupled with a shaft of the engine, such as a low pressure shaft. It will be appreciated that method (400) is discussed herein to describe exemplary aspects of the present subject matter and is not intended to be limiting.

At (402), the method (400) includes operating a three-stream gas turbine engine having an electric machine embedded therein to define one or more ratios, such as the ratios set forth in (402A) through (402K).

In certain exemplary aspects, the three-stream engine defines a radial direction and has an inlet duct, a core duct in flow communication with the inlet duct, and a fan duct in flow communication with the inlet duct and positioned outward of the core duct along the radial direction. In such implementations, the mid-fan can be positioned within the inlet duct upstream of the core duct and the fan duct. Further, in certain exemplary aspects, the three-stream engine has a fan positioned upstream of the mid-fan and operatively coupled with the shaft (e.g., an LP shaft). In certain exemplary aspects, the fan is unducted, e.g., as shown in FIG. 13. In other implementations, the fan is ducted, e.g., by an outer nacelle or fan casing as shown in FIG. 17. In addition, in such implementations, the mid-fan is positioned between the fan and a low pressure compressor along an axial direction defined by the three-stream engine. Further, in such implementations, a root of a mid-fan blade is positioned inward of a root of a fan blade of the fan along the radial direction.

Furthermore, in certain exemplary aspects, the three-stream engine has an engine core and the electric machine is positioned within the engine core. In this regard, the electric machine is embedded within the three-stream engine. For example, in certain exemplary aspects, the electric machine can be positioned inward of the core duct along the radial direction. Moreover, in certain exemplary aspects, the electric machine is coupled to the shaft (e.g., an LP shaft) aft of the mid-fan, e.g., as shown in FIG. 13. In yet other implementations, the electric machine is coupled to the shaft (e.g., an LP shaft) forward of the mid-fan. Further, in certain exemplary aspects, the electric machine is directly connected to the shaft. In some alternative implementations, the electric machine is indirectly coupled with the shaft, e.g., by way of a gearbox.

At (402A), the method (400) includes operating the three-stream gas turbine engine to define a primary fan radius to mid-fan radius as being equal to or greater than 2.0 and less than or equal to 6.5. In such implementations, the three-stream gas turbine engine has a primary fan having a plurality of fan blades. The primary fan radius to mid-fan radius ratio is defined by a radius spanning between a longitudinal axis defined by the three-stream gas turbine engine and a leading edge tip of one of the fan blades to a radius spanning between the longitudinal axis and a leading edge tip of one of the mid-fan blades. In some other implementations, the three-stream engine defines the primary fan radius to mid-fan radius ratio as being at least about 2.0. In other implementations, the three-stream engine defines the primary fan radius to mid-fan radius ratio as being at least about 2.5. In yet other implementations, the three-stream engine defines the primary fan radius to mid-fan radius ratio as being at least about 3.0. In some further implementations, the three-stream engine defines the primary fan radius to mid-fan radius ratio as being at least about 4.0. In yet other implementations, the three-stream engine defines the primary fan radius to mid-fan radius ratio as being at least about 6.0. In some other implementations, the three-stream engine defines the primary fan radius to mid-fan radius ratio as being about 6.5.

At (402B), in addition or alternatively to operating the three-stream gas turbine engine at (402A), the method (400) includes operating the three-stream gas turbine engine to define a tip speed ratio as being equal to or greater than 0.2 and less than or equal to 1.0, the tip speed ratio being defined by a tip speed of a rotor of the electric machine to a tip speed of a mid-fan blade of a mid-fan. In such implementations, the electric machine and the mid-fan are both operatively coupled with a shaft of the three-stream gas turbine engine. The electric machine and the mid-fan can both be operatively coupled with a low pressure shaft of the three-stream gas turbine engine, for example.

At (402C), in addition or alternatively to operating the three-stream gas turbine engine at (402A) and/or at (402B), the method (400) includes operating the three-stream gas turbine engine to define a mid-fan radius to electric machine radius ratio as being equal to or greater than 1.33 and less than or equal to 3.8. In some further implementations, the engine 100 defines the mid-fan radius to electric machine radius ratio as being equal to or greater than 2.5 and less than or equal to 3.3. In yet other implementations, the engine 100 defines the mid-fan radius to electric machine radius ratio as being equal to or greater than 2.9 and less than or equal to 3.2.

At (402D), in addition or alternatively to operating the three-stream gas turbine engine at (402A) and/or at (402B) and/or at (402C), the method (400) includes operating the three-stream gas turbine engine to define an electric machine length to low pressure turbine length ratio as being equal to or greater than 0.01 and less than or equal to 3.0. The range for the electric machine length to low pressure turbine length ratio captures the architectural and operating relationship between the electric machine and the low pressure turbine. The electric machine length is a length spanning between a leading edge and a trailing edge of the rotor of the electric machine along the axial direction. The length of the low pressure turbine is a length spanning between a leading edge of a hub of one of the first stage turbine blades of the low pressure turbine to a trailing edge of a hub of one of the last stage turbine blades of the LP turbine.

At (402E), in addition or alternatively to operating the three-stream gas turbine engine at (402A) and/or at (402B) and/or at (402C) and/or at (402D), the method (400) includes operating the three-stream gas turbine engine to define the electric machine tip radius to low pressure turbine last stage hub radius ratio as being equal to or greater than 0.1 and less than or equal to 1.0. The electric machine tip radius is a length or radius spanning between the longitudinal axis and an outermost point of the rotor of the electric machine. The low pressure turbine last stage hub radius is a length or radius spanning between a longitudinal axis defined by the three-stream engine and an outermost point taken at a trailing edge of a hub of a last stage turbine blade of a low pressure turbine operatively coupled with the shaft.

At (402F), in addition or alternatively to operating the three-stream gas turbine engine at (402A) and/or at (402B) and/or at (402C) and/or at (402D) and/or at (402E), the method (400) includes operating the three-stream gas turbine engine to define a mid-fan tip speed to low pressure turbine tip speed ratio as being equal to or greater than 0.7 and less than or equal to 1.5. In such implementations, the mid-fan tip speed to low pressure turbine tip speed ratio is defined by a tip speed of a mid-fan blade of a mid-fan to a tip speed of a last stage turbine blade of a low pressure turbine. In some further implementations, the three-stream gas turbine engine is operated so as to define the mid-fan tip speed to low pressure turbine tip speed ratio as being equal to or greater than 0.8 and less than or equal to 1.2.

At (402G), in addition or alternatively to operating the three-stream gas turbine engine at (402A) and/or at (402B) and/or at (402C) and/or at (402D) and/or (402E) and/or at (402F), the method (400) includes operating the three-stream gas turbine engine to define a low pressure turbine tip speed to electric machine tip speed ratio as being equal to or greater than 0.1 and less than or equal to 1.0.

At (402H), in addition or alternatively to operating the three-stream gas turbine engine at (402A) and/or at (402B) and/or at (402C) and/or at (402D) and/or at (402E) and/or at (402F) and/or at (402G), the method (400) includes operating the three-stream gas turbine engine to define an electric machine power to low pressure turbine power ratio as being equal to or greater than 0.01 and less than or equal to 1.0. The unit of measure for the power output by the electric machine is to be kW and the unit of measure for the power output by the low pressure turbine is to be horsepower hp when determining the electric machine power to low pressure turbine power ratio.

At (402I), in addition or alternatively to operating the three-stream gas turbine engine at (402A) and/or at (402B) and/or at (402C) and/or at (402D) and/or at (402E) and/or at (402F) and/or at (402G) and/or at (402H), the method (400) includes operating the three-stream gas turbine engine so that the electric machine defines a power to voltage ratio as being equal to or greater than 0.3 and less than or equal to 2.0. In yet other implementations, operating the three-stream gas turbine engine so that the electric machine defines the power to voltage ratio as being equal to or greater than 0.35 and less than or equal to 0.5. The range for the power to voltage ratio captures the operating relationship between the electrical power associated with the electric machine and the voltage associated with the electric machine. In such implementations, the power to voltage ratio is defined by an electrical power output by the electric machine in kilowatts to a voltage level of the electric machine in volts of direct current. Further, in certain exemplary aspects, the electrical power output of the electric machine ranges from 100 kilowatts to 3 megawatts. Further, in certain exemplary aspects, the voltage level of the electric machine ranges between 270 volts of direct current and 3,000 volts of direct current.

At (402J), in addition or alternatively to operating the three-stream gas turbine engine at (402A) and/or at (402B) and/or at (402C) and/or at (402D) and/or at (402E) and/or at (402F) and/or at (402G) and/or at (402H) and/or at (402I), the method (400) includes operating the three-stream gas turbine engine so that the electric machine defines a power to AC rated current ratio as being equal to or greater than as being equal to or greater than 0.2 and less than or equal to 2.5. In yet other implementations, the electric machine of the three-stream engine is operated so as to define the power to AC rated current ratio as being equal to or greater than as being equal to or greater than 0.6 and less than or equal to 2.0. The range for the power to AC rated current ratio captures the operating relationship between the electrical power associated with the electric machine and the AC rated current associated with the electric machine.

At (402K), in addition or alternatively to operating the three-stream gas turbine engine at (402A) and/or at (402B) and/or at (402C) and/or at (402D) and/or at (402E) and/or at (402F) and/or at (402G) and/or at (402H) and/or at (402I) and/or at (402J), the method (400) includes operating the three-stream gas turbine engine so that the electric machine defines a torque at maximum speed to AC rated current ratio as being equal to or greater than as being equal to or greater than 0.1 and less than or equal to 6.0. In yet other implementations, the electric machine of the three-stream engine is operated so as to define the power to AC rated current ratio as being equal to or greater than as being equal to or greater than 0.6 and less than or equal to 1.0. The range for the torque at maximum speed to AC rated current ratio captures the operating relationship between the torque associated with a rotor of the electric machine and the AC rated current associated with the electric machine.

Figure 24A:
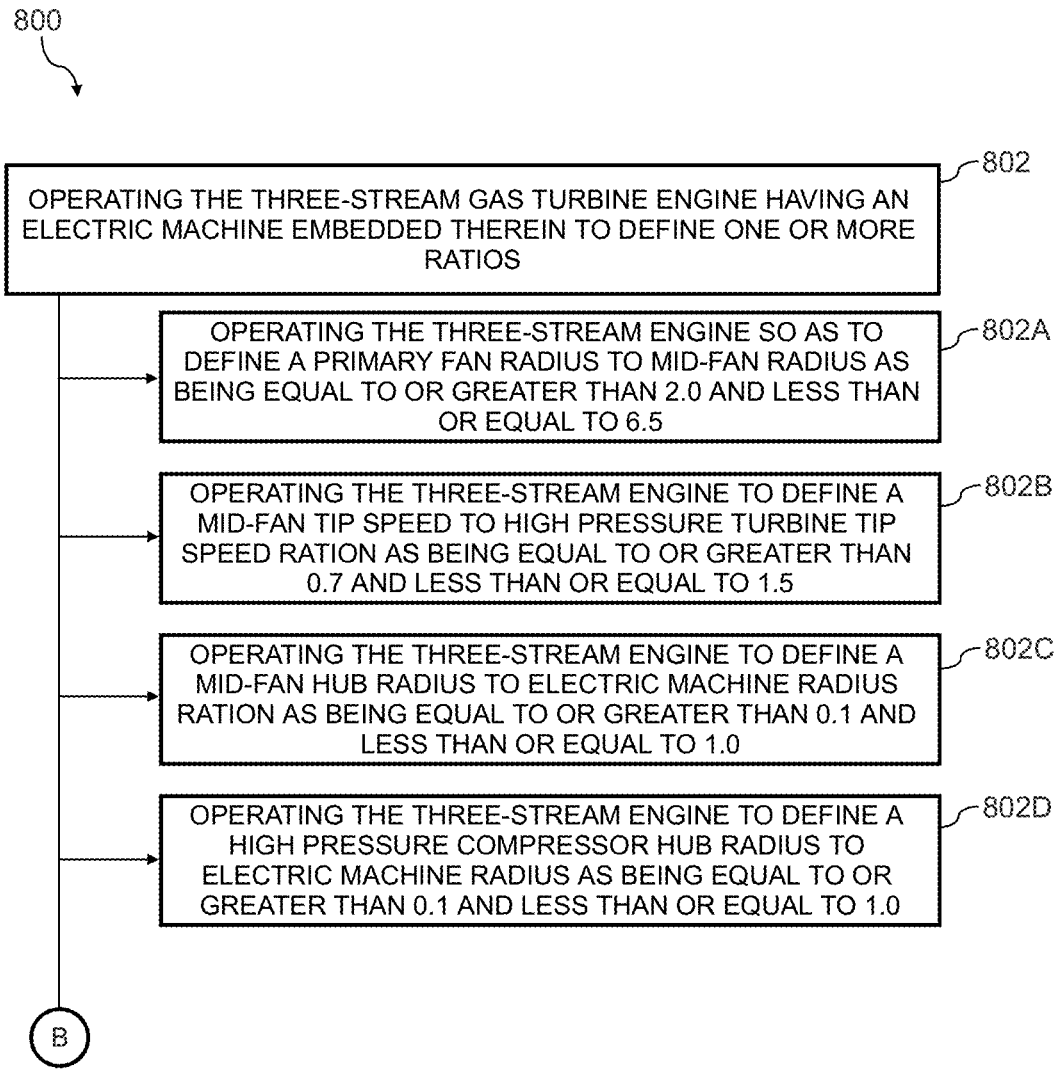
FIGS. 24A and 24B provide a flow diagram for a method of operating a three-stream engine according to one example embodiment of the present disclosure.
Figure 24B:
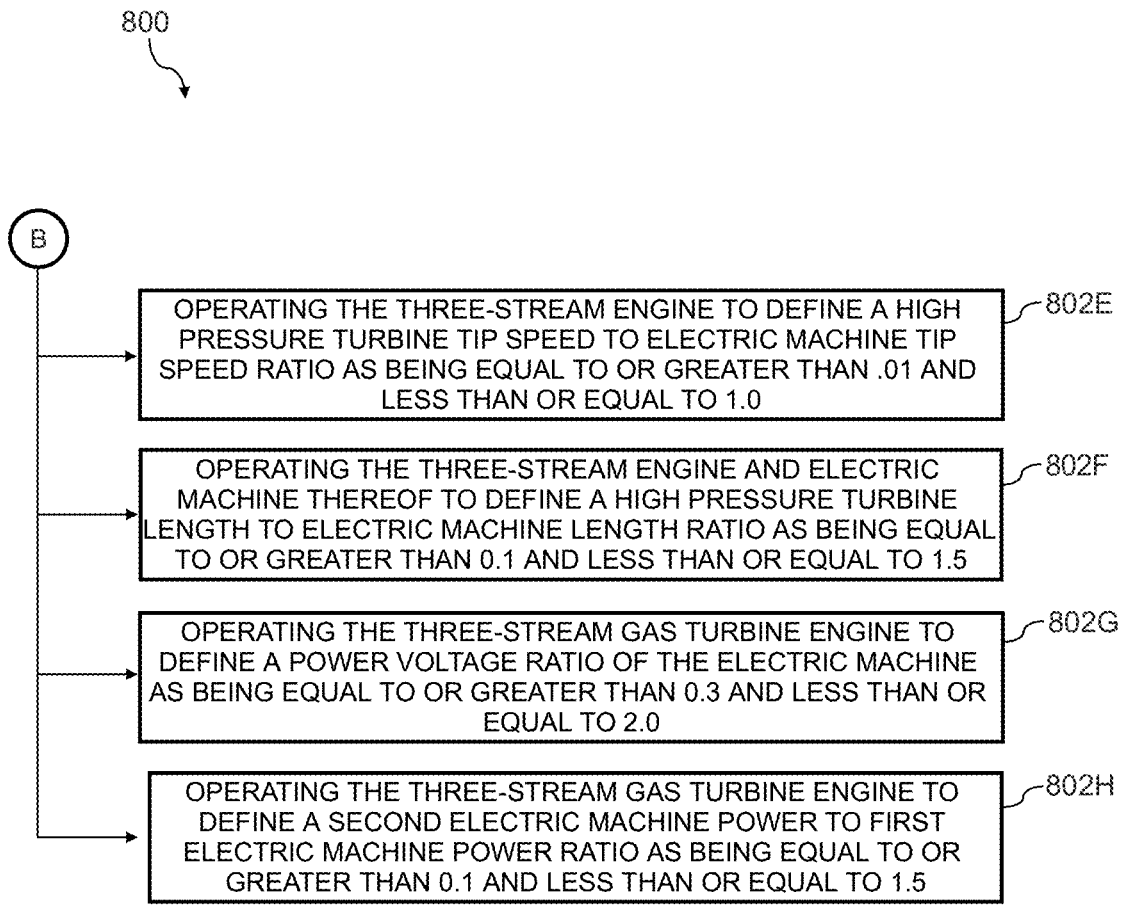

FIGS. 24A and 24B provide a flow diagram for a method (500) of operating a three-stream engine according to one example embodiment of the present disclosure. For example, method (500) can be used to operate the three-stream gas turbine engine of FIGS. 19 and 20 or any other three-stream engine having an embedded electric machine operatively coupled with a shaft or spool of the engine, such as a high pressure shaft. It will be appreciated that method (500) is discussed herein to describe exemplary aspects of the present subject matter and is not intended to be limiting. Reference may be made to FIGS. 19 and 20 below to provide context to method (500).

At (502), the method (500) includes operating a three-stream gas turbine engine having an electric machine embedded therein to define one or more ratios, such as the ratios set forth in (502A) through (502H).

In certain exemplary aspects, the three-stream engine defines a radial direction and has an inlet duct, a core duct in flow communication with the inlet duct, and a fan duct in flow communication with the inlet duct and positioned outward of the core duct along the radial direction. In such implementations, the mid-fan can be positioned within the inlet duct upstream of the core duct and the fan duct. Further, in certain exemplary aspects, the three-stream engine has a fan positioned upstream of the mid-fan and operatively coupled with the second shaft (e.g., an LP shaft). In certain exemplary aspects, the fan is unducted, e.g., as shown in FIG. 13. In other implementations, the fan is ducted, e.g., as shown in FIG. 17. In addition, in such implementations, the mid-fan is positioned between the fan and a low pressure compressor along an axial direction defined by the three-stream engine. Further, in such implementations, a root of a mid-fan blade is positioned inward of a root of a fan blade of the fan along the radial direction.

Furthermore, in certain exemplary aspects, the three-stream engine has an engine core and the electric machine is positioned within the engine core. In this regard, the electric machine is embedded within the three-stream engine. For example, in certain exemplary aspects, the electric machine can be positioned inward of the core duct along the radial direction. Moreover, in certain exemplary aspects, the electric machine is coupled to the first shaft (e.g., an HP shaft) aft of the mid-fan and forward of a high pressure compressor, e.g., as shown in FIG. 19. In yet other implementations, the electric machine is coupled to the first shaft forward of the mid-fan. Further, in certain exemplary aspects, the electric machine is directly connected to the first shaft, e.g., as shown in FIGS. 19 and 20. In some alternative implementations, the electric machine is indirectly coupled with the first shaft, e.g., by way of a gearbox.

At (502A), the method (500) includes operating the three-stream gas turbine engine to define a primary fan radius to mid-fan radius as being equal to or greater than 2.0 and less than or equal to 6.5. In such implementations, the three-stream gas turbine engine has a primary fan having a plurality of fan blades. The primary fan radius to mid-fan radius ratio is defined by a radius spanning between a longitudinal axis defined by the three-stream gas turbine engine and a leading edge tip of one of the fan blades to a radius spanning between the longitudinal axis and a leading edge tip of one of the mid-fan blades. In some other implementations, the three-stream engine defines the primary fan radius to mid-fan radius ratio as being at least about 2.0. In other implementations, the three-stream engine defines the primary fan radius to mid-fan radius ratio as being at least about 2.5. In yet other implementations, the three-stream engine defines the primary fan radius to mid-fan radius ratio as being at least about 3.0. In some further implementations, the three-stream engine defines the primary fan radius to mid-fan radius ratio as being at least about 4.0. In yet other implementations, the three-stream engine defines the primary fan radius to mid-fan radius ratio as being at least about 6.0. In some other implementations, the three-stream engine defines the primary fan radius to mid-fan radius ratio as being about 6.5.

At (502B), in addition or alternatively to operating the three-stream gas turbine engine at (502A), the method (500) includes operating the three-stream engine so as to define a mid-fan tip speed to high pressure turbine tip speed ratio as being equal to or greater than 0.7 and less than or equal to 1.5. The mid-fan tip speed to high pressure turbine tip speed ratio being defined by a tip speed of a mid-fan blade of a mid-fan to a tip speed of a last stage turbine blade of a high pressure turbine.

At (502C), in addition or alternatively to operating the three-stream gas turbine engine at (502A) and/or at (502B), the method (500) includes operating the three-stream engine so as to define a mid-fan hub radius to electric machine radius ratio as being equal to or greater than 0.1 and less than or equal to 1.0. In such implementations, the mid-fan hub radius to electric machine radius ratio is defined by a radius spanning between a longitudinal axis defined by the three-stream gas turbine engine and an outermost point taken at a trailing edge of a hub of the mid-fan blade of the mid-fan to a radius spanning between the longitudinal axis and an outermost point of the rotor or a stator of the electric machine depending on which one is positioned outward of the other along a radial direction defined by the three-stream gas turbine engine.

At (502D), in addition or alternatively to operating the three-stream gas turbine engine at (502A) and/or at (502B) and/or at (502C), the method (500) includes operating the three-stream gas turbine engine to define a high pressure compressor hub radius to electric machine radius ratio as being equal to or greater than 0.1 and less than or equal to 1.0. In such implementations, the high pressure compressor hub radius to electric machine radius ratio is defined by a radius spanning between a longitudinal axis defined by the three-stream gas turbine engine and an outermost point taken at a leading edge of a hub of a first stage blade of a high pressure compressor operatively coupled with the first shaft to a radius spanning between the longitudinal axis and an outermost point of the rotor or a stator of the electric machine depending on which one is positioned outward of the other along a radial direction defined by the three-stream gas turbine engine.

At (502E), in addition or alternatively to operating the three-stream gas turbine engine at (502A) and/or at (502B) and/or at (502C) and/or at (502D), the method (500) includes operating the three-stream gas turbine engine so as to define a high pressure turbine tip speed to electric machine tip speed ratio as being equal to or greater than 0.1 and less than or equal to 1.0. The high pressure turbine tip speed to electric machine tip speed ratio is defined by a tip speed of a first stage turbine blade of the high pressure turbine to a tip speed of a rotor of the electric machine.

At (502F), in addition or alternatively to operating the three-stream gas turbine engine at (502A) and/or at (502B) and/or at (502C) and/or at (502D) and/or at (502E), the method (500) includes operating the three-stream gas turbine engine so as to define a high pressure turbine length to electric machine length ratio as being equal to or greater than 0.1 and less than or equal to 1.5. The high pressure turbine length to electric machine length ratio is defined by a length of the high pressure turbine operatively coupled with the first shaft to a length of the electric machine spanning between a leading edge and a trailing edge of the rotor of the electric machine along an axial direction defined by the three-stream gas turbine engine.

At (502G), in addition or alternatively to operating the three-stream gas turbine engine at (502A) and/or at (502B) and/or at (502C) and/or at (502D) and/or at (502E) and/or at (502F), the method (500) includes operating the three-stream gas turbine engine to define a power to voltage ratio of the electric machine as being equal to or greater than 0.3 and less than or equal to 2.0. In such implementations, the power to voltage ratio is defined by an electrical power output by the electric machine in kilowatts to a voltage level of the electric machine in volts of direct current. Further, in certain exemplary aspects, the electrical power output of the electric machine ranges from 100 kilowatts to 1 megawatt. Further, in certain exemplary aspects, the voltage level of the electric machine ranges between 270 volts of direct current and 3,000 volts of direct current. In certain exemplary aspects, the electrical power output of the electric machine ranges from 100 kilowatts to 1 megawatt and the voltage level of the electric machine ranges between 270 volts of direct current and 3,000 volts of direct current.

At (502H), in addition or alternatively to operating the three-stream gas turbine engine at (502A) and/or at (502B) and/or at (502C) and/or at (502D) and/or at (502E), the method (500) includes operating the three-stream gas turbine engine so as to define a second electric machine power to first electric machine power ratio as being equal to or greater than 0.1 and less than or equal to 1.5. In such implementations, the electric machine is a first electric machine, and wherein the three stream engine further comprises a second electric machine operatively coupled with the second shaft. In certain exemplary aspects, the first shaft is a high pressure shaft of the three-stream engine and the second shaft is a low pressure shaft of the three-stream engine.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A gas turbine engine comprising: a turbomachine comprising a compressor section, a combustion section, and a turbine section arranged in serial flow order, the turbomachine defining an engine inlet to an inlet duct, a fan duct inlet to a fan duct, and a core inlet to a core duct; a primary fan driven by the turbomachine; and a secondary fan located downstream of the primary fan within the inlet duct, the gas turbine engine defining a thrust to power airflow ratio between 3.5 and 100 and a core bypass ratio between 0.1 and 10, wherein the thrust to power airflow ratio is a ratio of an airflow through a bypass passage over the turbomachine plus an airflow through the fan duct to an airflow through the core duct, and wherein the core bypass ratio is a ratio of the airflow through the fan duct to the airflow through the core duct.

The gas turbine engine of any preceding clause, wherein the thrust to power airflow ratio and the core bypass ratio are defined when the gas turbine engine is operated at a rated speed during standard day operating conditions.

The gas turbine engine of any preceding clause, wherein the thrust to power airflow ratio between 4 and 75.

The gas turbine engine of any preceding clause, wherein the primary fan is an unducted primary fan, and wherein the thrust to power airflow ratio between 30 and 60.

The gas turbine engine of any preceding clause, wherein the thrust to power airflow ratio between 35 and 50.

The gas turbine engine of any preceding clause, wherein the core bypass ratio between 0.3 and 5.

The gas turbine engine of any preceding clause, wherein the gas turbine engine is a turboprop engine, and wherein the thrust to power airflow ratio between 40 and 100.

The gas turbine engine of any preceding clause, wherein the primary fan is a ducted primary fan, and wherein the thrust to power airflow ratio is between 3.5 and 40.

The gas turbine engine of any preceding clause, wherein the gas turbine engine is a direct drive gas turbine engine, and wherein the thrust to power airflow ratio is between 3.5 and 20.

The gas turbine engine of any preceding clause, wherein the gas turbine engine is a geared gas turbine engine, and wherein the thrust to power airflow ratio is between 8 and 40.

The gas turbine engine of any preceding clause, wherein the secondary fan is a single stage secondary fan.

The gas turbine engine of any preceding clause, wherein the secondary fan is a multi-stage secondary fan.

The gas turbine engine of any preceding clause, wherein the multi-stage secondary fan is a two stage secondary fan.

The gas turbine engine of any preceding clause, wherein the primary fan is a ducted primary fan comprising an outer nacelle surrounding the primary fan and defining the bypass passage downstream of the primary fan and over the turbomachine, wherein the gas turbine engine further defines a bypass passage outlet at a downstream end of the outer nacelle, wherein the fan duct defines a fan duct outlet, and wherein the fan duct outlet is downstream of the bypass passage outlet.

The gas turbine engine of any preceding clause, wherein the primary fan is a ducted primary fan comprising an outer nacelle surrounding the primary fan and defining the bypass passage downstream of the primary fan and over the turbomachine, wherein the gas turbine engine further defines a bypass passage outlet at a downstream end of the outer nacelle, wherein the fan duct defines a fan duct outlet, and wherein the fan duct outlet is upstream of the bypass passage outlet.

The gas turbine engine of any preceding clause, wherein the primary fan, the secondary fan, the compressor section, the combustion section, and the turbine section are arranged in serial flow order.

A method of operating a gas turbine engine, comprising: operating the gas turbine engine at a rated speed, wherein operating the gas turbine engine at the rated speed comprises operating the gas turbine engine to define a thrust to power airflow ratio between 3.5 and 100 and a core bypass ratio between 0.1 and 5, wherein the thrust to power airflow ratio is a ratio of an airflow through a bypass passage over a turbomachine of the gas turbine engine plus an airflow through a fan duct to an airflow through a core duct, and wherein the core bypass ratio is a ratio of the airflow through the fan duct to the airflow through the core duct.

The method of any preceding clause, wherein The gas turbine engine of claim 1, wherein the thrust to power airflow ratio between 4 and 75.

The method of any preceding clause, wherein the primary fan is an unducted primary fan, and wherein the thrust to power airflow ratio between 30 and 60.

The method of any preceding clause, wherein the thrust to power airflow ratio between 35 and 50.

The method of any preceding clause, wherein the core bypass ratio between 0.3 and 5.

A gas turbine engine comprising: a turbomachine comprising a compressor section, a combustion section, and a turbine section arranged in serial flow order, the turbomachine defining an engine inlet to an inlet duct, a fan duct inlet to a fan duct, and a core inlet to a core duct; a primary fan driven by the turbomachine; a secondary fan located downstream of the primary fan within the inlet duct, the gas turbine engine defining a thrust to power airflow ratio between 3.5 and 100 and a core bypass ratio between 0.1 and 10, wherein the thrust to power airflow ratio is a ratio of an airflow through a bypass passage over the turbomachine plus an airflow through the fan duct to an airflow through the core duct, and wherein the core bypass ratio is a ratio of the airflow through the fan duct to the airflow through the core duct; and an electric machine embedded in the gas turbine engine, wherein during operation of the gas turbine engine, the gas turbine engine defines a tip speed ratio equal to or greater than 0.2 and less than or equal to 1.0, the tip speed ratio being defined by a tip speed of a rotor of the electric machine to a tip speed of a blade of the secondary fan.

The gas turbine engine of any preceding clause, wherein the gas turbine engine comprises a shaft, and wherein the electric machine and the secondary fan are both operatively coupled with the shaft.

The gas turbine engine of any preceding clause, wherein the gas turbine engine defines a primary fan radius to secondary fan radius equal to or greater than 2.0 and less than or equal to 6.5.

The gas turbine engine of any preceding clause, wherein the gas turbine engine and the electric machine define a secondary fan radius to electric machine radius ratio equal to or greater than 1.33 and less than or equal to 3.8.

The gas turbine engine of any preceding clause, wherein during operation of the gas turbine engine, the electric machine defines a power to voltage ratio equal to or greater than 0.3 and less than or equal to 2.0.

The gas turbine engine of any preceding clause, wherein the gas turbine engine comprises a low pressure shaft, wherein the turbine section comprises a low pressure turbine operatively coupled with the low pressure shaft, wherein the gas turbine engine defines an electric machine length to low pressure turbine length ratio equal to or greater than 0.01 and less than or equal to 3.0.

The gas turbine engine of any preceding clause, wherein the thrust to power airflow ratio and the core bypass ratio are defined when the gas turbine engine is operated at a rated speed during standard day operating conditions.

The gas turbine engine of any preceding clause, wherein the thrust to power airflow ratio is between 4 and 75.

The gas turbine engine of any preceding clause, wherein the primary fan is an unducted primary fan, and wherein the thrust to power airflow ratio is between 30 and 60.

The gas turbine engine of any preceding clause, wherein the thrust to power airflow ratio is between 35 and 50.

A gas turbine engine comprising: a turbomachine comprising a compressor section, a combustion section, and a turbine section arranged in serial flow order, the turbomachine defining an engine inlet to an inlet duct, a fan duct inlet to a fan duct, and a core inlet to a core duct; a primary fan driven by the turbomachine; a secondary fan located downstream of the primary fan within the inlet duct, the gas turbine engine defining a thrust to power airflow ratio between 3.5 and 100 and a core bypass ratio between 0.1 and 10, wherein the thrust to power airflow ratio is a ratio of an airflow through a bypass passage over the turbomachine plus an airflow through the fan duct to an airflow through the core duct, and wherein the core bypass ratio is a ratio of the airflow through the fan duct to the airflow through the core duct; and an electric machine embedded in the gas turbine engine, wherein the gas turbine engine and the electric machine define a secondary fan radius to electric machine radius ratio equal to or greater than 1.33 and less than or equal to 3.8.

The gas turbine engine of any preceding clause 1, wherein during operation of the gas turbine engine, the gas turbine engine defines a tip speed ratio equal to or greater than 0.2 and less than or equal to 1.0, the tip speed ratio being defined by a tip speed of a rotor of the electric machine to a tip speed of a blade of the secondary fan.

The gas turbine engine of any preceding clause, wherein the gas turbine engine comprises a shaft, and wherein the electric machine and the secondary fan are both operatively coupled with the shaft.

The gas turbine engine of any preceding clause, wherein the gas turbine engine defines a primary fan radius to secondary fan radius equal to or greater than 2.0 and less than or equal to 6.5.

The gas turbine engine of any preceding clause, wherein during operation of the gas turbine engine, the electric machine defines a power to voltage ratio equal to or greater than 0.3 and less than or equal to 2.0.

A gas turbine engine comprising: a turbomachine comprising a compressor section, a combustion section, and a turbine section arranged in serial flow order, the turbomachine defining an engine inlet to an inlet duct, a fan duct inlet to a fan duct, and a core inlet to a core duct; a primary fan driven by the turbomachine; a secondary fan located downstream of the primary fan within the inlet duct, the gas turbine engine defining a thrust to power airflow ratio between 3.5 and 100 and a core bypass ratio between 0.1 and 10, wherein the thrust to power airflow ratio is a ratio of an airflow through a bypass passage over the turbomachine plus an airflow through the fan duct to an airflow through the core duct, and wherein the core bypass ratio is a ratio of the airflow through the fan duct to the airflow through the core duct; and an electric machine embedded in the gas turbine engine, wherein the gas turbine engine defines a primary fan radius to secondary fan radius ratio equal to or greater than 2.0 and less than or equal to 6.5.

A gas turbine engine comprising: a turbomachine comprising a compressor section, a combustion section, and a turbine section arranged in serial flow order, the turbine section comprising a low pressure turbine, the turbomachine defining an engine inlet to an inlet duct, a fan duct inlet to a fan duct, and a core inlet to a core duct; a primary fan driven by the turbomachine; a secondary fan located downstream of the primary fan within the inlet duct, the gas turbine engine defining a thrust to power airflow ratio between 3.5 and 100 and a core bypass ratio between 0.1 and 10, wherein the thrust to power airflow ratio is a ratio of an airflow through a bypass passage over the turbomachine plus an airflow through the fan duct to an airflow through the core duct, and wherein the core bypass ratio is a ratio of the airflow through the fan duct to the airflow through the core duct; and an electric machine embedded in the gas turbine engine, wherein the gas turbine engine defines an electric machine length to low pressure turbine length ratio equal to or greater than 0.01 and less than or equal to 3.0.

A gas turbine engine comprising: a turbomachine comprising a compressor section, a combustion section, and a turbine section arranged in serial flow order, the turbine section comprising a low pressure turbine, the turbomachine defining an engine inlet to an inlet duct, a fan duct inlet to a fan duct, and a core inlet to a core duct; a primary fan driven by the turbomachine; a secondary fan located downstream of the primary fan within the inlet duct, the gas turbine engine defining a thrust to power airflow ratio between 3.5 and 100 and a core bypass ratio between 0.1 and 10, wherein the thrust to power airflow ratio is a ratio of an airflow through a bypass passage over the turbomachine plus an airflow through the fan duct to an airflow through the core duct, and wherein the core bypass ratio is a ratio of the airflow through the fan duct to the airflow through the core duct; and an electric machine embedded in the gas turbine engine, wherein the gas turbine engine defines an electric machine tip radius to low pressure turbine last stage hub radius ratio as being equal to or greater than 0.1 and less than or equal to 1.0. A gas turbine engine comprising: a turbomachine comprising a compressor section, a combustion section, and a turbine section arranged in serial flow order, the turbine section comprising a high pressure turbine, the turbomachine defining an engine inlet to an inlet duct, a fan duct inlet to a fan duct, and a core inlet to a core duct; a primary fan driven by the turbomachine; a secondary fan located downstream of the primary fan within the inlet duct, the gas turbine engine defining a thrust to power airflow ratio between 3.5 and 100 and a core bypass ratio between 0.1 and 10, wherein the thrust to power airflow ratio is a ratio of an airflow through a bypass passage over the turbomachine plus an airflow through the fan duct to an airflow through the core duct, and wherein the core bypass ratio is a ratio of the airflow through the fan duct to the airflow through the core duct; and an electric machine embedded in the gas turbine engine, wherein during operation of the gas turbine engine, the gas turbine engine defines a secondary fan tip speed to high pressure turbine tip speed ratio equal to or greater than 0.7 and less than or equal to 1.5.

A gas turbine engine comprising: a turbomachine comprising a compressor section, a combustion section, and a turbine section arranged in serial flow order, the turbomachine defining an engine inlet to an inlet duct, a fan duct inlet to a fan duct, and a core inlet to a core duct; a primary fan driven by the turbomachine; a secondary fan located downstream of the primary fan within the inlet duct, the secondary fan comprising a secondary fan blade having a hub, the gas turbine engine defining a thrust to power airflow ratio between 3.5 and 100 and a core bypass ratio between 0.1 and 10, wherein the thrust to power airflow ratio is a ratio of an airflow through a bypass passage over the turbomachine plus an airflow through the fan duct to an airflow through the core duct, and wherein the core bypass ratio is a ratio of the airflow through the fan duct to the airflow through the core duct; and an electric machine embedded in the gas turbine engine, wherein the gas turbine engine defines a secondary fan hub radius to electric machine radius ratio equal to or greater than 0.1 and less than or equal to 1.0.

A method, comprising: operating a three-stream gas turbine engine having an electric machine embedded therein to define a tip speed ratio as being equal to or greater than 0.2 and less than or equal to 1.0, the tip speed ratio being defined by a tip speed of a rotor of the electric machine to a tip speed of a mid-fan blade of a mid-fan, the electric machine and the mid-fan both being operatively coupled with a shaft of the three-stream gas turbine engine.

The method of any preceding clause, wherein the three-stream gas turbine engine has a primary fan having a plurality of fan blades, and wherein the three-stream gas turbine engine defines a primary fan radius to mid-fan radius as being equal to or greater than 2.0 and less than or equal to 6.5, the primary fan radius to mid-fan radius ratio being defined by a radius spanning between a longitudinal axis defined by the three-stream gas turbine engine and a leading edge tip of one of the fan blades to a radius spanning between the longitudinal axis and a leading edge tip of one of the mid-fan blades.

The method of any preceding clause, wherein the three-stream gas turbine engine and the electric machine define a mid-fan radius to electric machine radius ratio as being equal to or greater than 1.33 and less than or equal to 3.8, the mid-fan radius to electric machine radius ratio being defined by a radius spanning between a longitudinal axis defined by the three-stream gas turbine engine and a leading edge tip of one of the mid-fan blades of the mid-fan to a radius spanning between the longitudinal axis and an outermost point of the rotor of the electric machine.

The method of any preceding clause, wherein operating the three-stream gas turbine engine further comprises operating the three-stream gas turbine engine so as to define a power to voltage ratio of the electric machine as being equal to or greater than 0.3 and less than or equal to 2.0, the power to voltage ratio being defined by an electrical power output by the electric machine in kilowatts to a voltage level of the electric machine in volts of direct current.

The method of any preceding clause, wherein operating the three-stream gas turbine engine further comprises operating the three-stream gas turbine engine so as to define a power to voltage ratio of the electric machine as being equal to or greater than 0.35 and less than or equal to 0.5, the power to voltage ratio being defined by an electrical power output by the electric machine in kilowatts to a voltage level of the electric machine in volts of direct current.

The method of any preceding clause, wherein operating the three-stream gas turbine engine further comprises operating the three-stream gas turbine engine so as to define a power to voltage ratio of the electric machine as being equal to or greater than 0.4 and less than or equal to 0.5, the power to voltage ratio being defined by an electrical power output by the electric machine in kilowatts to a voltage level of the electric machine in volts of direct current.

The method of any preceding clause, wherein the electrical power output of the electric machine ranges from 100 kilowatts to 3 megawatts and the voltage level of the electric machine ranges from 270 volts of direct current to 3,000 volts of direct current.

The method of any preceding clause, wherein operating the three-stream gas turbine engine further comprises operating the three-stream gas turbine engine so as to define a power to voltage ratio of the electric machine as being equal to or greater than 0.35 and less than or equal to 0.5, the power to voltage ratio being defined by an electrical power output by the electric machine in kilowatts to a voltage level of the electric machine in volts of direct current.

The method of any preceding clause, wherein the electrical power output of the electric machine ranges from 100 kilowatts to 3 megawatts and the voltage level of the electric machine ranges from 270 volts of direct current to 3,000 volts of direct current.

The method of any preceding clause, wherein in operating the three-stream gas turbine engine, the rotor of the electric machine has a rotor tip speed being equal to or greater than 50 meters per second and less than or equal to 200 meters per second.

The method of any preceding clause, wherein in operating the three-stream gas turbine engine, the rotor of the electric machine has a rotor tip speed being equal to or greater than 140 meters per second and less than or equal to 190 meters per second.

The method of any preceding clause, wherein operating the three-stream gas turbine engine further comprises operating the three-stream gas turbine engine so as to define a power to AC rated current ratio of the electric machine as being equal to or greater than 0.2 and less than or equal to 2.5, the power to AC rated current ratio being defined by an electrical power output by the electric machine in kilowatts to an AC rated current of the electric machine in ampere root mean square.

The method of any preceding clause, wherein operating the three-stream gas turbine engine further comprises operating the three-stream gas turbine engine so as to define a power to AC rated current ratio of the electric machine as being equal to or greater than 0.2 and less than or equal to 1.2, the power to AC rated current ratio being defined by an electrical power output by the electric machine in kilowatts to an AC rated current of the electric machine in ampere root mean square.

The method of any preceding clause, wherein operating the three-stream gas turbine engine further comprises operating the three-stream gas turbine engine so as to define a power to AC rated current ratio of the electric machine as being equal to or greater than 1.8 and less than or equal to 2.5, the power to AC rated current ratio being defined by an electrical power output by the electric machine in kilowatts to an AC rated current of the electric machine in ampere root mean square.

The method of any preceding clause, wherein operating the three-stream gas turbine engine further comprises operating the three-stream gas turbine engine so as to define a power to AC rated current ratio of the electric machine as being equal to or greater than 1.2 and less than or equal to 1.8, the power to AC rated current ratio being defined by an electrical power output by the electric machine in kilowatts to an AC rated current of the electric machine in ampere root mean square.

The method of any preceding clause, wherein operating the three-stream gas turbine engine further comprises operating the three-stream gas turbine engine so as to define a power to AC rated current ratio of the electric machine as being equal to or greater than 0.6 and less than or equal to 2.0, the power to AC rated current ratio being defined by an electrical power output by the electric machine in kilowatts to an AC rated current of the electric machine in ampere root mean square.

The method of any preceding clause, wherein operating the three-stream gas turbine engine further comprises operating the three-stream gas turbine engine so as to define a torque at maximum speed to AC rated current ratio as being equal to or greater than as being equal to or greater than 0.1 and less than or equal to 6.0.

A three-stream gas turbine engine, comprising: a shaft; a primary fan operatively coupled with the shaft; a mid-fan positioned downstream of the primary fan and operatively coupled with the shaft, the mid-fan having mid-fan blades; an electric machine operatively coupled with the shaft, the electric machine having a stator and a rotor, the rotor rotatable with the shaft, and wherein, when operated, the three-stream gas turbine engine defines a tip speed ratio as being equal to or greater than 0.2 and less than or equal to 1.0, the tip speed ratio being defined by a tip speed of the rotor of the electric machine to a tip speed of one of the mid-fan blades.

The three-stream gas turbine engine of any preceding clause, wherein the three-stream gas turbine engine defines a mid-fan radius to electric machine radius ratio as being equal to or greater than 1.33 and less than or equal to 3.8, the mid-fan radius to electric machine radius ratio being defined by a radius spanning between a longitudinal axis defined by the three-stream gas turbine engine and a leading edge tip of one of the mid-fan blades of the mid-fan to a radius spanning between the longitudinal axis and an outermost point of the rotor of the electric machine.

The three-stream gas turbine engine of any preceding clause, wherein, when operated, the three-stream gas turbine engine defines a power to voltage ratio of the electric machine as being equal to or greater than 0.3 and less than or equal to 2.0, the power to voltage ratio being defined by an electrical power output by the electric machine in kilowatts to a voltage level of the electric machine in volts of direct current, and wherein the electrical power output of the electric machine ranges from 100 kilowatts to 3 megawatts and the voltage level of the electric machine ranges from 270 volts of direct current to 3,000 volts of direct current.

The three-stream gas turbine engine of any preceding clause, wherein, when the three-stream gas turbine engine is operated, the rotor of the electric machine has a rotor tip speed being equal to or greater than 50 meters per second and less than or equal to 200 meters per second.

The three-stream gas turbine engine of any preceding clause, wherein the three-stream gas turbine engine further comprises: a primary fan positioned upstream of the mid-fan and operatively coupled with the shaft; an engine core; a core cowl surrounding the engine core; a core duct being defined between the engine core and the core cowl; a fan cowl surrounding the core cowl; a fan duct being defined between the core cowl and the fan cowl; an inlet duct in flow communication with the core duct and the fan duct, the inlet duct being defined between the engine core and the fan cowl, the mid-fan being positioned within the inlet duct.

A three-stream gas turbine engine, comprising: a shaft; a primary fan operatively coupled with the shaft; a mid-fan positioned downstream of the primary fan and operatively coupled with the shaft, the mid-fan having mid-fan blades; an electric machine operatively coupled with the shaft, the electric machine having a rotor rotatable with the shaft, and wherein the three-stream gas turbine engine defines a mid-fan radius to electric machine radius ratio as being equal to or greater than 1.33 and less than or equal to 3.8, the mid-fan radius to electric machine radius ratio being defined by a radius spanning between a longitudinal axis defined by the three-stream gas turbine engine and a leading edge tip of one of the mid-fan blades of the mid-fan to a radius spanning between the longitudinal axis and an outermost point of the rotor of the electric machine.

The three-stream gas turbine engine of any preceding clause, wherein the shaft is a low pressure shaft.

The three-stream gas turbine engine of any preceding clause, wherein the three-stream gas turbine engine defines the mid-fan radius to electric machine radius ratio as being equal to or greater than 2.5 and less than or equal to 3.3.

The three-stream gas turbine engine of any preceding clause, wherein the three-stream gas turbine engine defines the mid-fan radius to electric machine radius ratio as being equal to or greater than 2.9 and less than or equal to 3.2.

The three-stream gas turbine engine of any preceding clause, wherein the three-stream gas turbine engine defines an axial direction, and wherein the electric machine is positioned aft of the mid-fan and at least partially overlapping with or aft of a low pressure turbine of the three-stream gas turbine engine along the axial direction.

A three-stream gas turbine engine, comprising: a low pressure shaft; a high pressure shaft; a primary fan operatively coupled with the low pressure shaft, the primary fan having primary fan blades; a mid-fan positioned downstream of the primary fan and operatively coupled with the low pressure shaft, the mid-fan having mid-fan blades; an electric machine operatively coupled with the low pressure shaft or the high pressure shaft, and wherein the three-stream gas turbine engine defines a primary fan radius to mid-fan radius ratio as being equal to or greater than 2.0 and less than or equal to 6.5, the primary fan radius to mid-fan radius ratio being defined by a radius spanning between a longitudinal axis defined by the three-stream gas turbine engine and a leading edge tip of one of the blades of the primary fan to a radius spanning between the longitudinal axis and a leading edge tip of one of the mid-fan blades of the mid-fan.

The three-stream gas turbine engine of any preceding clause, wherein the electric machine is operatively coupled with the low pressure shaft.

The three-stream gas turbine engine of any preceding clause, wherein the electric machine is operatively coupled with the high pressure shaft.

The three-stream gas turbine engine of any preceding clause, wherein the primary fan is an unducted fan.

The three-stream gas turbine engine of any preceding clause, wherein the three-stream gas turbine engine defines the primary fan radius to mid-fan radius ratio as being equal to or greater than 3.0 and less than or equal to 6.5.

The three-stream gas turbine engine of any preceding clause, wherein the three-stream gas turbine engine and the electric machine define a mid-fan radius to electric machine radius ratio as being equal to or greater than 1.33 and less than or equal to 3.8, the mid-fan radius to electric machine radius ratio being defined by a radius spanning between the longitudinal axis and a leading edge tip of one of the mid-fan blades of the mid-fan to a radius spanning between the longitudinal axis and an outermost point of a rotor of the electric machine.

The three-stream gas turbine engine of any preceding clause, wherein the three-stream gas turbine engine and the electric machine define a mid-fan radius to electric machine radius ratio as being equal to or greater than 2.9 and less than or equal to 3.2, the mid-fan radius to electric machine radius ratio being defined by a radius spanning between the longitudinal axis and a leading edge tip of one of the mid-fan blades of the mid-fan to a radius spanning between the longitudinal axis and an outermost point of a rotor of the electric machine.

The three-stream gas turbine engine of any preceding clause, further comprising: a low pressure turbine operatively coupled with the low pressure shaft, and wherein the three-stream gas turbine engine defines an axial direction, and wherein the three-stream gas turbine engine defines an electric machine length to low pressure turbine length ratio as being equal to or greater than 0.01 and less than or equal to 3.0, the electric machine length to low pressure turbine length ratio being defined by a length of the low pressure turbine to a length of the electric machine, the length of the electric machine spanning between a leading edge and a trailing edge of a rotor of the electric machine along the axial direction, the length of the low pressure turbine spanning between a leading edge of a hub of a first stage turbine blade of the low pressure turbine to a trailing edge of a hub of a last stage turbine blade of the low pressure turbine.

The three-stream gas turbine engine of any preceding clause, further comprising: a low pressure turbine operatively coupled with the low pressure shaft, and wherein the three-stream gas turbine engine defines an axial direction, and wherein the three-stream gas turbine engine defines an electric machine tip radius to low pressure turbine last stage hub radius ratio as being equal to or greater than 0.1 and less than or equal to 1.0, the electric machine tip radius to low pressure turbine last stage hub radius ratio being defined by a radius spanning between a longitudinal axis defined by the three-stream gas turbine engine and an outermost point of a rotor of the electric machine to a radius spanning between the longitudinal axis and an outermost point of a hub of a last stage turbine blade of the low pressure turbine.

The three-stream gas turbine engine of any preceding clause, further comprising: an engine core; a core cowl surrounding the engine core; a core duct being defined between the engine core and the core cowl; a fan cowl surrounding the core cowl; a fan duct being defined between the core cowl and the fan cowl; an inlet duct in flow communication with the core duct and the fan duct, the inlet duct being defined between the engine core and the fan cowl, the mid-fan being positioned within the inlet duct, the electric machine being positioned within the engine core.

A three-stream gas turbine engine defining an axial direction, the three-stream gas turbine engine comprising: a shaft; a primary fan operatively coupled with the shaft; a mid-fan positioned downstream of the primary fan and operatively coupled with the shaft, the mid-fan having mid-fan blades; a low pressure turbine operatively coupled with the shaft; an electric machine operatively coupled with the shaft, the electric machine having a stator and a rotor, the rotor rotatable with the shaft, and wherein the three-stream gas turbine engine defines an electric machine length to low pressure turbine length ratio as being equal to or greater than 0.01 and less than or equal to 3.0, the electric machine length to low pressure turbine length ratio being defined by a length of the low pressure turbine to a length of the electric machine spanning between a leading edge and a trailing edge of the rotor of the electric machine along the axial direction, the length of the low pressure turbine spanning between a leading edge of a hub of a first stage turbine blade of the low pressure turbine to a trailing edge of a hub of a last stage turbine blade of the low pressure turbine.

The three-stream gas turbine engine of any preceding clause, wherein the three-stream gas turbine engine has a primary fan having a plurality of fan blades, and wherein the three-stream gas turbine engine defines a primary fan radius to mid-fan radius as being equal to or greater than 2.0 and less than or equal to 6.5, the primary fan radius to mid-fan radius ratio being defined by a radius spanning between a longitudinal axis defined by the three-stream gas turbine engine and a leading edge tip of one of the fan blades to a radius spanning between the longitudinal axis and a leading edge tip of one of the mid-fan blades.

The three-stream gas turbine engine of any preceding clause, wherein the three-stream gas turbine engine further defines an electric machine tip radius to low pressure turbine last stage hub radius ratio as being equal to or greater than 0.1 and less than or equal to 1.0, the electric machine tip radius to low pressure turbine last stage hub radius ratio being defined by a radius spanning between a longitudinal axis defined by the three-stream engine and an outermost point of the rotor of the electric machine to a radius spanning between the longitudinal axis and an outermost point of a hub of a last stage turbine blade of the low pressure turbine.

The three-stream gas turbine engine of any preceding clause, wherein, when operated, the three-stream gas turbine engine defines an electric machine power to low pressure turbine power ratio as being equal to or greater than 0.01 and less than or equal to 1.0 at flight idle.

The three-stream gas turbine engine of any preceding clause, wherein, when operated, the three-stream gas turbine engine defines an electric machine power to low pressure turbine power ratio as being equal to or greater than 0.01 and less than or equal to 0.2 at flight idle.

The three-stream gas turbine engine of any preceding clause, wherein, when operated, the three-stream gas turbine engine defines an electric machine power to low pressure turbine power ratio as being equal to or greater than 0.1 and less than or equal to 0.45 at flight idle.

The three-stream gas turbine engine of any preceding clause, wherein, when operated, the three-stream gas turbine engine defines an electric machine power to low pressure turbine power ratio as being equal to or greater than 0.45 and less than or equal to 1.0 at flight idle.

The three-stream gas turbine engine of any preceding clause, wherein, when operated, the three-stream gas turbine engine defines a power to voltage ratio of the electric machine as being equal to or greater than 0.3 and less than or equal to 2.0, the power to voltage ratio being defined by an electrical power output by the electric machine in kilowatts to a voltage level of the electric machine in volts of direct current, and wherein the electrical power output of the electric machine ranges from 100 kilowatts to 3 megawatts and the voltage level of the electric machine ranges from 270 volts of direct current to 3,000 volts of direct current.

The three-stream gas turbine engine of any preceding clause, further comprising: a primary fan positioned upstream of the mid-fan and operatively coupled with the shaft; an engine core; a core cowl surrounding the engine core; a core duct being defined between the engine core and the core cowl; a fan cowl surrounding the core cowl; a fan duct being defined between the core cowl and the fan cowl; an inlet duct in flow communication with the core duct and the fan duct, the inlet duct being defined between the engine core and the fan cowl, the mid-fan being positioned within the inlet duct.

The three-stream gas turbine engine of any preceding clause, wherein the three-stream engine defines a radial direction, the three-stream engine further comprising: an engine core; a core cowl surrounding the engine core; a core duct being defined between the engine core and the core cowl; a fan cowl surrounding the core cowl; a fan duct being defined between the core cowl and the fan cowl; an inlet duct in flow communication with the core duct and the fan duct, the inlet duct being defined between the engine core and the fan cowl, the electric machine being directly mechanically coupled with the shaft and positioned inward of the core duct along the radial direction.

The three-stream gas turbine engine of any preceding clause, wherein the three-stream gas turbine engine defines the electric machine length to low pressure turbine length ratio as being equal to or greater than 0.01 and less than or equal to 0.5.

The three-stream gas turbine engine of any preceding clause, wherein the three-stream gas turbine engine defines the electric machine length to low pressure turbine length ratio as being equal to or greater than 0.3 and less than or equal to 1.0.

The three-stream gas turbine engine of any preceding clause, wherein the three-stream gas turbine engine defines the electric machine length to low pressure turbine length ratio as being equal to or greater than 1.0 and less than or equal to 3.0.

The three-stream gas turbine engine of any preceding clause, wherein the three-stream gas turbine engine defines the electric machine length to low pressure turbine length ratio as being equal to or greater than 2.0 and less than or equal to 3.0.

A three-stream gas turbine engine, comprising: a shaft; a primary fan operatively coupled with the shaft; a mid-fan positioned downstream of the primary fan and operatively coupled with the shaft, the mid-fan having mid-fan blades; a low pressure turbine; an electric machine operatively coupled with the shaft, the electric machine having a stator and a rotor, the rotor rotatable with the shaft, and wherein the three-stream gas turbine engine further defines an electric machine tip radius to low pressure turbine last stage hub radius ratio as being equal to or greater than 0.1 and less than or equal to 1.0.

The three-stream gas turbine engine of any preceding clause, wherein the three-stream gas turbine engine defines the electric machine tip radius to low pressure turbine last stage hub radius ratio as being equal to or greater than 0.1 and less than or equal to 0.5.

The three-stream gas turbine engine of any preceding clause, wherein the three-stream gas turbine engine defines the electric machine tip radius to low pressure turbine last stage hub radius ratio as being equal to or greater than 0.4 and less than or equal to 1.0.

The three-stream gas turbine engine of any preceding clause, wherein the three-stream gas turbine engine defines the electric machine tip radius to low pressure turbine last stage hub radius ratio as being equal to or greater than 0.7 and less than or equal to 1.0.

The three-stream gas turbine engine of any preceding clause, wherein the three-stream gas turbine engine defines an axial direction, and wherein the three-stream gas turbine engine defines an electric machine length to low pressure turbine length ratio as being equal to or greater than 0.01 and less than or equal to 3.0, the electric machine length to low pressure turbine length ratio being defined by a length of the low pressure turbine to a length of the electric machine spanning between a leading edge and a trailing edge of the rotor of the electric machine along the axial direction, the length of the low pressure turbine spanning between a leading edge of a hub of a first stage turbine blade of the low pressure turbine to a trailing edge of a hub of a last stage turbine blade of the low pressure turbine.

The three-stream gas turbine engine of any preceding clause, wherein, when operated, the three-stream gas turbine engine defines an electric machine power to low pressure turbine power ratio as being equal to or greater than 0.01 and less than or equal to 1.0 at flight idle.

The three-stream gas turbine engine of any preceding clause, wherein the three-stream gas turbine engine defines an axial direction, and wherein the electric machine is positioned aft of the mid-fan and at least partially overlapping with or aft of the low pressure turbine along the axial direction.

The three-stream gas turbine engine of any preceding clause, wherein the primary fan is an unducted fan.

The three-stream gas turbine engine of any preceding clause, further comprising: an engine core; a core cowl surrounding the engine core; a core duct being defined between the engine core and the core cowl; a fan cowl surrounding the core cowl; a fan duct being defined between the core cowl and the fan cowl; an inlet duct in flow communication with the core duct and the fan duct, the inlet duct being defined between the engine core and the fan cowl, the electric machine being directly mechanically coupled with the shaft and embedded within the engine core.

The three-stream gas turbine engine of any preceding clause, wherein the three-stream gas turbine engine defines a mid-fan radius to electric machine radius ratio as being equal to or greater than 2.5 and less than or equal to 3.3, the mid-fan radius to electric machine radius ratio being defined by a radius spanning between a longitudinal axis defined by the three-stream gas turbine engine and a leading edge tip of one of the mid-fan blades of the mid-fan to a radius spanning between the longitudinal axis and an outermost point of the rotor of the electric machine.

The three-stream gas turbine engine of any preceding clause, wherein the primary fan has a plurality of fan blades, and wherein the three-stream gas turbine engine defines a primary fan radius to mid-fan radius as being equal to or greater than 2.0 and less than or equal to 6.5, the primary fan radius to mid-fan radius ratio being defined by a radius spanning between a longitudinal axis defined by the three-stream gas turbine engine and a leading edge tip of one of the fan blades to a radius spanning between the longitudinal axis and a leading edge tip of one of the mid-fan blades.

A method, comprising: operating a three-stream gas turbine engine having an electric machine embedded therein to define a mid-fan tip speed to low pressure turbine tip speed ratio as being equal to or greater than 0.7 and less than or equal to 1.5, the mid-fan tip speed to low pressure turbine tip speed ratio being defined by a tip speed of a mid-fan blade of a mid-fan to a tip speed of a last stage turbine blade of a low pressure turbine, the mid-fan being operatively coupled with a shaft of the three-stream gas turbine engine and the low pressure turbine being operatively coupled with the shaft.

The method of any preceding clause, wherein operating the three-stream gas turbine engine further comprises operating the three-stream gas turbine engine so as to define the mid-fan tip speed to low pressure turbine tip speed ratio as being equal to or greater than 0.8 and less than or equal to 1.2.

The method of any preceding clause, wherein operating the three-stream gas turbine engine further comprises operating the three-stream gas turbine engine so as to define a low pressure turbine tip speed to electric machine tip speed ratio as being equal to or greater than 0.1 and less than or equal to 1.0.

The method of any preceding clause, wherein operating the three-stream gas turbine engine further comprises operating the three-stream gas turbine engine so as to define a low pressure turbine tip speed to electric machine tip speed ratio as being equal to or greater than 0.1 and less than or equal to 0.3.

The method of any preceding clause, wherein operating the three-stream gas turbine engine further comprises operating the three-stream gas turbine engine so as to define a low pressure turbine tip speed to electric machine tip speed ratio as being equal to or greater than 0.5 and less than or equal to 0.9.

The method of any preceding clause, wherein operating the three-stream gas turbine engine further comprises operating the three-stream gas turbine engine so as to define a power to voltage ratio of the electric machine as being equal to or greater than 0.3 and less than or equal to 2.0, the power to voltage ratio being defined by an electrical power output by the electric machine in kilowatts to a voltage level of the electric machine in volts of direct current.

The method of any preceding clause, wherein operating the three-stream gas turbine engine further comprises operating the three-stream gas turbine engine so as to define a power to AC rated current ratio of the electric machine as being equal to or greater than 0.2 and less than or equal to 2.5, the power to AC rated current ratio being defined by an electrical power output by the electric machine in kilowatts to an AC rated current of the electric machine in ampere root mean square.

A method, comprising: operating a three-stream gas turbine engine having an electric machine embedded therein to define a mid-fan tip speed to high pressure turbine tip speed ratio as being equal to or greater than 0.7 and less than or equal to 1.5, the mid-fan tip speed to high pressure turbine tip speed ratio being defined by a tip speed of a mid-fan blade of a mid-fan to a tip speed of a last stage turbine blade of a high pressure turbine, the electric machine and the high pressure turbine being operatively coupled with a first shaft of the three-stream gas turbine engine and the mid-fan being operatively coupled with a second shaft of the three-stream gas turbine engine.

The method of any preceding clause, wherein operating the three-stream gas turbine engine further comprises operating the three-stream gas turbine engine so as to define the mid-fan tip speed to high pressure turbine tip speed ratio as being equal to or greater than 0.8 and less than or equal to 1.2.

The method of any preceding clause, wherein operating the three-stream gas turbine engine further comprises operating the three-stream gas turbine engine so as to define the mid-fan tip speed to high pressure turbine tip speed ratio as being equal to or greater than 0.9 and less than or equal to 1.1.

The method of any preceding clause, wherein the three-stream gas turbine engine has a primary fan having a plurality of fan blades, and wherein the three-stream gas turbine engine defines a primary fan radius to mid-fan radius as being equal to or greater than 2.0 and less than or equal to 6.5, the primary fan radius to mid-fan radius ratio being defined by a radius spanning between a longitudinal axis defined by the three-stream gas turbine engine and a leading edge tip of one of the fan blades to a radius spanning between the longitudinal axis and a leading edge tip of one of the mid-fan blades.

The method of any preceding clause, wherein the first shaft is a high pressure shaft and the second shaft is a low pressure shaft.

The method of any preceding clause, wherein operating the three-stream gas turbine engine further comprises operating the three-stream gas turbine engine so as to define a high pressure turbine tip speed to electric machine tip speed ratio as being equal to or greater than 0.1 and less than or equal to 1.0, the high pressure turbine tip speed to electric machine tip speed ratio being defined by a tip speed of a first stage turbine blade of the high pressure turbine to a tip speed of a rotor of the electric machine.

The method of any preceding clause, wherein operating the three-stream gas turbine engine further comprises operating the three-stream gas turbine engine so as to define a power to voltage ratio as being equal to or greater than 0.3 and less than or equal to 2.0, the power to voltage ratio being defined by an electrical power output by the electric machine in kilowatts to a voltage level of the electric machine in volts of direct current.

The method of any preceding clause, wherein operating the three-stream gas turbine engine further comprises operating the three-stream gas turbine engine so as to define a power to voltage ratio as being equal to or greater than 0.3 and less than or equal to 1.1, the power to voltage ratio being defined by an electrical power output by the electric machine in kilowatts to a voltage level of the electric machine in volts of direct current.

The method of any preceding clause, wherein operating the three-stream gas turbine engine further comprises operating the three-stream gas turbine engine so as to define a power to voltage ratio as being equal to or greater than 0.3 and less than or equal to 0.6, the power to voltage ratio being defined by an electrical power output by the electric machine in kilowatts to a voltage level of the electric machine in volts of direct current.

The method of any preceding clause, wherein operating the three-stream gas turbine engine further comprises operating the three-stream gas turbine engine so as to define a power to voltage ratio as being equal to or greater than 0.6 and less than or equal to 1.1, the power to voltage ratio being defined by an electrical power output by the electric machine in kilowatts to a voltage level of the electric machine in volts of direct current.

The method of any preceding clause, wherein operating the three-stream gas turbine engine further comprises operating the three-stream gas turbine engine so as to define a power to voltage ratio as being equal to or greater than 1.0 and less than or equal to 2.0, the power to voltage ratio being defined by an electrical power output by the electric machine in kilowatts to a voltage level of the electric machine in volts of direct current.

The method of any preceding clause, wherein the electrical power output by the electric machine ranges from 100 kilowatts to 1 megawatt and the voltage level of the electric machine ranges from 270 volts of direct current to 3,000 volts of direct current.

The method of any preceding clause, wherein the electric machine is a first electric machine, and wherein the three stream engine further comprises a second electric machine operatively coupled with the second shaft, and wherein operating the three-stream gas turbine engine further comprises operating the three-stream gas turbine engine so as to define a second electric machine power to first electric machine power ratio as being equal to or greater than 0.1 and less than or equal to 1.5.

The method of any preceding clause, wherein the electric machine is a first electric machine, and wherein the three stream engine further comprises a second electric machine operatively coupled with the second shaft, and wherein operating the three-stream gas turbine engine further comprises operating the three-stream gas turbine engine so as to define a second electric machine power to first electric machine power ratio as being equal to or greater than 0.5 and less than or equal to 1.2.

The method of any preceding clause, wherein the electric machine is a first electric machine, and wherein the three stream engine further comprises a second electric machine operatively coupled with the second shaft, and wherein operating the three-stream gas turbine engine further comprises operating the three-stream gas turbine engine so as to define a second electric machine power to first electric machine power ratio as being equal to or greater than 0.5 and less than or equal to 0.75.

The method of any preceding clause, wherein the electric machine is a first electric machine, and wherein the three stream engine further comprises a second electric machine operatively coupled with the second shaft, and wherein operating the three-stream gas turbine engine further comprises operating the three-stream gas turbine engine so as to define a second electric machine power to first electric machine power ratio as being equal to or greater than 0.75 and less than or equal to 1.2.

The method of any preceding clause, wherein the electric machine is a first electric machine, and wherein the three stream engine further comprises a second electric machine operatively coupled with the second shaft, and wherein operating the three-stream gas turbine engine further comprises operating the three-stream gas turbine engine so as to define a second electric machine power to first electric machine power ratio as being equal to or greater than 0.6 and less than or equal to 0.9.

The method of any preceding clause, wherein operating the three-stream gas turbine engine further comprises operating the three-stream gas turbine engine so as to define a mid-fan hub radius to electric machine radius ratio as being equal to or greater than 0.1 and less than or equal to 1.0, the mid-fan hub radius to electric machine radius ratio being defined by a radius spanning between a longitudinal axis defined by the three-stream gas turbine engine and an outermost point taken at a trailing edge of a hub of a mid-fan blade of the mid-fan to a radius spanning between the longitudinal axis and an outermost point of the rotor or a stator of the electric machine depending on which one is positioned outward of the other along a radial direction defined by the three-stream gas turbine engine.

The method of any preceding clause, wherein operating the three-stream gas turbine engine further comprises operating the three-stream gas turbine engine so as to define a high pressure compressor hub radius to electric machine radius ratio as being equal to or greater than 0.1 and less than or equal to 1.0, the high pressure compressor hub radius to electric machine radius ratio being defined by a radius spanning between a longitudinal axis defined by the three-stream gas turbine engine and an outermost point taken at a leading edge of a hub of a first stage blade of a high pressure compressor operatively coupled with the first shaft to a radius spanning between the longitudinal axis and an outermost point of a rotor or a stator of the electric machine depending on which one is positioned outward of the other along a radial direction defined by the three-stream gas turbine engine.

The method of any preceding clause, wherein operating the three-stream gas turbine engine further comprises operating the three-stream gas turbine engine so as to define a high pressure turbine length to electric machine length ratio as being equal to or greater than 0.1 and less than or equal to 1.5, the high pressure turbine length to electric machine length ratio being defined by a length of the high pressure turbine operatively coupled with the first shaft to a length of the electric machine spanning between a leading edge and a trailing edge of the rotor of the electric machine along an axial direction defined by the three-stream gas turbine engine.

The method of any preceding clause, wherein operating the three-stream gas turbine engine further comprises operating the three-stream gas turbine engine so as to define a high pressure turbine length to electric machine length ratio as being equal to or greater than 0.1 and less than or equal to 0.5.

The method of any preceding clause, wherein operating the three-stream gas turbine engine further comprises operating the three-stream gas turbine engine so as to define a high pressure turbine length to electric machine length ratio as being equal to or greater than 0.5 and less than or equal to 0.85.

The method of any preceding clause, wherein operating the three-stream gas turbine engine further comprises operating the three-stream gas turbine engine so as to define a high pressure turbine length to electric machine length ratio as being equal to or greater than 0.85 and less than or equal to 1.5.

A three-stream gas turbine engine, comprising: a low pressure shaft; a primary fan operatively coupled with the low pressure shaft; a mid-fan positioned downstream of the primary fan and operatively coupled with the low pressure shaft, the mid-fan having mid-fan blades; a high pressure shaft; an electric machine operatively coupled with the high pressure shaft, the electric machine having a rotor rotatable with the high pressure shaft, and wherein the three-stream engine defines a mid-fan hub radius to electric machine radius ratio as being equal to or greater than 0.1 and less than or equal to 1.0, the mid-fan hub radius to electric machine radius ratio being defined by a radius spanning between a longitudinal axis defined by the three-stream gas turbine engine and an outermost point taken at a trailing edge of a hub of the mid-fan blade of the mid-fan to a radius spanning between the longitudinal axis and an outermost point of the rotor or a stator of the electric machine depending on which one is positioned outward of the other along a radial direction defined by the three-stream gas turbine engine.

The three-stream gas turbine engine of any preceding clause, wherein the three-stream engine defines a mid-fan hub radius to electric machine radius ratio as being equal to or greater than 0.1 and less than or equal to 0.4.

The three-stream gas turbine engine of any preceding clause, wherein the three-stream engine defines a mid-fan hub radius to electric machine radius ratio as being equal to or greater than 0.4 and less than or equal to 0.8.

The three-stream gas turbine engine of any preceding clause, wherein the three-stream engine defines a mid-fan hub radius to electric machine radius ratio as being equal to or greater than 0.6 and less than or equal to 1.0.

The three-stream gas turbine engine of any preceding clause, further comprising: a high pressure turbine having last stage turbine blades, and wherein, when operated, the three-stream gas turbine engine defines a mid-fan tip speed to high pressure turbine tip speed ratio as being equal to or greater than 0.7 and less than or equal to 1.5, the mid-fan tip speed to high pressure turbine tip speed ratio being defined by a tip speed of one of the mid-fan blades to a tip speed of one of the last stage turbine blades.

The three-stream gas turbine engine of any preceding clause, further comprising: a high pressure turbine operatively coupled with the first shaft and having first stage turbine blades, and wherein the three-stream gas turbine engine defines a longitudinal axis and a radial direction, and wherein the three-stream gas turbine engine defines a high pressure compressor hub radius to electric machine radius ratio as being equal to or greater than 0.1 and less than or equal to 1.0, the high pressure compressor hub radius to electric machine radius ratio being defined by a radius spanning between the longitudinal axis and an outermost point taken at a leading edge of a hub of one of the first stage blades to a radius spanning between the longitudinal axis and an outermost point of a rotor or a stator of the electric machine depending on which one is positioned outward of the other along the radial direction.

The three-stream gas turbine engine of any preceding clause, wherein the three-stream gas turbine engine defines the high pressure compressor hub radius to electric machine radius ratio as being equal to or greater than 0.1 and less than or equal to 0.25.

The three-stream gas turbine engine of any preceding clause, wherein the three-stream gas turbine engine defines the high pressure compressor hub radius to electric machine radius ratio as being equal to or greater than 0.25 and less than or equal to 0.5.

The three-stream gas turbine engine of any preceding clause, wherein the three-stream gas turbine engine defines the high pressure compressor hub radius to electric machine radius ratio as being equal to or greater than 0.5 and less than or equal to 1.0.

The three-stream gas turbine engine of any preceding clause, further comprising: a high pressure turbine operatively coupled with the first shaft and having first stage turbine blades, and wherein the three-stream gas turbine engine defines an axial direction, and wherein the three-stream gas turbine defines a high pressure turbine length to electric machine length ratio as being equal to or greater than 0.1 and less than or equal to 1.5, the high pressure turbine length to electric machine length ratio being defined by a length of the high pressure turbine to a length of the electric machine spanning between a leading edge and a trailing edge of a rotor of the electric machine along the axial direction.

The three-stream gas turbine engine of any preceding clause, wherein the three-stream gas turbine engine has a primary fan having a plurality of fan blades, and wherein the three-stream gas turbine engine defines a primary fan radius to mid-fan radius as being equal to or greater than 2.0 and less than or equal to 6.5, the primary fan radius to mid-fan radius ratio being defined by a radius spanning between a longitudinal axis defined by the three-stream gas turbine engine and a leading edge tip of one of the fan blades to a radius spanning between the longitudinal axis and a leading edge tip of one of the mid-fan blades.

A method, comprising: operating a three-stream gas turbine engine having a primary fan, a mid-fan positioned downstream of the primary fan, and an electric machine embedded therein to define a high pressure turbine tip speed to electric machine tip speed ratio as being equal to or greater than 0.1 and less than or equal to 1.0, the high pressure turbine tip speed to electric machine tip speed ratio being defined by a tip speed of a first stage turbine blade of a high pressure turbine to a tip speed of a rotor of the electric machine, the electric machine and the high pressure turbine being operatively coupled with a first shaft of the three-stream gas turbine engine and the mid-fan and the primary fan being operatively coupled with a second shaft of the three-stream gas turbine engine.

The method of any preceding clause, wherein operating the three-stream gas turbine engine further comprises operating the three-stream gas turbine engine so as to define the high pressure turbine tip speed to electric machine tip speed ratio as being equal to or greater than 0.1 and less than or equal to 0.3.

The method of any preceding clause, wherein operating the three-stream gas turbine engine further comprises operating the three-stream gas turbine engine so as to define the high pressure turbine tip speed to electric machine tip speed ratio as being equal to or greater than 0.3 and less than or equal to 0.6.

The method of any preceding clause, wherein operating the three-stream gas turbine engine further comprises operating the three-stream gas turbine engine so as to define the high pressure turbine tip speed to electric machine tip speed ratio as being equal to or greater than 0.4 and less than or equal to 1.0.

The method of any preceding clause, wherein operating the three-stream gas turbine engine further comprises operating the three-stream gas turbine engine so as to define a power to voltage ratio as being equal to or greater than 0.3 and less than or equal to 2.0, the power to voltage ratio being defined by an electrical power output by the electric machine in kilowatts to a voltage level of the electric machine in volts of direct current.

The method of any preceding clause, wherein operating the three-stream gas turbine engine further comprises operating the three-stream gas turbine engine so as to define a mid-fan tip speed to high pressure turbine tip speed ratio as being equal to or greater than 0.7 and less than or equal to 1.5, the mid-fan tip speed to high pressure turbine tip speed ratio being defined by a tip speed of a mid-fan blade of the mid-fan to a tip speed of a last stage turbine blade of the high pressure turbine.

A three-stream gas turbine engine, comprising: a low pressure shaft; a high pressure shaft; a primary fan operatively coupled with the low pressure shaft, the primary fan having primary fan blades; a mid-fan positioned downstream of the primary fan and operatively coupled with the low pressure shaft, the mid-fan having mid-fan blades; an electric machine operatively coupled with the low pressure shaft or the high pressure shaft, and wherein the three-stream gas turbine engine defines a primary fan radius to mid-fan radius ratio as being equal to or greater than 2.0 and less than or equal to 6.5, the primary fan radius to mid-fan radius ratio being defined by a radius spanning between a longitudinal axis defined by the three-stream gas turbine engine and a leading edge tip of one of the blades of the primary fan to a radius spanning between the longitudinal axis and a leading edge tip of one of the mid-fan blades of the mid-fan.

A method, comprising: operating a three-stream gas turbine engine having an electric machine embedded therein to define a tip speed ratio as being equal to or greater than 0.2 and less than or equal to 1.0, the tip speed ratio being defined by a tip speed of a rotor of the electric machine to a tip speed of a mid-fan blade of a mid-fan, the electric machine and the mid-fan both being operatively coupled with a shaft of the three-stream gas turbine engine.

A three-stream gas turbine engine, comprising: a shaft; a primary fan operatively coupled with the shaft; a mid-fan positioned downstream of the primary fan and operatively coupled with the shaft, the mid-fan having mid-fan blades; an electric machine operatively coupled with the shaft, the electric machine having a rotor rotatable with the shaft, and wherein the three-stream gas turbine engine defines a mid-fan radius to electric machine radius ratio as being equal to or greater than 1.33 and less than or equal to 3.8, the mid-fan radius to electric machine radius ratio being defined by a radius spanning between a longitudinal axis defined by the three-stream gas turbine engine and a leading edge tip of one of the mid-fan blades of the mid-fan to a radius spanning between the longitudinal axis and an outermost point of the rotor of the electric machine.

A three-stream gas turbine engine defining an axial direction, the three-stream gas turbine engine comprising: a shaft; a primary fan operatively coupled with the shaft; a mid-fan positioned downstream of the primary fan and operatively coupled with the shaft, the mid-fan having mid-fan blades; a low pressure turbine operatively coupled with the shaft; an electric machine operatively coupled with the shaft, the electric machine having a stator and a rotor, the rotor rotatable with the shaft, and wherein the three-stream gas turbine engine defines an electric machine length to low pressure turbine length ratio as being equal to or greater than 0.01 and less than or equal to 3.0, the electric machine length to low pressure turbine length ratio being defined by a length of the low pressure turbine to a length of the electric machine spanning between a leading edge and a trailing edge of the rotor of the electric machine along the axial direction, the length of the low pressure turbine spanning between a leading edge of a hub of a first stage turbine blade of the low pressure turbine to a trailing edge of a hub of a last stage turbine blade of the low pressure turbine.

A three-stream gas turbine engine, comprising: a shaft; a primary fan operatively coupled with the shaft; a mid-fan positioned downstream of the primary fan and operatively coupled with the shaft, the mid-fan having mid-fan blades; a low pressure turbine; an electric machine operatively coupled with the shaft, the electric machine having a stator and a rotor, the rotor rotatable with the shaft, and wherein the three-stream gas turbine engine further defines an electric machine tip radius to low pressure turbine last stage hub radius ratio as being equal to or greater than 0.1 and less than or equal to 1.0.

A method, comprising: operating a three-stream gas turbine engine having an electric machine embedded therein to define a mid-fan tip speed to low pressure turbine tip speed ratio as being equal to or greater than 0.7 and less than or equal to 1.5, the mid-fan tip speed to low pressure turbine tip speed ratio being defined by a tip speed of a mid-fan blade of a mid-fan to a tip speed of a last stage turbine blade of a low pressure turbine, the mid-fan being operatively coupled with a shaft of the three-stream gas turbine engine and the low pressure turbine being operatively coupled with the shaft.

A method, comprising: operating a three-stream gas turbine engine so as to define a low pressure turbine tip speed to electric machine tip speed ratio as being equal to or greater than 0.1 and less than or equal to 1.0.

A method, comprising: operating a three-stream gas turbine engine so as to define an electric machine power to low pressure turbine power ratio as being equal to or greater than 0.01 and less than or equal to 1.0 at flight idle.

A method, comprising: operating a three-stream gas turbine engine so as to define a power to voltage ratio as being equal to or greater than 0.3 and less than or equal to 2.0, the power to voltage ratio being defined by an electrical power output by an electric machine in kilowatts to a voltage level of the electric machine in volts of direct current, a mid-fan of the three-stream gas turbine engine and the electric machine being operatively coupled with a same shaft of the three-stream gas turbine engine.

A method, comprising: operating a three-stream gas turbine engine so as to define a power to AC rated current ratio of an electric machine of the three-stream gas turbine engine as being equal to or greater than 0.2 and less than or equal to 2.5, the power to AC rated current ratio being defined by an electrical power output by the electric machine in kilowatts to an AC rated current of the electric machine in ampere root mean square.

A method, comprising: operating a three-stream gas turbine engine so as to define a torque at maximum speed to AC rated current ratio as being equal to or greater than as being equal to or greater than 0.1 and less than or equal to 6.0.

A method, comprising: operating a three-stream gas turbine engine having an electric machine embedded therein to define a mid-fan tip speed to high pressure turbine tip speed ratio as being equal to or greater than 0.7 and less than or equal to 1.5, the mid-fan tip speed to high pressure turbine tip speed ratio being defined by a tip speed of a mid-fan blade of a mid-fan to a tip speed of a last stage turbine blade of a high pressure turbine, the electric machine and the high pressure turbine being operatively coupled with a first shaft of the three-stream gas turbine engine and the mid-fan being operatively coupled with a second shaft of the three-stream gas turbine engine.

A three-stream gas turbine engine, comprising: a low pressure shaft; a primary fan operatively coupled with the low pressure shaft; a mid-fan positioned downstream of the primary fan and operatively coupled with the low pressure shaft, the mid-fan having mid-fan blades; a high pressure shaft; an electric machine operatively coupled with the high pressure shaft, the electric machine having a rotor rotatable with the high pressure shaft, and wherein the three-stream engine defines a mid-fan hub radius to electric machine radius ratio as being equal to or greater than 0.1 and less than or equal to 1.0, the mid-fan hub radius to electric machine radius ratio being defined by a radius spanning between a longitudinal axis defined by the three-stream gas turbine engine and an outermost point taken at a trailing edge of a hub of the mid-fan blade of the mid-fan to a radius spanning between the longitudinal axis and an outermost point of the rotor or a stator of the electric machine depending on which one is positioned outward of the other along a radial direction defined by the three-stream gas turbine engine.

A three-stream gas turbine engine, comprising: a low pressure shaft; a primary fan operatively coupled with the low pressure shaft; a mid-fan positioned downstream of the primary fan and operatively coupled with the low pressure shaft, the mid-fan having mid-fan blades; a high pressure shaft; a high pressure turbine operatively coupled with the high pressure shaft and having first stage turbine blades; and an electric machine operatively coupled with the high pressure shaft, the electric machine having a rotor rotatable with the high pressure shaft, and wherein the three-stream gas turbine engine defines a longitudinal axis and a radial direction, and wherein the three-stream gas turbine engine defines a high pressure compressor hub radius to electric machine radius ratio as being equal to or greater than 0.1 and less than or equal to 1.0, the high pressure compressor hub radius to electric machine radius ratio being defined by a radius spanning between the longitudinal axis and an outermost point taken at a leading edge of a hub of one of the first stage blades to a radius spanning between the longitudinal axis and an outermost point of a rotor or a stator of the electric machine depending on which one is positioned outward of the other along the radial direction.

A method, comprising: operating a three-stream gas turbine engine having a primary fan, a mid-fan positioned downstream of the primary fan, and an electric machine embedded therein to define a high pressure turbine tip speed to electric machine tip speed ratio as being equal to or greater than 0.1 and less than or equal to 1.0, the high pressure turbine tip speed to electric machine tip speed ratio being defined by a tip speed of a first stage turbine blade of a high pressure turbine to a tip speed of a rotor of the electric machine, the electric machine and the high pressure turbine being operatively coupled with a first shaft of the three-stream gas turbine engine and the mid-fan and the primary fan being operatively coupled with a second shaft of the three-stream gas turbine engine.

A three-stream gas turbine engine, comprising: a low pressure shaft; a primary fan operatively coupled with the low pressure shaft; a mid-fan positioned downstream of the primary fan and operatively coupled with the low pressure shaft, the mid-fan having mid-fan blades; a high pressure shaft; an electric machine operatively coupled with the high pressure shaft, the electric machine having a rotor rotatable with the high pressure shaft; and a high pressure turbine operatively coupled with the high pressure shaft and having first stage turbine blades, and wherein the three-stream gas turbine engine defines an axial direction, and wherein the three-stream gas turbine defines a high pressure turbine length to electric machine length ratio as being equal to or greater than 0.1 and less than or equal to 1.5, the high pressure turbine length to electric machine length ratio being defined by a length of the high pressure turbine to a length of the electric machine spanning between a leading edge and a trailing edge of a rotor of the electric machine along the axial direction.

A method, comprising: operating a three-stream gas turbine engine so as to define a power to voltage ratio as being equal to or greater than 0.3 and less than or equal to 2.0, the power to voltage ratio being defined by an electrical power output by an electric machine in kilowatts to a voltage level of the electric machine in volts of direct current, the three-stream gas turbine engine having a mid-fan operatively coupled with a low pressure shaft thereof and the electric machine being operatively coupled with a high pressure shaft of the three-stream gas turbine engine.

A method, comprising: operating a three-stream gas turbine engine having a first electric machine operatively coupled with a first shaft of the three-stream gas turbine engine and a second electric machine operatively coupled with a second shaft of the three-stream gas turbine engine so as to define a second electric machine power to first electric machine power ratio as being equal to or greater than 0.1 and less than or equal to 1.5.

We claim:

1. A gas turbine engine comprising:
   a turbomachine comprising a compressor section, a combustion section, and a turbine section arranged in serial flow order, the turbomachine defining an engine inlet to an inlet duct, a fan duct inlet to a fan duct, and a core inlet to a core duct;
   a primary fan driven by the turbomachine;
   a secondary fan located downstream of the primary fan within the inlet duct, the gas turbine engine defining a thrust to power airflow ratio between 3.5 and 100 and a core bypass ratio between 0.1 and 10, wherein the thrust to power airflow ratio is a ratio of an airflow through a bypass passage over the turbomachine plus an airflow through the fan duct to an airflow through the core duct, and wherein the core bypass ratio is a ratio of the airflow through the fan duct to the airflow through the core duct; and
   an electric machine embedded in the gas turbine engine, wherein during operation of the gas turbine engine, the gas turbine engine defines a tip speed ratio equal to or greater than 0.2 and less than or equal to 1.0, the tip speed ratio being defined by a tip speed of a rotor of the electric machine to a tip speed of a blade of the secondary fan.

2. The gas turbine engine of claim 1, wherein the gas turbine engine comprises a shaft, and wherein the electric machine and the secondary fan are both operatively coupled with the shaft.

3. The gas turbine engine of claim 1, wherein the gas turbine engine defines a primary fan radius to secondary fan radius equal to or greater than 2.0 and less than or equal to 6.5.

4. The gas turbine engine of claim 1, wherein the gas turbine engine and the electric machine define a secondary fan radius to electric machine radius ratio equal to or greater than 1.33 and less than or equal to 3.8.

5. The gas turbine engine of claim 1, wherein during operation of the gas turbine engine, the electric machine defines a power to voltage ratio equal to or greater than 0.3 and less than or equal to 2.0.

6. The gas turbine engine of claim 1, wherein the gas turbine engine comprises a low pressure shaft, wherein the turbine section comprises a low pressure turbine operatively coupled with the low pressure shaft, wherein the gas turbine engine defines an electric machine length to low pressure turbine length ratio equal to or greater than 0.01 and less than or equal to 3.0.

7. The gas turbine engine of claim 1, wherein the thrust to power airflow ratio and the core bypass ratio are defined when the gas turbine engine is operated at a rated speed during standard day operating conditions.

8. The gas turbine engine of claim 1, wherein the thrust to power airflow ratio is between 4 and 75.

9. The gas turbine engine of claim 1, wherein the primary fan is an unducted primary fan, and wherein the thrust to power airflow ratio is between 30 and 60.

10. The gas turbine engine of claim 9, wherein the thrust to power airflow ratio is between 35 and 50.

11. A gas turbine engine comprising:
    a turbomachine comprising a compressor section, a combustion section, and a turbine section arranged in serial flow order, the turbomachine defining an engine inlet to an inlet duct, a fan duct inlet to a fan duct, and a core inlet to a core duct;
    a primary fan driven by the turbomachine;
    a secondary fan located downstream of the primary fan within the inlet duct, the gas turbine engine defining a thrust to power airflow ratio between 3.5 and 100 and a core bypass ratio between 0.1 and 10, wherein the thrust to power airflow ratio is a ratio of an airflow through a bypass passage over the turbomachine plus an airflow through the fan duct to an airflow through the core duct, and wherein the core bypass ratio is a ratio of the airflow through the fan duct to the airflow through the core duct; and
    an electric machine embedded in the gas turbine engine, wherein the gas turbine engine and the electric machine define a secondary fan radius to electric machine radius ratio equal to or greater than 1.33 and less than or equal to 3.8.

12. The gas turbine engine of claim 11, wherein during operation of the gas turbine engine, the gas turbine engine defines a tip speed ratio equal to or greater than 0.2 and less than or equal to 1.0, the tip speed ratio being defined by a tip speed of a rotor of the electric machine to a tip speed of a blade of the secondary fan.

13. The gas turbine engine of claim 12, wherein the gas turbine engine comprises a shaft, and wherein the electric machine and the secondary fan are both operatively coupled with the shaft.

14. The gas turbine engine of claim 11, wherein the gas turbine engine defines a primary fan radius to secondary fan radius equal to or greater than 2.0 and less than or equal to 6.5.

15. The gas turbine engine of claim 11, wherein during operation of the gas turbine engine, the electric machine defines a power to voltage ratio equal to or greater than 0.3 and less than or equal to 2.0.

16. A gas turbine engine comprising:
a turbomachine comprising a compressor section, a combustion section, and a turbine section arranged in serial flow order, the turbomachine defining an engine inlet to an inlet duct, a fan duct inlet to a fan duct, and a core inlet to a core duct;
a primary fan driven by the turbomachine;
a secondary fan located downstream of the primary fan within the inlet duct, the gas turbine engine defining a thrust to power airflow ratio between 3.5 and 100 and a core bypass ratio between 0.1 and 10, wherein the thrust to power airflow ratio is a ratio of an airflow through a bypass passage over the turbomachine plus an airflow through the fan duct to an airflow through the core duct, and wherein the core bypass ratio is a ratio of the airflow through the fan duct to the airflow through the core duct; and
an electric machine embedded in the gas turbine engine, wherein the gas turbine engine defines a primary fan radius to secondary fan radius ratio equal to or greater than 2.0 and less than or equal to 6.5.

17. A gas turbine engine comprising:
a turbomachine comprising a compressor section, a combustion section, and a turbine section arranged in serial flow order, the turbine section comprising a low pressure turbine, the turbomachine defining an engine inlet to an inlet duct, a fan duct inlet to a fan duct, and a core inlet to a core duct;
a primary fan driven by the turbomachine;
a secondary fan located downstream of the primary fan within the inlet duct, the gas turbine engine defining a thrust to power airflow ratio between 3.5 and 100 and a core bypass ratio between 0.1 and 10, wherein the thrust to power airflow ratio is a ratio of an airflow through a bypass passage over the turbomachine plus an airflow through the fan duct to an airflow through the core duct, and wherein the core bypass ratio is a ratio of the airflow through the fan duct to the airflow through the core duct; and
an electric machine embedded in the gas turbine engine, wherein the gas turbine engine defines an electric machine length to low pressure turbine length ratio equal to or greater than 0.01 and less than or equal to 3.0.

18. A gas turbine engine comprising:
a turbomachine comprising a compressor section, a combustion section, and a turbine section arranged in serial flow order, the turbine section comprising a low pressure turbine, the turbomachine defining an engine inlet to an inlet duct, a fan duct inlet to a fan duct, and a core inlet to a core duct;
a primary fan driven by the turbomachine;
a secondary fan located downstream of the primary fan within the inlet duct, the gas turbine engine defining a thrust to power airflow ratio between 3.5 and 100 and a core bypass ratio between 0.1 and 10, wherein the thrust to power airflow ratio is a ratio of an airflow through a bypass passage over the turbomachine plus an airflow through the fan duct to an airflow through the core duct, and wherein the core bypass ratio is a ratio of the airflow through the fan duct to the airflow through the core duct; and
an electric machine embedded in the gas turbine engine, wherein the gas turbine engine defines an electric machine tip radius to low pressure turbine last stage hub radius ratio as being equal to or greater than 0.1 and less than or equal to 1.0.

19. A gas turbine engine comprising:
a turbomachine comprising a compressor section, a combustion section, and a turbine section arranged in serial flow order, the turbine section comprising a high pressure turbine, the turbomachine defining an engine inlet to an inlet duct, a fan duct inlet to a fan duct, and a core inlet to a core duct;
a primary fan driven by the turbomachine;
a secondary fan located downstream of the primary fan within the inlet duct, the gas turbine engine defining a thrust to power airflow ratio between 3.5 and 100 and a core bypass ratio between 0.1 and 10, wherein the thrust to power airflow ratio is a ratio of an airflow through a bypass passage over the turbomachine plus an airflow through the fan duct to an airflow through the core duct, and wherein the core bypass ratio is a ratio of the airflow through the fan duct to the airflow through the core duct; and
an electric machine embedded in the gas turbine engine, wherein during operation of the gas turbine engine, the gas turbine engine defines a secondary fan tip speed to high pressure turbine tip speed ratio equal to or greater than 0.7 and less than or equal to 1.5.

20. A gas turbine engine comprising:
a turbomachine comprising a compressor section, a combustion section, and a turbine section arranged in serial flow order, the turbomachine defining an engine inlet to an inlet duct, a fan duct inlet to a fan duct, and a core inlet to a core duct;
a primary fan driven by the turbomachine;
a secondary fan located downstream of the primary fan within the inlet duct, the secondary fan comprising a secondary fan blade having a hub, the gas turbine engine defining a thrust to power airflow ratio between 3.5 and 100 and a core bypass ratio between 0.1 and 10, wherein the thrust to power airflow ratio is a ratio of an airflow through a bypass passage over the turbomachine plus an airflow through the fan duct to an airflow through the core duct, and wherein the core bypass ratio is a ratio of the airflow through the fan duct to the airflow through the core duct; and
an electric machine embedded in the gas turbine engine, wherein the gas turbine engine defines a secondary fan hub radius to electric machine radius ratio equal to or greater than 0.1 and less than or equal to 1.0.

* * * * *